(12) United States Patent
Lobo

(10) Patent No.: US 8,843,251 B2
(45) Date of Patent: Sep. 23, 2014

(54) POSITIONING SATELLITES

(75) Inventor: Natividade Albert Lobo, Windsor (GB)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 13/517,027

(22) PCT Filed: Dec. 22, 2009

(86) PCT No.: PCT/EP2009/067782
§ 371 (c)(1),
(2), (4) Date: Jun. 18, 2012

(87) PCT Pub. No.: WO2011/076260
PCT Pub. Date: Jun. 30, 2011

(65) Prior Publication Data
US 2012/0253563 A1 Oct. 4, 2012

(51) Int. Cl.
*G05D 1/00* (2006.01)
*G01S 19/27* (2010.01)
(52) U.S. Cl.
CPC .................................. *G01S 19/27* (2013.01)
USPC ........................................ 701/13; 342/357.66

(58) Field of Classification Search
USPC ........................................ 701/13; 342/357.66
See application file for complete search history.

(56) References Cited

U.S. PATENT DOCUMENTS

| 6,337,657 B1 * | 1/2002 | Zhodzishsky et al. ... 342/357.31 |
| 2008/0111738 A1 * | 5/2008 | Han ......................... 342/357.12 |
| 2008/0177430 A1 * | 7/2008 | Tekawy et al. .................. 701/13 |

* cited by examiner

*Primary Examiner* — Mary Cheung
*Assistant Examiner* — Yuen Wong
(74) *Attorney, Agent, or Firm* — Locke Lord LLP

(57) ABSTRACT

A method comprising: receiving first information for defining a first algebraic function that relates a time variable to a first mapped variable; using the function to convert a time variable value to a first value of the first mapped variable e.g. s; converting the first value of the first mapped variable to a second value of a second mapped variable e.g. U; and positioning a satellite by converting the second value of the second mapped variable value to a position value that positions a satellite.

15 Claims, 4 Drawing Sheets

POSITIONING SATELLITES

RELATED APPLICATION

This application was originally filed as PCT Application No. PCT/EP2009/067782 filed Dec. 22, 2009.

FIELD OF THE INVENTION

Embodiments of the present invention relate to positioning satellites. In particular, they relate to positioning satellites using solutions derived by geometric algebraic methods to equations of motion.

BACKGROUND TO THE INVENTION

Typically the differential equation of motion for a satellite orbiting the earth is solved numerically to determine the future positions of the satellites. This means that the determined future positions are only accurate with a limited time window typically a few hours.

BACKGROUND ART

1 Hestenes David, "New Foundations for Classical Mechanics (Second Edition)", Kluwer Academic Publishers
2 Hestenes David and Sobczyk Garret "Clifford Algebra to Geometric Calculus", Kluwer Academic Publishers
3 Hofmann-Wellenhof B., Lichtenegger H., and Collins, "GPS Theory and Practice", Fourth, revised edition, Springer Wien, New York
4 Drazin P. G., "Nonlinear Systems", Cambridge Texts in Applied Mathematics
5 Waldvogel Jorg, "Quaternions for Regularizing. Celestial Mechanics-the Right Way, Research Report No. 2009-09, May 2008, EIII Switzerland
6 Vrbik, Jan, "Perturbed Kepler problem in quaternionic form". J. Phys. A 28, 193-198. (1995)
7 Bartsch T., "The Kustaanheimo-Stiefel transformation in geometric algebra", arXiv:-physics/030 I 017v I [physics-.class-ph] 10 Jan. 2003
8 Vrbik Jan, "Kepler problem with time-dependent and resonant perturbations", Journal of Mathematical Physics 48, 052701 (2007)

BRIEF DESCRIPTION OF VARIOUS EMBODIMENTS OF THE INVENTION

According to various, but not necessarily all, embodiments of the invention there is provided embodiments as described in the appended claims.

Some embodiments of the invention by using geometric algebraic solutions enable long term accurate positioning without the need for current ephemeris data. The inherent accuracy of the geometric algebraic solutions (compared to numeric solutions) enables the positioning of an apparatus without having to download current ephemeris data.

Current positioning solutions (which use numeric solutions) require updated ephemeris data every 2 to 4 hours because the accuracy of the numeric solution decreases with time. The inventive solution proposed here is better able to accurately determine the future positions of satellites because it provides a geometric algebraic solution of designed (pre-determined) accuracy. It will be able to work accurately using ephemeris data for a chosen duration into the future that may be days, weeks or even months.

This will enable the positioning of an apparatus when it is switched on without first having to download the current ephemeris data. The location of the apparatus will therefore be determined more quickly.

The use of pre-calculated algebraic look-up tables may be used to provide fast positioning.

The (real world) position of an apparatus is a technical feature of the apparatus. Thus the positioning or locating of an apparatus provides technical effect.

In the example given below, the perturbation order determines the accuracy of the positioning calculation into the future. For longer term accuracy, more orders are required. As the perturbation calculation starts at the lowest order and the solution to that order is used to determine the solution to the next highest order, the perturbation calculation may be stopped at the required order of accuracy. A look up table may indicate the order required for a particular duration into the future. Thus the perturbation order may be a dynamic variable of the calculation.

The number of terms in the expansion (Annex pg 68) also affects the fundamental accuracy of the calculations. Accuracy may be improved by including more terms. Thus the number of terms may be a dynamic variable of the calculation.

It will be appreciated that real world positioning has many applications. It may, for example, be used in navigation apparatus, in emergency apparatus, in apparatus that provide location dependent services, etc.

Embodiments of the invention may result in a satellite positioning system transmitting less (or no) ephemeris data. This may result in fewer satellite tracking stations. This may enable the use of longer pseudo codes in satellite transmissions which would result in greater sensitivity of receivers. This could free up bandwidth in the satellite transmissions which could be used for other purposes.

Embodiments of the invention enables fast positioning by occasional-use positioning apparatus, that have pre-stored or 'old' ephemeris data.

BRIEF DESCRIPTION OF THE DRAWINGS

For a better understanding of various examples of embodiments of the present invention reference will now be made by way of example only to the accompanying drawings in which.

DETAILED DESCRIPTION OF VARIOUS EMBODIMENTS OF THE INVENTION

Figure 1:
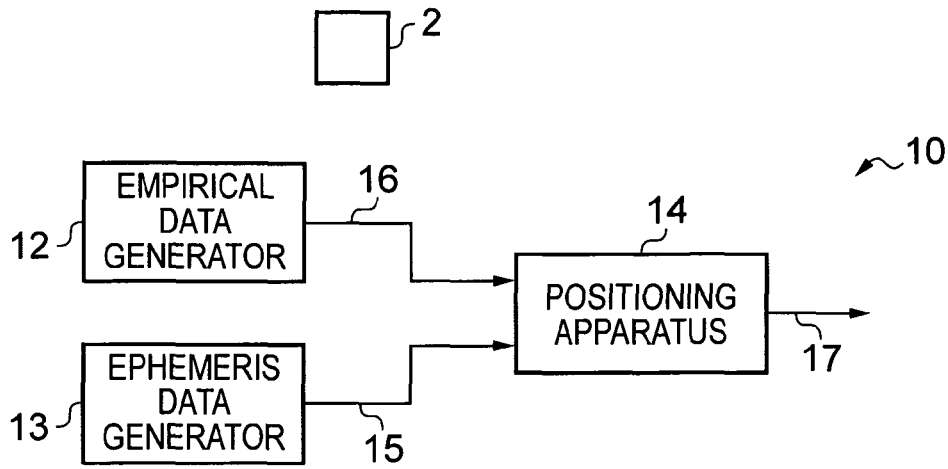
FIG. 1 schematically illustrates a satellite positioning system.

FIG. 1 schematically illustrates a satellite positioning system 10. The system 10 is capable of positioning one or more satellites 2. A satellite is an object that orbits a much greater mass such that the centre of the orbit can be approximated to the centre of the greater mass. Satellites may be earth satellites that orbit the earth. Earth satellites may be functional man-made satellites that orbit the Earth such as satellites in a Global Navigation Satellite System (GNSS). In FIG. 1, the satellite 2 is a space satellite high above the Earth.

The system 10 comprises: an empirical data generator 12; an ephemeris data generator 13; and a positioning apparatus 14. One or more of the components is located on the Earth.

The ephemeris data generator 13 provides ephemeris (orbit) data 15 to the positioning apparatus 14. Ephemeris data 15 is information about the position and velocity at a particular time of one or more satellites. The same or different particular times may be used for different satellites.

The empirical data generator 12 provides empirical based data 16 to the positioning apparatus 14. The empirically based data 16 accounts for the distribution of the mass of the Earth.

The positioning apparatus 14 uses the ephemeris data 15 and the empirically based data to determine the position 17 of the satellite 2. The positioning apparatus 14 may output the satellite position 17.

Although a single satellite 2 is illustrated, it should be appreciated that a plurality of satellites may be positioned by the positioning apparatus 14.

In some implementations the positioning apparatus 14 is part of a mobile terminal. In other implementations the positioning apparatus 14 is not part of a mobile terminal but communicates the satellite position 17 to a mobile terminal.

Figure 2:
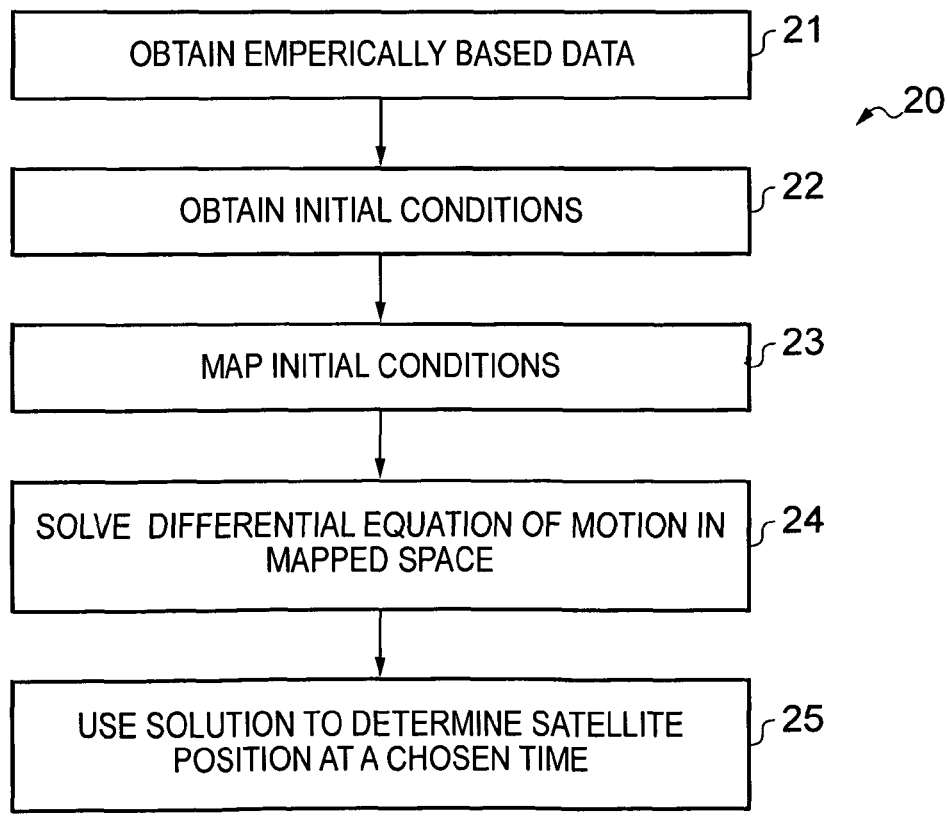
FIG. 2 schematically illustrates a method for determining a satellite position.

One example of how the positioning apparatus 14 can determine the satellite position 17 is illustrated in the method 20 of FIG. 2.

At block 21, the empirically based data 16 is obtained. The empirically based data takes account of the gravitational potential produced by the Earth's distributed mass.

At block 22, initial conditions for the satellite are determined from the ephemeris data 15. The initial conditions include $\dot{r}_{int}$ the vector velocity of the satellite at time $t_0$ and $r_{int}$ the vector position of the satellite at time $t_{int}$.

At block 23, the initial conditions are mapped using defined mappings from one variable space [r, t] to another variable space [U, s]. This produces initial conditions in [U, s] space.

At block 24, a differential equation of motion of the satellite, expressed using geometric algebra in terms of U and s is solved.

The differential equation of motion of the satellite, expressed using geometric algebra in terms of U and s comprises a constant based on the empirically based data 16 and this differential equation is solved using perturbation theory and the mapped initial conditions.

At block 25, an algebraic solution to the differential equation of motion of the satellite is used to determine the position of the satellite at a chosen time.

The use of algebraic as opposed to numerical solutions gives a solution that has a very long, theoretically infinite, validity period. The accuracy is selectable and depends upon the order of the perturbation solutions.

The time scale for updating the empirical based constant can be very long. It may have a period T1, where T1>N1, in different implementations N1 can have any one of the values greater than 1 day and less than 365 days.

The time scale for updating the empirical based constant can be very long. It may have a period T2, where T2>M1, in different implementations M1 can have any one of the values greater than 4 hours and less than 365 days. M1 may, for example, be 4 days or 2 weeks.

Explanation of the Mathematics

This section outlines the mathematics used in one method of positioning a satellite. A full and detailed explanation of the mathematics is included as an Annex to the description.

In this section, the Equations will identify vectors using bold notation. Vectors are identified by context within the description or may be identified using an underscore or bold font.

Equations of Motion in Terms of U

In this section the Kepler equation is re-expressed using the variables r and U giving a new equation of motion.

The Kepler Equation for motion in a gravitational field is:

$$\ddot{r} = -\frac{kr}{r^2} + f \qquad -4$$

(Annex pg 10)

r is the distance of the satellite from the origin f is a force that accounts for the distribution of the attracting mass Make the following definitions:

$$r = U^\dagger \sigma_1 U$$

(Annex pg 7)

$$\frac{d}{ds} = r\frac{d}{dt} \Rightarrow \frac{dt}{ds} = r = |U|^2 \qquad -3$$

(Annex pg 10)

$\sigma_1$ is a unit vector (later referred to as $\hat{r}_{int}$)

U is a geometric algebraic multivector (bivector)

Re-expressing Kepler's Equation of motion (equation 4) using geometric algebra in terms of U and f as defined in Equations 2 and 3 gives:

$$2\frac{d^2}{ds^2}U = EU + Urf \qquad -5$$

(Annex pg 11)

E is the Kepler energy $$\left(\frac{\dot{r}^2}{2} - \frac{k}{r}\right) = E,$$

Perturbation Force

The perturbation force f may be expressed as a vector sum of a plurality of forces $f_i$ e.g. $f = \Sigma f_i$.

Kepler's equation assumes a point source for the mass. Let us assume that the component $f_i$ with the greatest influence on f deals with the effect of mass distribution, where $f_i$ which is the gravitational field created by the uneven distribution of the earth's mass. Then to the first order f can be approximated to $f_i$.

In this section the force f will be expressed using geometric algebra as a multi-pole function (when no axial symmetry is assumed) in terms of U.

The stages to this are:
a) Initially the multi-pole function is initially expressed in terms of P,
b) then in terms of an arbitrary coordinate system without assuming axial symmetry,
c) then finally expressed in terms of U.

Gravitational potential is expressed as:

$$\phi[r, t] = -G \int \frac{1}{|r - r'|} dm' \qquad -6$$

(Annex pg 12)

A multipole expansion is performed using geometric algebra as:

$$\frac{1}{|r - r'|} = \frac{1}{r}\left(1 + \sum_{n=1}^{\omega} P_n[r, r']\right) \qquad -1$$

where $$P_n[r, r'] = \sum_{k=0}^{Floor\left[\frac{\alpha}{2}\right]} \left(-\frac{1}{2}C_{n-k}\right) * ((n-k)C_{n-2k}) * \frac{(-2r \cdot r')^{n-2k}(r')^{2k}}{r^{2(n-k)}}$$

(Annex pg 5)

where Pn is the Legendre polynomial of order n and Cn are the coefficients of a Taylor series (standard binomial coefficients). There is no assumption of spherical symmetry.

The gravitational potential can then be expressed using the multipole expansion (Equation 1)

$$\phi[r, t] = -G \int \frac{1}{r}\left(1 + \sum_{n=1}^{\omega} P_n[r, r']\right) dm'[r'] \qquad -7$$

(Annex pg 12)

φ is the gravitational potential created by the uneven distribution of the earth's mass expressed as location dependent values.

We now define an arbitrary orthogonal rectilinear co-ordinate system

Let $\hat{u}$ be a unit vector in the direction of the axis of rotation. Let $\hat{v}$ and $\hat{w}$ represent unit vectors orthogonal to $\hat{u}$ and orthogonal to each other.

We can express r' as $$r' = u'\hat{u}' + v'\hat{v}' + w'\hat{w}'$$

where $$\hat{u}' = \hat{u}, \hat{v}' = \hat{v} \cos[\omega_{er}t] - \hat{w} \sin[\omega_{er}t],$$

$$\hat{w}' = \hat{v} \sin[\omega_{er}t] + \hat{w} \cos[\omega_{er}t]$$

The dashed unit vectors rotate with the body assumed to rotate with an angular velocity of $\omega_{er}$ about the axis parallel to $\hat{u}$ and passing through the center of gravity.

$$\hat{u} \cdot \hat{v} = 0, \hat{u} \cdot \hat{w} = 0, \hat{w} \cdot \hat{v} = 0 \qquad -8$$

(Annex pg 15)

Re expressing Equation 7 using Equation 8

$$-G \int \frac{1}{r} P_n[r, r'] dm'[r'] = \qquad -9$$

$$-\frac{GM}{r} \sum_{k[1]=0}^{Floor\left[\frac{n}{2}\right]} \sum_{i=0}^{n-2k[1]} \sum_{j=0}^{i} \sum_{k[2]=0}^{i-j} \sum_{k[3]=0}^{j} \left(-\frac{1}{2}C_{n-k[1]}\right) *$$

$$((n - k[1])C_{n-2k[1]}) * (n - 2k)C_1 * iC_j * (i - j)C_{k[2]} *$$

$$jC_{k[3]} * (-2)^{n-2k[1]}(-1)^{k[2]}\left(\frac{R}{r}\right)^n \left((\hat{r} \cdot \hat{u})^{n-2k[1]-i}(\hat{r} \cdot \hat{v})^{i-j}(\hat{r} \cdot \hat{w})^j\right) *$$

$$((\cos[\omega_{er}t])^{i-j-k[2]+k[3]}(\sin[\omega_{er}t])^{j+k[2]-k[3]})) *$$

$$J[n][n - 2k[1] - i, i - (k[2] + k[3]), k[2] +$$

$$k[3]][\hat{u}', \hat{v}', \hat{w}']$$

where $$J[n][p, q, r][\hat{u}', \hat{v}', \hat{w}'] =$$

$$\frac{1}{MR^n}\left(\int ((\hat{r}' \cdot \hat{u}')^p (\hat{r}' \cdot \hat{v}')^q (\hat{r}' \cdot \hat{w}')^r)(r')^n dm'[r']\right)$$

(Annex pg 29/30)

$J[n][p, q, r][\hat{u}', \hat{v}', \hat{w}']$ is a multipole constant (henceforth referred to as J) that can be empirically determined. It is a set of n constants for a given set of parameters [p, q, r] and a given co-ordinate system $[\hat{u}', \hat{v}', \hat{w}']$. Although described as a constant, it should be appreciated that J may be conveyed as a set of constant values, one for each n, or may be conveyed as a single constant value (the integral) with the set of constant values being determined later using M, R and n. Once the vectors $\hat{u}, \hat{v}, \hat{w}$ have been fixed J is a constant.

Use the gravitational potential expressed in Equation 9 to express the perturbation field f $$\partial_r\left(-G \int \frac{1}{r} P_n[r, r'] dm'[r']\right) = \qquad -10$$

$$\partial_r\left(-\frac{GM}{r} \sum_{k[1]=0}^{Floor\left[\frac{n}{2}\right]} \sum_{i=0}^{n-2k[1]} \sum_{j=0}^{i} \sum_{k[2]=0}^{i-j} \sum_{k[1]=0}^{j} \left(-\frac{1}{2}C_{n-k[1]}\right) *\right.$$

$$((n - k[1])C_{n-2k[1]}) * (n - 2k)C_1 *$$

$$iC_j * (i - j)C_{k[2]} * jC_{k[3]} *$$

$$(-2)^{n-2k[1]}(-1)^{j-k[3]}\left(\frac{R}{r}\right)^n \left(((\hat{r} \cdot \hat{u})^{n-2k[1]}(\hat{r} \cdot \hat{v})^{i-j}(\hat{r} \cdot \hat{w})^j\right) *$$

$$((\cos[\omega_{er}t])^{i-j-k[2]+k[3]}(\sin[\omega_{er}t])^{j+k[2]-k[3]})) *$$

$$\left. J[n][n - 2k[1] - i, i - (k[2] + k[3]), k[2] + k[3]][\hat{u}, \hat{v}, \hat{w}]\right)$$

(Annex pg 34)

This can be alternatively expressed as $$\partial_r\left(-G \int \frac{1}{r} P_n[r, r'] dm'[r']\right) = \qquad (11)$$

$$-GM \sum_{k[1]=0}^{Floor\left[\frac{\alpha}{2}\right]} \sum_{i=c}^{n-2k[1]} \sum_{j=0}^{i} \sum_{k[2]=0}^{i-j} \sum_{k[3]=0}^{j} \left(-\frac{1}{2}C_{n-k[1]}\right) *$$

$$\left((n - k[1])C_{n-2k[1]} * (n - 2k)C_1 * iC_j *\right.$$

-continued $$(i-j)C_{k[2]} * jC_{k[3]} * (-2)^{n-2k[1]}(-1)^{j-k[3]}\left(\frac{R}{r}\right)^n *$$

$$((\cos[\omega_e rT])^{i-j-k[2]+k[3]}(\sin[\omega_e rT])^{j+k[2]-k[1]}))*$$

$$J[n][n-2k[1]-i, i-(k[2]+k[3]), k[2]+$$

$$k[3]][\hat{u}, \hat{v}, \hat{w}] *$$

$$r^{-2}\big((-(2(n-k[1])+1)\hat{r})(\hat{r}\cdot\hat{u})^{n-2k[1]-1}(\hat{r}\cdot\hat{v})^{1-j}(\hat{r}\cdot\hat{w})^j +$$

$$\big(((n-2k[1]-$$

$$i)(\hat{r}\cdot\hat{u})^{n-2k[1]-1-1}\hat{u})(\hat{r}\cdot\hat{v})^{i-j}(\hat{r}\cdot\hat{w})^j\big) +$$

$$\big((\hat{r}\cdot\hat{u})^{n-2k[1]-i}((i-j)(\hat{r}\cdot\hat{v})^{i-j-1}\hat{v})(\hat{r}\cdot\hat{w})^j\big) +$$

$$\big((\hat{r}\cdot\hat{u})^{n-2k[1]-i}(\hat{r}\cdot\hat{v})^{i-j}\big(j(\hat{r}\cdot\hat{w})^{j-1}\hat{w}\big)\big)$$

(Annex pg 36)

Equations of Motion Expressed in Terms of U and Perturbation Force

Re-express the equation of motion (Equation 5) using Equation 11

$$2\frac{d^2}{ds^2}U - EU = Ur\left(\sum_{n=2}^{\infty}\partial_r\left(-G\int\frac{1}{r}P_n[r, r']dm'[r']\right)\right) = \quad -12$$

$$-GM\left(\sum_{n=2}^{\infty}\sum_{k[1]=0}^{Floor[\frac{\alpha}{2}]}\sum_{i=0}^{n-2k[1]}\sum_{j=0}^{i}\sum_{k[3]=0}^{j}\left(-\frac{1}{2}C_{n-k[1]}\right)*\right.$$

$$\big((n-k[1])C_{n-2k[1]} * (n-2k)C_1 * iC_j * (i-j)C_{k[2]} *$$

$$jC_{k[3]} * (-2)^{n-2k[1]}(-1)^{j-k[3]}\left(\frac{R}{r}\right)^n *$$

$$((\cos[\omega_e rT])^{i-j-k[2]+k[3]}(\sin[\omega_e rT])^{j+k[2]-k[3]}))*$$

$$J[n][n-2k[1]-i, i-(k[2]+k[3]), k[2]+$$

$$k[3]][\hat{u}, \hat{v}, \hat{w}] * Urr^{-2}\bigg(-(2(n-k[1])+$$

$$1)\hat{r}\bigg)\left(\frac{((\sigma_2 U^2)+}{\hat{u}+\hat{u}(\sigma_1 U^2))}\right)^{n-2k[1]-i}\left(\frac{((\sigma_1 U^2)\hat{v}+}{\hat{v}(\sigma_1 U^2))}\right)^{i-j}\left(\frac{((\sigma_1 U^2)\hat{w}+}{\hat{w}(\sigma_1 U^2))}\right)^j +$$

$$\Bigg(\Bigg((n-2k[1]-$$

$$i)\left(\frac{((\sigma_1 U^2)\hat{u}+}{\hat{u}(\sigma_1 U^2))}\right)^{n-2k[1]-i-1}\hat{u}\Bigg)\left(\frac{((\sigma_1 U^2)\hat{v}+}{\hat{v}(\sigma_1 U^2))}\right)^{i-j}\left(\frac{((\sigma_1 U^2)\hat{w}+}{\hat{w}(\sigma_1 U^2))}\right)^j\Bigg) +$$

$$\Bigg(\left(\frac{((\sigma_1 U^2)\hat{u}+\hat{u}(\sigma_1 U^2))}{2|U|^2}\right)^{n-2k[1]-i}\big((i-$$

$$j)\left(\frac{((\sigma_1 U^2)\hat{v}+\hat{v}(\sigma_1 U^2))}{2|U|^2}\right)^{i-j-1}\hat{v}\Bigg)\left(\frac{((\sigma_1 U^2)\hat{w}+\hat{w}(\sigma_1 U^2))}{2|U|^2}\right)^j\Bigg) +$$

-continued $$\Bigg(\left(\frac{((\sigma_1 U^2)\hat{u}+}{\hat{u}(\sigma_1 U^2))}\right)^{n-2k[1]-i}\left(\frac{((\sigma_1 U^2)\hat{v}+}{\hat{v}(\sigma_1 U^2))}\right)^{i-j}\Bigg(j\left(\frac{((\sigma_1 U^2)\hat{w}+}{\hat{w}(\sigma_1 U^2))}\right)^{j-1}\hat{w}\Bigg)\Bigg)\Bigg)$$

(Annex pg 43/44)

Given the initial position vector $r_{Init}$ and velocity vector $\hat{r}_{Init}$ of the orbiting body, we can specify the bivector component of U to be proportional to $\hat{r}_{Init} \wedge \hat{\dot{r}}_{Init}$ i.e.

$$<U>_2 = \alpha \hat{r}_{Init} \wedge \hat{\dot{r}}_{Init}$$

where α is some scalar that is to be specified later $<U>_2$ the plane of the angular momentum of the satellite.

(Annex pg 40)

Using $$\sigma_1 U^{\dagger} = U\sigma_1$$

(Annex pg 43)

$$\sigma_1 = \hat{r}_{Init}$$

(Annex pg 44)

Define $$\kappa[U, \hat{r}_{Init}, \hat{\dot{r}}_{Init}, \hat{w}] = \frac{((\beta^2 - \alpha^2)\hat{r}_{Init}\cdot\hat{w} + 2\alpha\beta\hat{\dot{r}}_{Init}\cdot\hat{w})}{r_{Init}}$$

where $$\beta = \langle U \rangle_0$$

and $$\alpha = \langle U \rangle_2 (\hat{\dot{r}}_{Init} \wedge \hat{r}_{Init})$$

(Annex pg 47)

The division by $r_{int}$ maintains precision.

Define a new constant $$r_a[U, \hat{u}, \hat{v}, \hat{w}, \hat{r}_{Init}, \hat{\dot{r}}_{Init}] = \quad -13$$

$$\left(\sum_{p=0}^{\infty}(-1)^p\left(\frac{|U|^2}{r_{Init}}-1\right)^p\right)^{2n+1}\sum_{i=0}^{n-2k[1]}\sum_{j=0}^{i}\sum_{k[2]=0}^{i-j}\sum_{k[3]=0}^{j}\left(-\frac{1}{2}C_{n-k[1]}\right)*$$

$$((n-k[1])C_{n-k[1]} * (n-2k)C_i)iC_j *$$

$$(i-j)C_{k[2]} * jC_{k[3]} * (-2)^{n-2k[1]}(-1)^{j-k[3]} *$$

$$((\cos[\omega_e rT])^{i-j-k[2]+k[3]}(\sin[\omega_e rT])^{j+k[2]-k[3]}))*$$

$$J[n][n-2k[1]-i, i-(k[2]+k[3]), k[2]+k[3]][\hat{u}, \hat{v}, \hat{w}] *$$

$$\Bigg(\big(-(2(n-k[1])+1)\hat{r}\big)\left(\frac{|U|^2}{r_{Init}}\right)^{2k[1]}(x[U, \hat{r}_{Init}, \hat{\dot{r}}_{Init}, \hat{u}])^{n-2k[1]-i}$$

$$(x[U, \hat{r}_{Init}, \hat{\dot{r}}_{Init}, \hat{v}])^{i-j}(x[U, \hat{r}_{Init}, \hat{\dot{r}}_{Init}, \hat{w}])^j\Bigg) +$$

$$\left(\frac{|U|^2}{r_{Init}}\right)^{2k[1]+1}\Big(((n-2k[1]-i)(\kappa[U, \hat{r}_{Init}, \hat{\dot{r}}_{Init}, \hat{u}])^{n-2k[1]-i-1}\hat{u})$$

$$(\kappa[U, \hat{r}_{Init}, \hat{\dot{r}}_{Init}, \hat{v}])^{i-j}(\kappa[U, \hat{r}_{Init}, \hat{\dot{r}}_{Init}, \hat{w}])^j\Big) +$$

$$\left(\frac{|U|^2}{r_{Init}}\right)^{2k[1]+1}\Big((\kappa U, \hat{r}_{Init}, \hat{\dot{r}}_{Init}, \hat{u}])^{n-2k[1]-i}$$

$$((i-j)(\kappa[U, \hat{r}_{Init}, \hat{\dot{r}}_{Init}, \hat{v}])^{i-j-1}\hat{v})(\kappa[U, \hat{r}_{Init}, \hat{\dot{r}}_{Init}, \hat{w}])^j\Big) +$$

-continued $$\left(\frac{|U|^2}{r_{Init}}\right)^{2k[1]+1}\left(\left(\kappa[U,\hat{r}_{Init},\hat{r}_{Init},\hat{u}]\right)^{n-2k[1]-1}\left(\kappa[U,\hat{r}_{Init},\hat{r}_{Init},\hat{v}]\right)^{i-j}\right.$$
$$\left.\left(j\left(\kappa[U,\hat{r}_{Init},\hat{r}_{Init},\hat{w}]\right)^{j-1}\hat{w}\right)\right)\Bigg]$$

(Annex pg 55/56)

This is a constant for at a particular initial condition defined in the co-ordinate system u, v, w. It is empirically based as it depends upon J. Although described as a constant, it should be appreciated that $\Gamma$ is a set of constant values, one for each n. Re-express Equation 12 using Equation 13

$$2\frac{d^2}{ds^2}U - EU = -\frac{1}{r_{Init}}\hat{r}_{Init}UGM\left(\sum_{n=2}^{\infty}\left(\frac{R}{r_{Init}}\right)^n \Gamma_n[U,\hat{u},\hat{v},\hat{w},\hat{r}_{Init},\hat{r}_{Init}]\right) \quad -14$$

(Annex pg 56/57)

$\underline{f}$ is thus expressed using geometric algebra in terms of U. It is a multipole function that includes an empirically based constant $\Gamma$.

The Equation is then solved using perturbation theory,

Define $$\epsilon = -\frac{1}{r_{Init}} \Rightarrow r_{Init} = -\frac{1}{\epsilon} \quad -15$$

&

$$U = \sum_{i=0}^{\infty} \epsilon^i U_1 \quad -16$$

(Annex pg 65)

And let $$\omega = \sum_{i=0}^{\infty} \epsilon^i \omega_1$$

Where $$\frac{-E}{2} = \omega^2$$

(Annex pg 66)

Defining $$\Gamma_n[U,\hat{u},\hat{v},\hat{w},\hat{r}_{Init},\hat{r}_{Init}] = \sum_{i=0}^{\infty}\epsilon^i \sum_{j=0}^{\lambda_{r,n,i}} \alpha_{\Gamma,n,i,j}e^{j\omega_{r,m,i,j}s}$$

(Annex pg 74)

The perturbed equation of motion is given by $$\sum_{i=0}^{1}\epsilon^i\left(\frac{d^2}{ds^2}U_i + \left(\sum_{k=0}^{i}U_{i-k}\left(\sum_{j=0}^{k}\omega_{k-j}\omega_j\right)\right)\right) = \quad (18)$$

$$\frac{1}{2}\sum_{i=0}^{0}\epsilon^{i+1}\left(\hat{r}_{Init}GM\left(\sum_{n=2}^{\lambda_{Multipole}}\left(\frac{R}{r_{Init}}\right)^n *\right.\right.$$
$$\left.\left.\left(\left(\sum_{j=0}^{i}U_{i-j}r_{n,j}[U,\hat{u},\hat{v},\hat{w},\hat{r}_{Init},\hat{r}_{Init}]\right)\right)\right)\right)$$

and the following three equations:

$$\sum_{i=0}^{1}\epsilon^i\left(\sum_{j=0}^{i}\omega_{i-j}\omega_j\right) = -\frac{E}{2} \quad (19)$$

$$r_{Init} = \sum_{i=0}^{1}\epsilon^i\left(\sum_{j=0}^{i}U_{i-j,Init}U_{j,Init}\right) \quad (20)$$

$$r_{Init}\dot{r}_{Init} = \sum_{i=0}^{1}\epsilon^i\left(\sum_{j=0}^{i}(U'_{i-j,Init}U_{j,Init} + U_{i-j,Init}U'_{j,Init})\right) \quad (21)$$

(Annex pg 76)

A solution of the following form is assumed:

$$x[s] = ae^{j\omega s} + be^{-j\omega s} + \sum_{i=1}^{n}\frac{A_i}{\omega^2 - \alpha_i^2}e^{j\alpha_i s} \quad (22)$$

(Annex pg 77)

where, the following stability condition holds:

$$A_i = 0 \text{ when } \omega^2 - \alpha_1^2 = 0 \quad (23)$$

(Annex pg 78)

$$U_i[s] = \sum_{j=0}^{\lambda_{u,i}}\alpha_{U,i,j}e^{j\omega_{U,i,j}s} \quad (24)$$

$$U[s] = \sum_{i=0}^{1}\epsilon^i\sum_{j=0}^{\lambda_{U,i}}\alpha_{U,i,j}e^{j\omega_{U,i,j}s} \quad (25)$$

$$U[s]U[s]^\dagger = \sum_{i=0}^{2}\epsilon^i\left(\sum_{j=0}^{\lambda_{UU^\dagger,i}}\alpha_{UU^\dagger,i,j}e^{j\omega_{UU^\dagger,i,j}s}\right) \quad (26)$$

$$t = \sum_{i=0}^{2}\epsilon^i\sum_{j=0}^{\lambda_{tExpr,i}}\alpha_{tExpr,i,j}e^{j\omega_{tExpr,i,j}s} \quad (27)$$

(Annex pg 83/84)

It should also be noted that from Equation 2

$$U_0^\dagger = r_{Init}^{\frac{1}{2}} \quad (28)$$

(Annex pg 87)
also from Equation 2

$$\frac{1}{2}r_{Init}^{\frac{1}{2}}\hat{r}_{Init}\hat{r}_{Init} = \frac{dU_0^\dagger}{ds}\bigg|_{s=0} \quad (29)$$

(Annex pg 87)

The method 30 described with reference to FIG. 3 determines an unknown satellite position at a particular time. It illustrates some of the blocks of FIG. 2 in more detail.

The object of block 31 is to determine the multipole constants J up to a certain order (see equations 9 and 13 and Annex pg 29/30) that takes account of the gravitational potential produced by a distributed mass.

The method of FIG. 2 can be adapted to determine the multipole constants J up to a certain order, which when used in the method of FIG. 2 determines a known satellite position at a particular time.

By using additional ephemeris data that accurately identifies satellite positions at different times, it is possible to generate a series of equations in which the unknown is the multipole constants J to the desired order. Optimisation techniques may then be used to determine the common unknown multipole constants.

For example, if the positions $r_i$ of a satellite are known accurately at different times $t_i$, then there will be values $s_i$ associated with $t_i$. Substituting $r_i$ and $t_i$ into the Equations 3 and 25 results in two equations with unknowns J and the respective $s_i$.

These equations may be solved using least mean square techniques. Many different accurate positions for the same satellite $r_i$ at known times $t_i$ may be used to increase accuracy. The method may also be repeated with additional satellites to increase accuracy.

The multi-pole constants J to the respective order is empirically determined as it is based on accurate ephemeris data which may be in the past.

At block 32, ephemeris data defining the initial conditions of a satellite are mapped or transformed. The initial conditions are mapped using defined mappings from one variable space [r, t] to another variable space [U, s]. This produces initial conditions in [U, s] space.

The initial conditions include:
$\bar{r}_{int}$ is the vector velocity of the satellite at time $t_{int}$
$r_{int}$ is the vector displacement of the satellite at time $t_{int}$ The equations 28 and 29 are used to perform the mapping.

At block 33, a force constant Γ that is used to define the gravitational force in [U, s] space is determined.

Equation 13 is used calculate $r_n[U, \hat{u}, \hat{v}, \hat{w}, \hat{r}_{Init}, \hat{r}_{Init}]$ The force constant Γ is dependent upon the co-ordinate system $\hat{u}, \hat{v}, \hat{w}$ and on the initial conditions $\hat{r}_{int}, r_{int}$. It should therefore be updated whenever new ephemeris data is to be used. In some embodiments, the force constant may be distributed with or at the same time as the ephemeris data 14. For each, the force constant Γ need only be calculated once to yield a function in terms of U given the co-ordinate system and initial conditions.

It will be appreciated from Equation 13 that the force constant Γ is dependent upon J and that Γ is also empirically based.

The empirically based data 13 produced by the empirical data generator 12 may be either the multipole constant J or the force constant Γ.

At block 24, a differential equation of motion of the satellite, expressed using geometric algebra in terms of U and s is solved. The block includes sub-blocks 34 to 38.

The differential equation of motion of the satellite, expressed using geometric algebra in terms of U and s comprises the force constant Γ (see Equation 14). This differential equation may, for example, be solved using perturbation theory and the mapped initial conditions as explained in more detail below.

At block 34, the differential equations for the different orders of perturbation are solved to a target order of perturbation. In this example, they will be solved to the second order but in other examples a different target order for solution may be chosen.

The first order differential equation is solved to determine Uo

The next order differential equation is simplified using the first order differential equation and its determined solution Uo. The equation is then solved to determine $U_1$ In general, the $r^{th}$ order differential equation is simplified using the $(r-1)^{th}$ order differential equation and its determined solutions Ui. The equation is then solved to determine $U_r$ The process is continued until the target order is reached and completed. The target order determines accuracy.

The general solution $U_i$ is found by solving equations 17 to 21 using the stability condition of Equation 23 as a constraint. (see Annex pgs 60 to 83)

At block 35, express the obtained solutions Ui for each perturbation order using the algebraic equation 24 and determine the coefficients of Equation 22.

$$U_i[s] = \sum_{j=0}^{\lambda_{U,i}} \alpha_{U,i,j} e^{j\omega_{U,i,j}s} \quad (24)$$

At block 36, algebraically express U using the algebraic expression for Ui from Equation 24 in Equation 25 and determine the coefficients of Equation 25.

$$U[s] = \sum_{i=0}^{1} \epsilon^i \sum_{j=0}^{\lambda_{U,i}} \alpha_{U,i,j} e^{j\omega_{U,i,j}s} \quad (25)$$

At block 37, algebraically express $U[s]U[s]^\dagger$ using the algebraic expression for U from Equation 25 in Equation 26 and determine the coefficients of Equation 26.

$$U[s]U[s]^\dagger = \sum_{i=0}^{2} \epsilon^i \left( \sum_{j=0}^{\lambda_{UU^\dagger,i}} \alpha_{UU^\dagger,i,j} e^{j\omega_{UU^\dagger,i,j}s} \right) \quad (26)$$

At block 38, algebraically express $\int_o^{\sigma^2} U[s]U[s]'ds$ using the algebraic expression for $U[s]U[s]'$ from Equation 26 in Equation 27 to determine the coefficients of Equation 27.

$$t = \sum_{i=0}^{2} \epsilon^i \sum_{j=0}^{\lambda_{tExpr,i}} \alpha_{tExpr,i,j} e^{j\omega_{tExpr,i,j}s} \quad (27)$$

At block 25, an algebraic solution to the differential equation of motion of the satellite is used to determine the position of the satellite at a chosen time. Block 25 comprises the sub-blocks 40 to 42.

Equation 27 is an algebraic function that relates a time variable t to a first mapped variable s. The coefficients of this equation have been determined at block 38. At block 40, this algebraic equation is used to convert a time variable value $t_1$-$t_{init}$ to a first value $s_1$ of the first mapped variable.

Equation 25 is an algebraic function that relates the first mapped variable s to the second mapped variable U. The coefficients of this equation have been determined at block 36. At block 41, this algebraic equation is used to convert the first value $s_1$ of the first mapped variable s to a second value $U(s_1)$ of a second mapped variable U.

The satellite is positioned at block 42 by converting the second value $U(s_1)$ of the second mapped variable to a position value $r_{t1}$ that positions the satellite. The mapping between [r, t] and [U, s] (Equation 2) is used to determine $r_{t1}$ $$r_{t1} = U^\dagger[S_1]\dot{r}_{Init}U[S_1]$$

The position value can then be stored in a memory for future use in applications.

This approach provides an algebraic solution the accuracy of which is dependent upon the target order of perturbation elected and used. The accuracy is not time dependent. Assuming there is no change to the perturbation force the validity period is theoretically infinite at an accuracy determined by the 'depth' of algebraic solution (i.e. the target order of perturbation used). Consequently there is no requirement to repeatedly send or receive ephemeris data and ephemeris data may be pulled by the positioning apparatus rather than pushed to the positioning apparatus.

Figure 3:
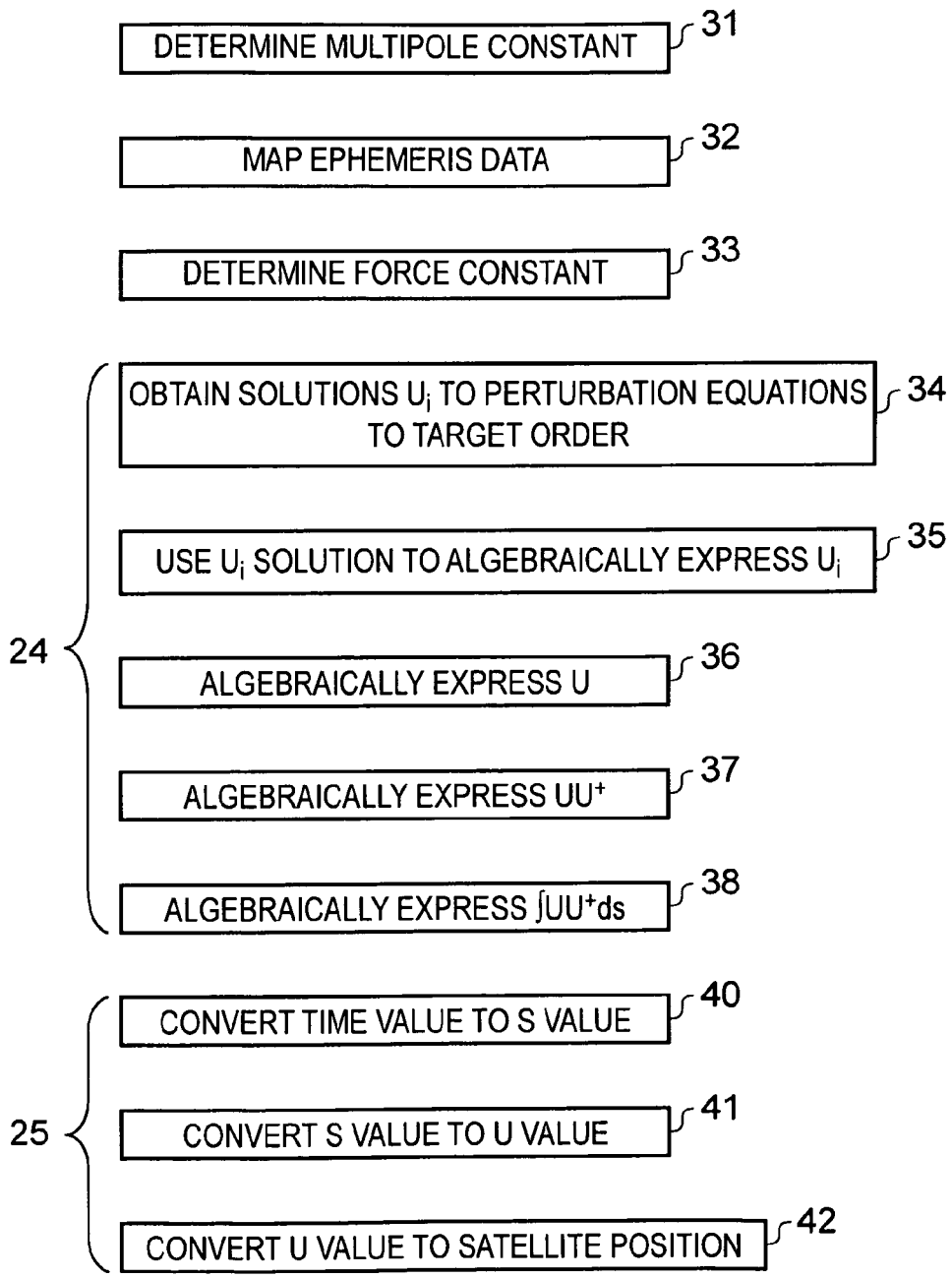
FIG. 3 schematically illustrates, in detail, for determining an unknown satellite position at a particular time.

It should be appreciated that the various blocks in FIGS. 2 and 3 need not be performed by a single apparatus.

For example, the boundary conditions (Equations 19, 20, 21) may be expressed in a look-up table in terms of the variables a, b, $\omega_o$, and the initial conditions $\dot{r}_{int}$, $r_{int}$.

When the initial conditions are defined by received ephemeris data the three boundary conditions are expressed in terms of variables a, b, $\omega_o$ in a look-up table. The three equations in three unknowns can be solved using standard processes (Annex pg 83) to provide a, b, $\omega_o$, The equation below may be expressed in a look-up table as a function of a, b, $\omega_o$, t, and s:

$$t - t_0 = \int_o^{si} U[s]U[s]^\dagger ds$$

Once a, b, $\omega_o$ have been determined for a set of initial conditions $\dot{r}_{int}$, $r_{int}$, the value s at any arbitrary future time t can be simply determined.

The equation below may be expressed in a look-up table as a function of a, b, $\omega_o$, and s (Annex pg 82):

$$U[s] = \sum_{i=0}^{1} \epsilon^i \sum_{j=0}^{\lambda_{U,i}} \alpha_{U,i,j} e^{j\omega_{u,i,j}s}$$

Substituting the values of a, b, $\omega_o$, and s provides U[s], The position can then be simply calculated $$r_{t3} = U^\dagger[S_1]\dot{r}_{Init}U[S_1]$$

It is therefore possible to perform a large amount of pre-processing to obtain geometric algebraic look-up tables, which can be simply used to calculate the position. It will be appreciated that the exact extent and nature of the pre-processing may vary from implementation to implementation.

If more than on constellation may be used for positioning (e.g. GPS, Galileo, Clonass etc), then it may be advantage to nest the look-up tables such that those relating to a particular constellation are stored logically together. This improves access speed.

Figure 4:
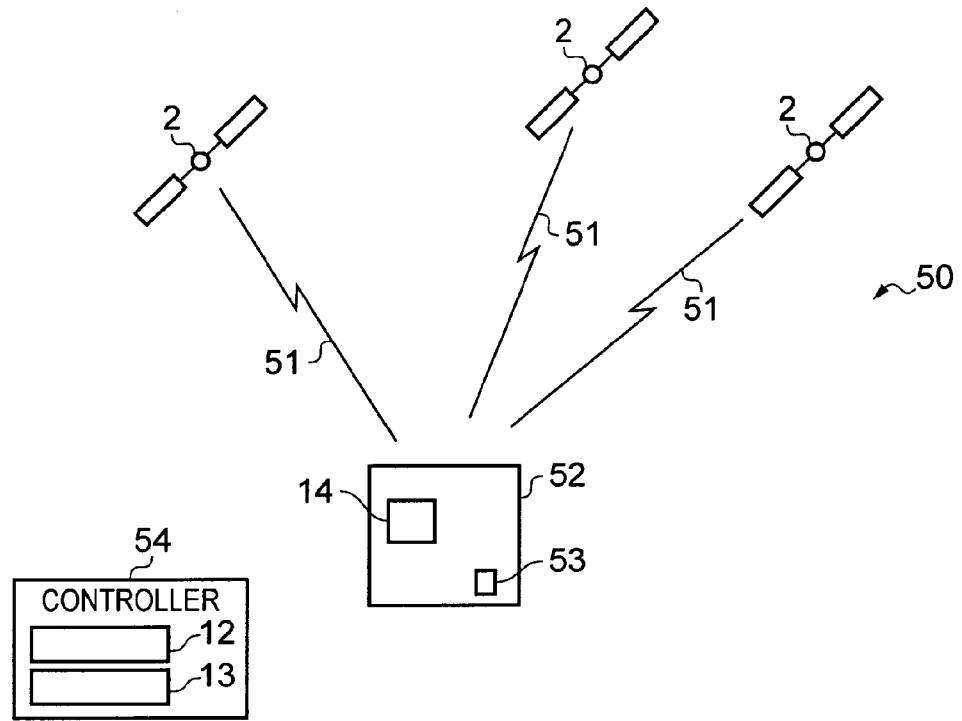
FIG. 4 schematically illustrates a Global Navigation Satellite System (GNSS)

Referring to FIG. 4 the blocks 31, 32, 33, 24, 25 may be carried out in different locations in different apparatus.

It may, for example, be advantageous to have block 31 performed where there is access to accurate satellite positioning information. This may also be where the ephemeris data 15 is generated.

The block 32 (mapping ephemeris data) may, for example, occur before or after distribution of ephemeris data 15.

The block 33 (determining force constant) may, for example, occur before distribution of the ephemeris data 15 and, for example be distributed with the ephemeris data 15. Alternatively, the block 33 (determining force constant) may, for example, occur after receiving distributed ephemeris data 15.

The block 24 (determining the coefficients of the algebraic expressions) may, for example, occur before distribution of the ephemeris data 15 and/or force constant and the coefficients may be distributed with the ephemeris data and/or force constant. Alternatively, the block 24 (determining the coefficients of algebraic expressions) may, for example, occur after receiving distributed ephemeris data and after receiving or generating the force constant.

The block 25 (determining position) may, for example, occur before distribution of the ephemeris data and, for example, be distributed with the ephemeris data. Alternatively, the block 33 (determining force constant) may, for example, occur after receiving or determining the coefficients of the algebraic expressions.

In one implementation a mobile terminal may perform blocks 31, 32, 33, 24 and 25. In another implementation a mobile terminal may perform only blocks 32, 33, 24 and 25. In another implementation a mobile terminal may perform only blocks 33, 24 and 25. In another implementation a mobile terminal may perform only blocks 24 and 25. In another implementation a mobile terminal may perform only block 25.

FIG. 4 schematically illustrates a Global Navigation Satellite System (GNSS) 50.

The system 50 comprises: a plurality of GNSS communication satellites 2 for transmitting positioning signals 51 and one or more mobile receiver terminals 52.

A mobile receiver terminal 52 receives the positioning signals from at least some of the satellites and at least partially processes the positioning signals to determine the distance of each satellite from the mobile receiver terminal 52.

The mobile receiver terminal 52 determines the position 53 of the mobile receiver terminal 52 by using the determined distance values for each satellite and obtained accurate positions for each satellite. The mobile receiver terminal 52 use the satellites positions and their distances to determine the position 53 of the mobile receiver terminal 52. The position 53 may be stored in a memory of the mobile receiver terminal 52.

Typically four or more satellites need to be in sight and the satellite positions need to be accurate.

This system 50 may advantageously use or include the satellite positioning system 10 to provide long-term accurate satellite positions.

For example, in this example the GNSS system 50 includes a system controller 54 that comprises the empirical data generator 12 and the ephemeris data generator 13. In other implementations the empirical data generator 12 and the ephemeris data generator 13 may be housed separately using the system controller 52 or elsewhere.

In the illustrated example, the empirical data generator 12 determines and distributes the multipole constant J and the force constant $\Gamma$. The empirical data generator 12 performs blocks 31, 32 and 33 of FIG. 3. However, in other implementations the empirical data generator 12 determines and distributes only the multipole constant J and the force constant $\Gamma$ is determined elsewhere. It may, for example, be determined in the positioning apparatus 14.

In this illustrated example, the positioning apparatus 14 is integrated within the mobile terminal 52. The positioning apparatus performs blocks 24 and 25 to determine and store satellite positions 17. The satellite positions are used to determine and store the position 53 of the mobile receiver terminal. In other implementations the positioning apparatus 14 may be located outside the terminal and may provide the satellite positions 17 to the mobile receiver terminal 52.

The mobile receiver terminal 52 need not be a dedicated GNSS terminal. The terminal may, for example, have functionality for other uses. It may, for example, also operate as a personal digital assistant and/or a cellular phone and/or a personal music player and/or a personal video player and/or a personal computer etc.

There is no significant time delay in positioning the terminal 52 immediately after starting-up the terminal 52. The position apparatus 14 can determine the position 17 of a satellite without needing to acquire current ephemeris data. This allows positioning services to be available immediately when the terminal 52 is started.

In one embodiment, the terminal 52 has two modes of operation. It has a first positioning mode that requires the regular receipt of ephemeris data because it expires after a few hours. It has a second positioning mode, based on the method 30 of FIG. 3, which performs block 25 to determine a satellite position 17. It may be possible for the terminal 52 to start-up in the second mode to provide instantaneous positioning and then switch to the first mode when updated ephemeris data is received. It may be possible for the terminal 52 to switch from the second mode to the first mode when it is determined that the first mode is inaccurate or potentially inaccurate. The determination of possible inaccuracy may occur, for example, by having a validity period for ephemeris data, after which that data expires and is no longer accurate. The determination of possible inaccuracy may occur, for example, by regularly performing the first mode and the second mode in parallel and determining when the resulting positions determined using the two modes are significantly different.

In another embodiment, the first mode and the second mode are performed in parallel and differences in results are used to correct for clock drift.

Figure 5:
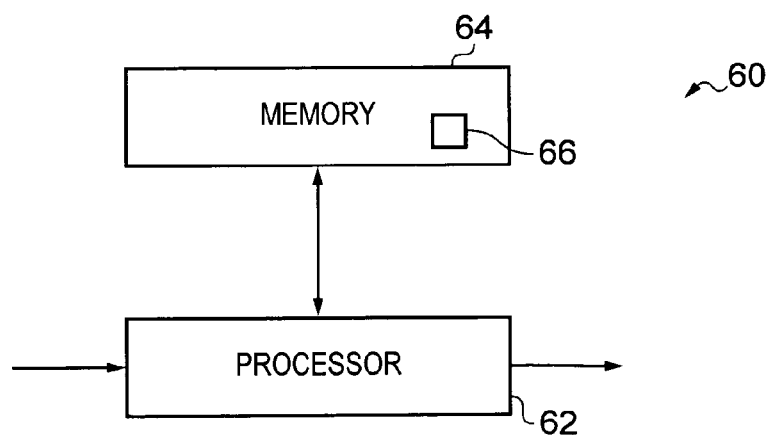
FIG. 5 schematically illustrates a controller.

FIG. 5 schematically illustrates a controller 60 suitable for performing one or more of the blocks illustrated in the FIGS. 2 and/or 3. A controller of this type may be used as the empirical data generator 12 and/or the ephemeris data generator 13 and/or the positioning apparatus 14.

The controller 60 may be implemented using instructions that enable hardware functionality, for example, by using executable computer program instructions in a general-purpose or special-purpose processor that may be stored on a computer readable storage medium (disk, memory etc) to be executed by a processor.

The processor 62 is configured to read from and write to the memory 64. The processor 62 may also comprise an output interface via which data and/or commands are output by the processor 62 and an input interface via which data and/or commands are input to the processor 62.

The memory 64 stores a computer program 66 comprising computer program instructions that control the operation of a host apparatus when loaded into the processor 62. The computer program instructions 66 provide the logic and routines that enables the apparatus to perform the methods illustrated in FIGS. 2 & 3. The processor 62 by reading the memory 64 is able to load and execute the computer program 66.

The computer program may arrive at the apparatus via any suitable delivery mechanism. The delivery mechanism may be, for example, a computer-readable storage medium, a computer program product, a memory device, a record medium such as a CD-ROM or DVD, an article of manufacture that tangibly embodies the computer program. The delivery mechanism may be a signal configured to reliably transfer the computer program 53. The apparatus may propagate or transmit the computer program as a computer data signal.

Although the memory 52 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

Figure 6:
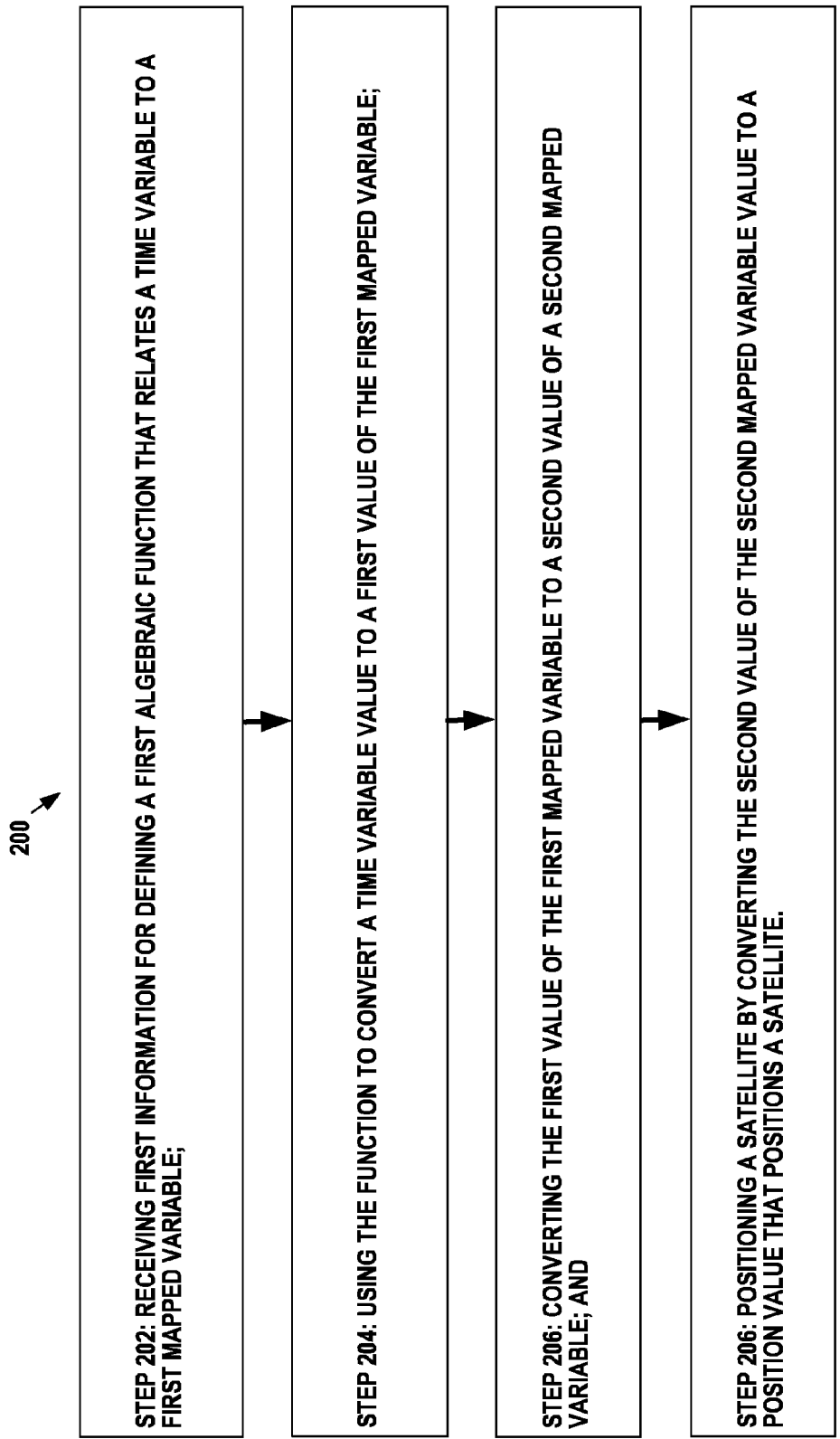
FIG. 6 illustrates a method in accordance with an embodiment of the invention.

FIG. 6 is a flow diagram 200 that illustrates a method in accordance with an embodiment of the invention. The steps of the method are as follows:

Step 202: receiving first information for defining a first algebraic function that relates a time variable to a first mapped variable;

Step 204: using the function to convert a time variable value to a first value of the first mapped variable;

Step 206: converting the first value of the first mapped variable to a second value of a second mapped variable; and Step 206: positioning a satellite by converting the second value of the second mapped variable value to a position value that positions a satellite.

It should be appreciated that determining the position of a satellite has many uses. It may be used to position GNSS satellites. It may be used to position and track other satellites such as space debris, which may be used to produce collision warnings. It may be used to position a satellite even after the ephemeris data has 'expired' and new ephemeris data is not available. It may be used for low power measuring of movement of a positioning apparatus 14. this may be useful when measuring landslip, structural failure, tectonic plate movement etc.

Various components may have been described as connected in the preceding paragraphs. It should be appreciated that they may instead be operationally coupled and any number or combination of intervening elements can exist (including no intervening elements)

Reference has been made to various examples in the preceding description. It should be understood that reference to an example implies that alternative, but not necessarily explicitly disclosed implementations can be used.

The blocks illustrated in FIGS. 2 and 3 may represent steps in a method and/or sections of code in the computer program. The illustration of a particular order to the blocks does not necessarily imply that there is a required or preferred order for the blocks and the order and arrangement of the block may be varied. Furthermore, it may be possible for some steps to be omitted.

As used here 'apparatus' includes devices, modules, systems. Module refers to a unit or apparatus that excludes certain parts/components that would be added by an end manufacturer or a user.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

Annex

Annex

We will be using geometric algebra to perform the calculations, using the spinor formulation.

■ Introduction

The Kepler problem has been studied for a long time. The equation of motion $$\ddot{r} = -\frac{k\,\hat{r}}{r^2} + f$$

is highly nonlinear and exhibits a singularity at the origin. This equation is used to calculate the orbit of a satellite orbiting round the earth in the presence of perturbing forces f. For astronomical orbit calculations, the singulatity at $r = 0$ is not a problem. In atomic physics where r for the zone of interest can tend to zero the singularity at $r = 0$ is a problem. The solution to the equation can be obtained numerically and as the equation is non-linear the accuracy of the solution decreases the further away the point is from the initial condition.

Euler was the first person to transform the equation so that one could study the long term evolution of the quantities of interest. For the one-dimentional Kepler equation without any perturbing forces, $$\ddot{r} = -\frac{k\,\hat{r}}{r^2}$$

Euler found a transformation, so that the equation became $$\frac{d^2}{ds^2}U + 2EU = 0$$

The transformed equation is the equation of motion of a one-dimentional harmonic oscillator. This equation does not have any singularities, and is also linear and is thus a good basis for performing long term analytic orbit calculations. Levi-Civita regularised a 2 dimensional Kepler problem, to an equivalent two dimensional harmonic oscillator. Attempts to regularise a three dimentional Kepler problem failed until 1964, when Kustaanheimo and Stiefel showed how to transform the three dimentional Kepler problem to a harmonic oscillitor in 4 dimentional space. The harmonic oscillator of any dimension has good analytical properties, so that make using perturbation theory, one can solve the equation of motion when there are perturbating forces present. Hestenes (Ref 1) showed how to solve the Kepler problem using geometric algebra, while Jan Vibrik (Ref 6) showed how to use quaternions to regularise the Kepler problem. Bartsch(Ref 7) gives references to Euler, Levi-Civita and Kustaanheimo and Stiefel attempts. Bartsch's paper shows how to use geometric algebra to derive a Lagrangian and Hamiltonion of the Kustaanheimo-Stiefel dynamics in arbitary static electromagnetic fields. These ideas have applications in atomic physics.

We have derived an expression for the solution to the equation of motion of a satellite, without assuming that the earth is axially symmetric using geometric algebra, and it is this geometric algebra version that is novel. Jan Vibrik has derived a similar solution to the equation using quaternions and purterbation theory. We derive a geometric algebra equation, the right hand side of which can be evaluated first in geometric algebra (We have in Note B provided an example of a *Mathematica* program where we have implemented the rules of the geometric vector product.)

A formula for the earth's potential V, that is represented by a spherical harmonic multipole expansion can be found in Ref 3 and refered to as the earth model.

We derive, a multipole expansion, similar to the earth model, in that we do not assume axial symmetry of the body, but without needing to specify the coordinate system (such as spherical harmonic in the earth model) . This multipole expansion differs from the multipole expansion found in reference 1.

The quaternion implementation of the solution to Kepler's equation for predicting orbits has been known to have superior numerical properties (See Ref 6). Also, this quote, "Quaternions have been found to be the ideal tool for describing and developing the theory of spatial regularization in celestial mechanics" can be found in Ref 5 .

Quaternions are a subalgebra of geometric algebra and it would be useful to describe the regularising method using geometric algebra. The solution to Kepler's equation in geometric algebra is developed in Ref 1, but only for axially symmetric bodies.

The advantage of evaluating the RHS in geometric algebra is that the level of perturbation approximation needed can be decided depending on the length of time that has elapsed between the last known position of the satellite and the time for which the position is required. The perturbation level can be precalculated beforehand, and the different solutions stored.

■ The Legendre Polynomials in Geometric Algebra

In order to calculate the perturbing force f, we need the series expansion of the expression, $\frac{1}{|r-r'|}$, which we will calculate using geometric algebra. The objects, such as the planets can be approximated as spheres. The external gravitational potential of a spherical symmetric body is given by $$\phi[r] = -\frac{GM}{r}$$

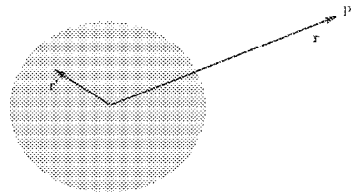

We consider the contribution to the gravitational field at point P due to the mass dm' at r' of a body that may not possess spherical symmetry.

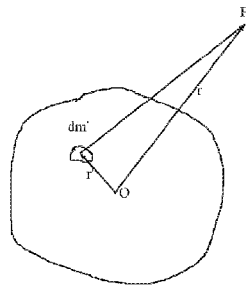

We use bold letters for vectors.

$|r - r'|$ represents the length of the vector $(\mathbf{r} - \mathbf{r'})$. But in GA, $\mathbf{r}^2 = r^2$, the square of the length of vector $\mathbf{r}$. Thus $|r - r'|^2 = (r - r')^2$. Thus we get $$\frac{1}{|\mathbf{r} - \mathbf{r'}|} = \frac{1}{\sqrt{(\mathbf{r} - \mathbf{r'})(\mathbf{r} - \mathbf{r'})}}$$

Multiplying out the expression we get $$\frac{1}{\sqrt{(\mathbf{r}-\mathbf{r}')(\mathbf{r}-\mathbf{r}')}} = \frac{1}{\sqrt{r^2 - \mathbf{r}\mathbf{r}' - \mathbf{r}'\mathbf{r} + (\mathbf{r}')^2}}$$

Note that the vectors r and r' may not commute. r r' may not be equal to r' r.

But in GA, $\mathbf{r}^2 = r^2$, the square of the length of vector r. Similarly, $(\mathbf{r}')^2 = (r')^2$. Also in GA, we have for the dot product, $\mathbf{r} \cdot \mathbf{r}' = \frac{1}{2}(\mathbf{r}\mathbf{r}' + \mathbf{r}'\mathbf{r})$.

Substituting these, we get $$\frac{1}{\sqrt{(\mathbf{r}-\mathbf{r}')(\mathbf{r}-\mathbf{r}')}} = \frac{1}{\sqrt{r^2 - 2\mathbf{r}\cdot\mathbf{r}' + (r')^2}}$$

Now the expression on the right is made up entirely of scalar terms, and we can manuplate the terms using the usual rules of real analysis since multiplication of real numbers is always commutative. Multiplication of vectors in geometric algebra is not necessarily commutative.

As r >> r' we can write this as $$\frac{1}{\sqrt{(\mathbf{r}-\mathbf{r}')(\mathbf{r}-\mathbf{r}')}} = \frac{1}{r} \frac{1}{\sqrt{1 + \frac{(-2\mathbf{r}\cdot\mathbf{r}' + (r')^2)}{r^2}}}$$

Or as $$\frac{1}{\sqrt{(\mathbf{r}-\mathbf{r}')(\mathbf{r}-\mathbf{r}')}} = \frac{1}{r} \left(1 + \frac{(-2\mathbf{r}\cdot\mathbf{r}' + (r')^2)}{r^2}\right)^{\frac{-1}{2}}$$

Expand as a Taylor's series $$\left(1 + \frac{(-2\mathbf{r}\cdot\mathbf{r}' + (r')^2)}{r^2}\right)^{\frac{-1}{2}} =$$

$$1 + \sum_{i=1}^{\infty} \left(-\frac{1}{2} C_i\right) * \left(\frac{(-2\mathbf{r}\cdot\mathbf{r}' + (r')^2)}{r^2}\right)^{i}$$

where mCn are the usual binomial coefficients. Thus we get $$\frac{1}{|\mathbf{r}-\mathbf{r}'|} = \frac{1}{r} \left(1 + \sum_{i=1}^{\infty} \left(-\frac{1}{2} C_i\right) * \left(\frac{(-2\mathbf{r}\cdot\mathbf{r}' + (r')^2)}{r^2}\right)^{i}\right)$$

We can expand the power to get $$\frac{1}{|\mathbf{r} - \mathbf{r}'|} = \frac{1}{r}\left(1 + \sum_{i=1}^{\infty} \left(-\frac{1}{2}C_i\right) * \left(\sum_{k=0}^{i} (iC_k) * \frac{(-2\mathbf{r}\cdot\mathbf{r}')^{i-k}(r')^{2k}}{r^{2i}}\right)\right)$$

Distributing we get $$\frac{1}{|\mathbf{r} - \mathbf{r}'|} = \frac{1}{r}\left(1 + \sum_{i=1}^{\infty}\sum_{k=0}^{i} \left(-\frac{1}{2}C_i\right) * (iC_k) * \frac{(-2\mathbf{r}\cdot\mathbf{r}')^{i-k}(r')^{2k}}{r^{2i}}\right)$$

Now we consider all the terms that can be expressed as powers of $\left(\frac{r'}{r}\right)^n$ $$\frac{1}{|\mathbf{r} - \mathbf{r}'|} = \frac{1}{r}\left(1 + \sum_{n=1}^{\infty} P_n[r, r']\right)$$

where $$P_n[r, r'] = \sum_{k=0}^{\text{Floor}\left[\frac{n}{2}\right]} \left(-\frac{1}{2}C_{n-k}\right) * ((n-k)C_{n-2k}) * \frac{(-2\mathbf{r}\cdot\mathbf{r}')^{n-2k}(r')^{2k}}{r^{2(n-k)}}$$

(1)

Or using a different formula, we can express $P_n$ $$\text{AltP}_n[r, r'] = \sum_{i=1}^{n} \left(-\frac{1}{2}C_i\right) * (iC_{n-i}) * \frac{(-2\mathbf{r}\cdot\mathbf{r}')^{i-(n-i)}(r')^{2(n-i)}}{r^{2i}}$$

(2)

$P_n$ are usually known as Legendre polynomials. We need to prove that all the terms are accounted for. For any i and k, the term $$\left(-\frac{1}{2}C_i\right) * (iC_k) * \frac{(-2\mathbf{r}\cdot\mathbf{r}')^{i-k}(r')^{2k}}{r^{2i}}$$

is summed in the expression $P_{i+k}[r, r']$. Thus each of the terms of the series expansion is in exactly one Legendre expression.

The Legendre polynomials are generated by the following code.

```
GeometricLegendreP[n_][r_, r1_] :=
Sum[
    Binomial[-1/2, n-k] Binomial[n-k, n-2k] ((- 2 r . r1)^(n-2k) (r1.r1)) / ((r.r)^(n-k))
    , {k, 0, Floor[n/2]}]]
```

The first five Legendre polynomials are generated by the following code

```
Table[{P[i][r, r1], GeometricLegendreP[i][r, r1]},
    {i, 1, 5}] // Simplify
```

The results are $$\left\{\left\{P[1][r, r1], \frac{r.r1}{r.r}\right\},\right.$$

$$\left\{P[2][r, r1], \frac{3(r.r1)^2 - r.r\, r1.r1}{2(r.r)^2}\right\},$$

$$\left\{P[3][r, r1], \frac{5(r.r1)^3 - 3\, r.r\, r.r1\, r1.r1}{2(r.r)^3}\right\},$$

$$\left\{P[4][r, r1],\right.$$
$$\left.\frac{1}{8(r.r)^4}\left(35(r.r1)^4 - 30\, r.r\, (r.r1)^2\, r1.r1 + 3(r.r)^2(r1.r1)^2\right)\right\},$$

$$\left\{P[5][r, r1], \frac{1}{8(r.r)^5}\right.$$
$$\left.\left(63(r.r1)^5 - 70\, r.r\, (r.r1)^3\, r1.r1 + 15(r.r)^2\, r.r1\, (r1.r1)^2\right)\right\}\right\}$$

```
AltGeometricLegendreP[n_][r_, r1_]:=
Sum[
    Binomial[-1/2, i] Binomial[i, n-i] ((- 2 r . r1)^(2i-n) (r1.r1)^(n-i))/((r.r)^i)
    , {i, 1, n}]

Table[{P[i][r, r1], AltGeometricLegendreP[i][r, r1]},
      {i, 1, 5}] // Simplify//MatrixForm
```

$$\begin{pmatrix} P[1][r, r1] & \frac{r.r1}{r.r} \\ P[2][r, r1] & \frac{3(r.r1)^2 - r.r\, r1.r1}{2(r.r)^2} \\ P[3][r, r1] & \frac{5(r.r1)^3 - 3 r.r\, r.r1\, r1.r1}{2(r.r)^3} \\ P[4][r, r1] & \frac{35(r.r1)^4 - 30 r.r (r.r1)^2 r1.r1 + 3(r.r)^2 (r1.r1)^2}{8(r.r)^4} \\ P[5][r, r1] & \frac{63(r.r1)^5 - 70 r.r (r.r1)^3 r1.r1 - 15(r.r)^2 r.r1 (r1.r1)^2}{8(r.r)^5} \end{pmatrix}$$

Orbital Mechanics (From Spinor Particle Mechanics by David Hestenes)

Let $r = r[\tau]$ be the orbit of a particle of unit mass with the equation of motion $$\ddot{\mathbf{r}} = -\frac{k\hat{\mathbf{r}}}{r^2} + \mathbf{f}$$

Let $\sigma_1$ be a fixed unit vector, $U$ a quaternion that varies with t, such that $$\mathbf{r} = U^\dagger \sigma_1 U \qquad (3)$$

There is some freedom in the choice of $U$. We can choose $U$, such that $U$ satisfies $$\left(U^\dagger \sigma_1 \dot{U}\right)_3 = 0$$

The above equation is the commonly known as the subsidiary condition.

$$r^2 = \mathbf{r}\,\mathbf{r} = U^\dagger \sigma_1 U\, U^\dagger \sigma_1 U = |U|^4$$

That implies $$r = |U|^2$$

From the above equation, $\mathbf{r} = r\,\hat{r}$, and $\mathbf{r} = U^\dagger \sigma_1 U$ we get $$\hat{r} = \frac{(U^\dagger \sigma_1 U)}{|U|^2}$$

And $$r^{-1} = \frac{\hat{r}}{r} = \frac{(U^\dagger \sigma_1 U)}{|U|^2 |U|^2} = \frac{(U^\dagger \sigma_1 U)}{|U|^4}$$

From $r = U^\dagger \sigma_1 U$, we get $$\dot{r} = \dot{U}^\dagger \sigma_1 U + U^\dagger \sigma_1 \dot{U}$$

Thus we get $$\dot{r} r^{-1} = \left(\dot{U}^\dagger \sigma_1 U + U^\dagger \sigma_1 \dot{U}\right) \frac{(U^\dagger \sigma_1 U)}{|U|^4}$$

But by applying the grade operator to both sides $$\dot{r} = \langle \dot{r} \rangle_1 = \left(\dot{U}^\dagger \sigma_1 U + U^\dagger \sigma_1 \dot{U}\right)_1$$

Distributing $$\dot{r} = \left(\dot{U}^\dagger \sigma_1 U\right)_1 + \left(U^\dagger \sigma_1 \dot{U}\right)_1$$

Applying revision to the second term $$\dot{r} = 2 \left(\dot{U}^\dagger \sigma_1 U\right)_1$$

Thus we get $$\dot{r} r^{-1} = 2 \left(\dot{U}^\dagger \sigma_1 U\right)_1 \frac{(U^\dagger \sigma_1 U)}{|U|^4}$$

But since $$U^\dagger \sigma_1 U = \left(U^\dagger \sigma_1 U\right)_1$$

and using the subsidiary condition $$\left(U^\dagger \sigma_1 \dot{U}\right)_3 = 0$$

we get $$\left(\dot{U}^\dagger \sigma_1 U\right)_1 = \dot{U}^\dagger \sigma_1 U$$

Thus $$\dot{\mathbf{r}}\,\mathbf{r}^{-1} = 2\left(\dot{U}^\dagger \sigma_1 U \frac{(U^\dagger \sigma_1 U)}{|U|^4}\right)$$

Simplifying $$\dot{\mathbf{r}}\,\mathbf{r}^{-1} = \frac{2\dot{U}^\dagger U}{|U|^2}$$

We can multiply LHS by $\mathbf{r}$ and the RHS by $U^\dagger \sigma_1 U$ $$\dot{\mathbf{r}}\,\mathbf{r}^{-1}\,\mathbf{r} = \frac{2\dot{U}^\dagger U}{|U|^2} U^\dagger \sigma_1 U$$

Simplifying $$\dot{\mathbf{r}} = 2\dot{U}^\dagger \sigma_1 U$$

$$\dot{\mathbf{r}}\,\frac{U^\dagger}{r}\sigma_1 = 2\dot{U}^\dagger \sigma_1 \frac{UU^\dagger}{r}\sigma_1$$

$$\dot{\mathbf{r}}\,\frac{U^\dagger}{2r}\sigma_1 = \dot{U}^\dagger$$

Taking the reversion of both sides of the equation, and remembering $\dot{\mathbf{r}}$ is a vector, $$\sigma_1 \frac{U}{2r}\dot{\mathbf{r}} = \dot{U}$$

$$\sigma_1 U \dot{\mathbf{r}} = 2r\dot{U}$$

We now consider what happens when we differentiate both sides with respect to t. Remember, $\sigma_1$ is a constant of unit length.

$$\sigma_1 \dot{U} \dot{\mathbf{r}} + \sigma_1 U \ddot{\mathbf{r}} = 2\frac{d}{dt}\left(r\dot{U}\right)$$

Multiplying the second term of LHS by $\frac{UU^\dagger}{r}$, we get $$\sigma_1 \dot{U} \dot{\mathbf{r}} + \frac{UU^\dagger}{r}\sigma_1 U \ddot{\mathbf{r}} = 2\frac{d}{dt}\left(r\dot{U}\right)$$

Using the transformation equation $\mathbf{r} = U^\dagger \sigma_1 U$, we can simply the second term of LHS $$\sigma_1 \dot{U} \dot{\mathbf{r}} + \frac{U}{r}\mathbf{r}\ddot{\mathbf{r}} = 2\frac{d}{dt}\left(r\dot{U}\right)$$

10 | *OrbitCalculationsRewritePatentHomeLaptop38.nb*

Using the equation $\sigma_1 \frac{U}{2r} \dot{r} = \dot{U}$, we can transform the first term of LHS $$\sigma_1 \left(\sigma_1 \frac{U}{2r} \dot{r}\right) \dot{r} + \frac{U}{r} \mathbf{r} \ddot{\mathbf{r}} = 2 \frac{d}{dt}(r \dot{U})$$

Simplifying the first term of LHS $$\frac{U}{2r} \dot{\mathbf{r}}^2 + \frac{U}{r} \mathbf{r} \ddot{\mathbf{r}} = 2 \frac{d}{dt}(r \dot{U})$$

Factorising the LHS of the above equation $$\frac{U}{r} \left(\frac{\dot{\mathbf{r}}^2}{2} + \mathbf{r} \ddot{\mathbf{r}}\right) = 2 \frac{d}{dt}(r \dot{U})$$

Define a new variable $$\frac{d}{ds} = r \frac{d}{dt} \implies \frac{dt}{ds} = r = |U|^2 \qquad (4)$$

The RHS of the equation is $$\frac{U}{r} \left(\frac{\dot{\mathbf{r}}^2}{2} + \mathbf{r} \ddot{\mathbf{r}}\right) = 2 \frac{d}{dt}\left(r \frac{d}{dt} U\right)$$

Multiplying both sides of the equation by r $$U \left(\frac{\dot{\mathbf{r}}^2}{2} + \mathbf{r} \ddot{\mathbf{r}}\right) = 2 r \frac{d}{dt}\left(r \frac{d}{dt} U\right)$$

We simplify RHS as $$U \left(\frac{\dot{\mathbf{r}}^2}{2} + \mathbf{r} \ddot{\mathbf{r}}\right) = 2 \frac{d^2}{ds^2} U$$

Now given the equation of motion $$\ddot{\mathbf{r}} = -\frac{k \hat{\mathbf{r}}}{r^2} + \mathbf{f} \qquad (5)$$

We get by mulyiplying both sides by r. (Note that we are performing a geometric product of two vectors, and so order of the multipicants does matter)

$$\mathbf{r} \ddot{\mathbf{r}} = -\frac{k \mathbf{r} \hat{\mathbf{r}}}{r^2} + \mathbf{r} \mathbf{f}$$

Remembering that $\mathbf{r}$ and $\hat{r}$ are parallel vectors, we have $\mathbf{r}\,\hat{\mathbf{r}} = r$. Thus we get for the equation of motion $$\mathbf{r}\,\ddot{\mathbf{r}} = -\frac{k}{r} + \mathbf{r}\,\mathbf{f}$$

Substituting for $\mathbf{r}\,\ddot{\mathbf{r}}$ in $$2\frac{d^2}{ds^2}U = U\left(\frac{\dot{\mathbf{r}}^2}{2} + \mathbf{r}\,\ddot{\mathbf{r}}\right)$$

We get $$2\frac{d^2}{ds^2}U = U\left(\frac{\dot{\mathbf{r}}^2}{2} - \frac{k}{r} + \mathbf{r}\,\mathbf{f}\right)$$

Rearranging the RHS, using the distribution law, $$2\frac{d^2}{ds^2}U = U\left(\frac{\dot{\mathbf{r}}^2}{2} - \frac{k}{r}\right) + U\,\mathbf{r}\,\mathbf{f}$$

This can be expressed as $$2\frac{d^2}{ds^2}U = E\,U + U\,\mathbf{r}\,\mathbf{f}$$

where $\left(\frac{\dot{r}^2}{2} - \frac{k}{r}\right) = E$, the Kepler energy. Note that the Kepler energy is a constant of motion and a scalar and so commutes with all expressions.(See P569, Ref 1)

Rearranging the equation we get the geometric algebra equation, which can be solved by perturbation theory.

$$2\frac{d^2}{ds^2}U - E\,U = U\,\mathbf{r}\,\mathbf{f}$$

■ Calculation of Perturtabation Forces f

Now we calculate the perturbation forces f.

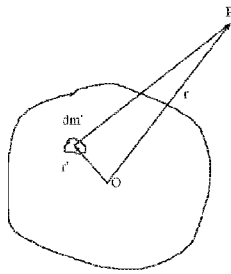

We define the origin to be the center of gravity of the body. Then, for a continuous body, the field, g[r,t], due to the body at a point P, situated r from the origin, at time t, is defined to be $$g[r, t] = -G \int \frac{(r - r')}{|r - r'|^3} dm'$$

The potential for the same body at the same point P is given by $$\phi[r, t] = -G \int \frac{1}{|r - r'|} dm' \qquad (6)$$

■ Calculation of Potential function $\phi[x, t]$ in terms of the series expansion

We have $$\frac{1}{|r - r'|} = \frac{1}{r}\left(1 + \sum_{n=1}^{\infty} P_n[r, r']\right)$$

Thus we get $$\phi[r, t] = -G \int \frac{1}{r}\left(1 + \sum_{n=1}^{\infty} P_n[r, r']\right) dm'[r'] \qquad (7)$$

We list the first five Legrendre Polynomials $P_n[r, r']$ $$P_1[r, r'] = \frac{r \cdot r'}{r^2}$$

$$P_2[r, r'] = \frac{3(r \cdot r')^2 - r^2 (r')^2}{2 r^4}$$

$$P_3[r, r'] = \frac{5(r \cdot r')^3 - 3 r^2 (r')^2 \, r \cdot r'}{2 r^6}$$

$$P_4[\mathbf{r}, \mathbf{r}'] = \frac{1}{8\,r^8}\left(35\,(\mathbf{r}.\mathbf{r}')^4 - 30\,r^2\,(r')^2\,(\mathbf{r}.\mathbf{r}')^2 + r^4\,(r')^4\right)$$

$$P_5[\mathbf{r}, \mathbf{r}'] = \frac{1}{8\,r^{10}}\left(63\,(\mathbf{r}.\mathbf{r}')^5 - 70\,r^2\,(r')^2\,(\mathbf{r}.\mathbf{r}')^3 + 15\,r^4\,(r')^4\,(\mathbf{r}.\mathbf{r}')\right)$$

We list the corresponding Legrendre Polynomials $P_n[\hat{r}, \hat{r}']$, given unit vectors $\hat{r}$, $\hat{r}'$ as input.

$$P_1[\hat{\mathbf{r}}, \hat{\mathbf{r}}'] = \hat{\mathbf{r}}.\hat{\mathbf{r}}'$$

$$P_2[\hat{\mathbf{r}}, \hat{\mathbf{r}}'] = \frac{\left(3\,(\hat{\mathbf{r}}.\hat{\mathbf{r}}')^2 - 1\right)}{2}$$

$$P_3[\hat{\mathbf{r}}, \hat{\mathbf{r}}'] = \frac{\left(5\,(\hat{\mathbf{r}}.\hat{\mathbf{r}}')^3 - 3\,\hat{\mathbf{r}}.\hat{\mathbf{r}}'\right)}{2}$$

$$P_4[\hat{\mathbf{r}}, \hat{\mathbf{r}}'] = \frac{\left(35\,(\hat{\mathbf{r}}.\hat{\mathbf{r}}')^4 - 30\,(\hat{\mathbf{r}}.\hat{\mathbf{r}}')^2 + 1\right)}{8}$$

$$P_5[\hat{\mathbf{r}}, \hat{\mathbf{r}}'] = \frac{\left(63\,(\hat{\mathbf{r}}.\hat{\mathbf{r}}')^5 - 70\,(\hat{\mathbf{r}}.\hat{\mathbf{r}}')^3 + 15\,(\hat{\mathbf{r}}.\hat{\mathbf{r}}')\right)}{8}$$

Distributing the integration $$\phi[\mathbf{r}, t] = -G\int \frac{1}{r}\,dm'[\mathbf{r}'] - \sum_{n=1}^{\infty} G\int \frac{1}{r}\,P_n[\mathbf{r}, \mathbf{r}']\,dm'[\mathbf{r}']$$

The first integral on the RHS of the expression is $$G\int \frac{1}{r}\,dm'[\mathbf{r}'] = GM\,\frac{1}{r}$$

Where M is the mass of the earth

We calculate the 1,2,3... terms of the multipole expansion of the potential function $\phi[\mathbf{r}, t]$. The first term in the multipole expansion is $$G\int \frac{1}{r}\,P_1[\mathbf{r}, \mathbf{r}']\,dm'[\mathbf{r}']$$

Substituting for $P_1$, we get $$G\int \frac{1}{r}\,P_1[\mathbf{r}, \mathbf{r}']\,dm'[\mathbf{r}'] = G\int \frac{1}{r}\,\frac{\mathbf{r}.\mathbf{r}'}{r^2}\,dm'[\mathbf{r}']$$

Simplifying, and factoring r, and $\frac{1}{r^3}$, from the integral, we get $$G \int \frac{1}{r} P_1[\mathbf{r}, \mathbf{r}'] \, dm'[\mathbf{r}'] = G \frac{1}{r^3} \mathbf{r} \cdot \left( \int \mathbf{r}' \, dm'[\mathbf{r}'] \right)$$

But the integral $\int \mathbf{r}' \, dm'[\mathbf{r}']$, is zero, as we locate the origin at the center of gravity of the body.

$$G \int \frac{1}{r} P_1[\mathbf{r}, \mathbf{r}'] \, dm'[\mathbf{r}'] = G \frac{1}{r^3} \mathbf{r} \cdot 0$$

Calculation of $J_2$ assuming Axial Symmetry

For n = 2

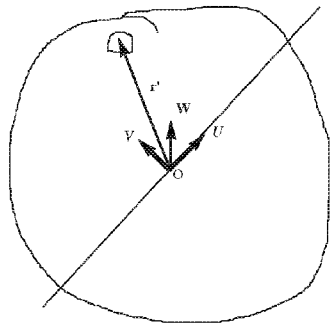

Let $\hat{u}$ be a unit vector in the direction of the axis of rotation. Let $\hat{v}$ and $\hat{w}$ represent unit vectors orthogonal to $\hat{u}$ and orthogonal to each other. Then $$G \int \frac{1}{r} P_2[\mathbf{r}, \mathbf{r}'] \, dm'[\mathbf{r}'] = G \int \frac{1}{r} \left( \frac{3 (\mathbf{r} \cdot \mathbf{r}')^2 - r^2 (r')^2}{2 r^4} \right) dm'[\mathbf{r}']$$

We can express r' as $$\mathbf{r}' = u' \hat{u}' + v' \hat{v}' + w' \hat{w}'$$

where $$\hat{u}' = \hat{u}, \quad \hat{v}' = \hat{v}\cos[\omega_{er} t] - \hat{w}\sin[\omega_{er} t],$$
$$\hat{w}' = \hat{v}\sin[\omega_{er} t] + \hat{w}\cos[\omega_{er} t]$$

The dashed unit vectors rotate with the body assumed to rotate with an angular velocity of $\omega_{er}$ about the axis parallel to $\hat{u}$ and passing through the center of gravity.

Remember because of the orthogonality assumption of unit vectors $$\hat{u} \cdot \hat{v} = 0, \quad \hat{u} \cdot \hat{w} = 0, \quad \hat{w} \cdot \hat{v} = 0 \tag{8}$$

Substituting for $P_2$ $$G \int \frac{1}{r} P_2[\mathbf{r}, \mathbf{r}'] \, dm'[\mathbf{r}'] = G \int \frac{1}{r} \left( \frac{3(\mathbf{r} \cdot \mathbf{r}')^2 - r^2 (r')^2}{2 r^4} \right) dm'[\mathbf{r}']$$

Substituting for $(r')^2 = (r')^2$ $$G \int \frac{1}{r} P_2[\mathbf{r}, \mathbf{r}'] \, dm'[\mathbf{r}'] =$$
$$G \int \frac{1}{r} \left( \frac{3(\mathbf{r} \cdot \mathbf{r}')^2 - r^2 (\mathbf{r}' \cdot \mathbf{r}')}{2 r^4} \right) dm'[\mathbf{r}']$$

Substituting for $\mathbf{r}'$ $$G \int \frac{1}{r} P_2[\mathbf{r}, \mathbf{r}'] \, dm'[\mathbf{r}'] =$$
$$G \int \frac{1}{r} \left( \frac{1}{2 r^4} \left( 3 (\mathbf{r} \cdot (u'\hat{u}' + v'\hat{v}' + w'\hat{w}'))^2 - \right. \right.$$
$$\left. \left. r^2 ((u'\hat{u}' + v'\hat{v}' + w'\hat{w}') \cdot (u'\hat{u}' + v'\hat{v}' + w'\hat{w}')) \right) \right) dm'[\mathbf{r}']$$

Expressing $\hat{u}'$, $\hat{v}'$, $\hat{w}'$ in terms of $\hat{u}$, $\hat{v}$, and $\hat{w}$ $$G \int \frac{1}{r} P_2[\mathbf{r}, \mathbf{r}'] \, dm'[\mathbf{r}'] =$$
$$G \int \frac{1}{r} \left( \frac{1}{2 r^4} \left( 3 (\mathbf{r} \cdot (u'\hat{u} + v'(\hat{v}\cos[\omega_{er} t] - \hat{w}\sin[\omega_{er} t]) + w' \right. \right.$$
$$\left. (\hat{v}\sin[\omega_{er} t] + \hat{w}\cos[\omega_{er} t])))^2 -$$

$$r^2 ((u'\hat{u} + v'(\hat{v}\cos[\omega_{er}t] - \hat{w}\sin[\omega_{er}t]) + w'(\hat{v}\sin[\omega_{er}t] + \hat{w}\cos[\omega_{er}t])).(u'\hat{u} + v'(\hat{v}\cos[\omega_{er}t] - \hat{w}\sin[\omega_{er}t]) + w'(\hat{v}\sin[\omega_{er}t] + \hat{w}\cos[\omega_{er}t]))) \, dn'[r']$$

Simplifying by distributing $$(\mathbf{r}.(u'\hat{u} + v'(\hat{v}\cos[\omega_{er}t] - \hat{w}\sin[\omega_{er}t]) + w'(\hat{v}\sin[\omega_{er}t] + \hat{w}\cos[\omega_{er}t])))^2 =$$

$$(\mathbf{r}.\hat{u}\; u' + \mathbf{r}.\hat{v}\cos[\omega_{er}t]\, v' - \mathbf{r}.\hat{w}\sin[\omega_{er}t]\, v' + \mathbf{r}.\hat{v}\sin[\omega_{er}t]\, w' + \mathbf{r}.\hat{w}\cos[\omega_{er}t]\, w')^2 =$$

$$(\mathbf{r}.\hat{u})^2 (u')^2 + 2\cos[\omega_{er}t]\, \mathbf{r}.\hat{u}\, \mathbf{r}.\hat{v}\, u'v' - 2\mathbf{r}.\hat{u}\, \mathbf{r}.\hat{w}\sin[\omega_{er}t]\, u'v' +$$
$$\cos[\omega_{er}t]^2 (\mathbf{r}.\hat{v})^2 (v')^2 - 2\cos[\omega_{er}t]\, \mathbf{r}.\hat{v}\, \mathbf{r}.\hat{w}\sin[\omega_{er}t]\, (v')^2 +$$

$$(\mathbf{r}.\hat{w})^2 \sin[\omega_{er}t]^2 (v')^2 + 2\cos[\omega_{er}t]\, \mathbf{r}.\hat{u}\, \mathbf{r}.\hat{w}\, u'w' +$$
$$2\mathbf{r}.\hat{u}\, \mathbf{r}.\hat{v}\sin[\omega_{er}t]\, u'w' + 2\cos[\omega_{er}t]^2\, \mathbf{r}.\hat{v}\, \mathbf{r}.\hat{w}\, v'w' +$$
$$2\cos[\omega_{er}t]\, (\mathbf{r}.\hat{v})^2 \sin[\omega_{er}t]\, v'w' -$$

$$2\cos[\omega_{er}t]\, (\mathbf{r}.\hat{w})^2 \sin[\omega_{er}t]\, v'w' -$$
$$2\mathbf{r}.\hat{v}\, \mathbf{r}.\hat{w}\sin[\omega_{er}t]^2\, v'w' + \cos[\omega_{er}t]^2 (\mathbf{r}.\hat{w})^2 (w')^2 +$$
$$2\cos[\omega_{er}t]\, \mathbf{r}.\hat{v}\, \mathbf{r}.\hat{w}\sin[\omega_{er}t]\, (w')^2 + (\mathbf{r}.\hat{v})^2 \sin[\omega_{er}t]^2 (w')^2$$

Simplifying the components $$(u'\hat{u} + v'(\hat{v}\cos[\omega_{er}t] - \hat{w}\sin[\omega_{er}t]) + w'(\hat{v}\sin[\omega_{er}t] + \hat{w}\cos[\omega_{er}t])) =$$

$$(u'\hat{u} + (\cos[\omega_{er}t]\, v' + \sin[\omega_{er}t]\, w')\hat{v} + (-\sin[\omega_{er}t]\, v' + \cos[\omega_{er}t]\, w')\hat{w})$$

Thus we have $$(u'\hat{u} + v'(\hat{v}\cos[\omega_{er}t] - \hat{w}\sin[\omega_{er}t]) + w'(\hat{v}\sin[\omega_{er}t] + \hat{w}\cos[\omega_{er}t])).(u'\hat{u} + v'(\hat{v}\cos[\omega_{er}t] - \hat{w}\sin[\omega_{er}t]) + w'(\hat{v}\sin[\omega_{er}t] + \hat{w}\cos[\omega_{er}t])) =$$

$$(u')^2 + (\cos[\omega_{er} t] v' + \sin[\omega_{er} t] w')^2 +$$
$$(-\sin[\omega_{er} t] v' + \cos[\omega_{er} t] w')^2 =$$
$$(u')^2 + (v')^2 + (w')^2$$

Substituting back $$G \int \frac{1}{r} P_2[\mathbf{r},\mathbf{r'}] \, dm'[\mathbf{r'}] =$$
$$G \int \frac{1}{r} \left( \frac{1}{2r^4} \left( 3 \left( (\mathbf{r}.\hat{\mathbf{u}})^2 (u')^2 + 2\cos[\omega_{er} t] \mathbf{r}.\hat{\mathbf{u}} \, \mathbf{r}.\hat{\mathbf{v}} \, u' v' - \right.\right.\right.$$
$$2\, \mathbf{r}.\hat{\mathbf{u}}\, \mathbf{r}.\hat{\mathbf{w}} \sin[\omega_{er} t] \, u' v' +$$
$$\cos[\omega_{er} t]^2 (\mathbf{r}.\hat{\mathbf{v}})^2 (v')^2 -$$
$$2\cos[\omega_{er} t] \, \mathbf{r}.\hat{\mathbf{v}}\, \mathbf{r}.\hat{\mathbf{w}} \sin[\omega_{er} t] (v')^2 + (\mathbf{r}.\hat{\mathbf{w}})^2 \sin[\omega_{er} t]^2 (v')^2 -$$
$$2\cos[\omega_{er} t]\, \mathbf{r}.\hat{\mathbf{u}}\, \mathbf{r}.\hat{\mathbf{w}} \, u' w' +$$
$$2\, \mathbf{r}.\hat{\mathbf{u}}\, \mathbf{r}.\hat{\mathbf{v}} \sin[\omega_{er} t]\, u' w' + 2\cos[\omega_{er} t]^2 \mathbf{r}.\hat{\mathbf{v}}\, \mathbf{r}.\hat{\mathbf{w}}\, v' w' +$$
$$2\cos[\omega_{er} t](\mathbf{r}.\hat{\mathbf{v}})^2 \sin[\omega_{er} t]\, v' w' - 2\cos[\omega_{er} t](\mathbf{r}.\hat{\mathbf{w}})^2 \sin[\omega_{er} t]\, v' w' -$$
$$2\, \mathbf{r}.\hat{\mathbf{v}}\, \mathbf{r}.\hat{\mathbf{w}} \sin[\omega_{er} t]^2 v' w' + \cos[\omega_{er} t]^2 (\mathbf{r}.\hat{\mathbf{w}})^2 (w')^2 +$$
$$2\cos[\omega_{er} t]\, \mathbf{r}.\hat{\mathbf{v}}\, \mathbf{r}.\hat{\mathbf{w}} \sin[\omega_{er} t] (w')^2 + (\mathbf{r}.\hat{\mathbf{v}})^2 \sin[\omega_{er} t]^2 (w')^2 \Big) -$$
$$\left.\left. r^2 \left( (u')^2 + (v')^2 + (w')^2 \right) \right)\right) dm'[\mathbf{r'}]$$

Remembering to cancel terms do not contribute because the origin is at the center of gravity $$G \int \frac{1}{r} P_2[\mathbf{r},\mathbf{r'}] \, dm'[\mathbf{r'}] =$$
$$G \int \frac{1}{r} \left( \frac{1}{2r^4} \left( 3 \left( (\mathbf{r}.\hat{\mathbf{u}})^2 (u')^2 + \cos[\omega_{er} t]^2 (\mathbf{r}.\hat{\mathbf{v}})^2 (v')^2 - \right.\right.\right.$$
$$2\cos[\omega_{er} t]\, \mathbf{r}.\hat{\mathbf{v}}\, \mathbf{r}.\hat{\mathbf{w}} \sin[\omega_{er} t] (v')^2 +$$
$$(\mathbf{r}.\hat{\mathbf{w}})^2 \sin[\omega_{er} t]^2 (v')^2 + \cos[\omega_{er} t]^2 (\mathbf{r}.\hat{\mathbf{w}})^2 (w')^2 +$$
$$2\cos[\omega_{er} t]\, \mathbf{r}.\hat{\mathbf{v}}\, \mathbf{r}.\hat{\mathbf{w}} \sin[\omega_{er} t] (w')^2 + (\mathbf{r}.\hat{\mathbf{v}})^2 \sin[\omega_{er} t]^2 (w')^2 \Big) -$$
$$\left.\left. r^2 \left( (u')^2 + (v')^2 + (w')^2 \right) \right)\right) dm'[\mathbf{r'}]$$

*18 | OrbitCalculationsRewritePatentHomeLaptop38.nb*

Remembering to cancel terms involving integrals of $(v')^2$ and $(w')^2$ are equal because of axial symmetry $$G \int \frac{1}{r} P_2[\mathbf{r}, \mathbf{r}'] \, dm'[\mathbf{r}'] =$$

$$G \int \frac{1}{r} \left( \frac{1}{2r^4} \left( 3 \left( (\mathbf{r}.\hat{\mathbf{u}})^2 (u')^2 + \text{Cos}[\omega_{er} t]^2 (\mathbf{r}.\hat{\mathbf{v}})^2 (v')^2 + (\mathbf{r}.\hat{\mathbf{w}})^2 \text{Sin}[\omega_{er} t]^2 (v')^2 + \text{Cos}[\omega_{er} t]^2 (\mathbf{r}.\hat{\mathbf{w}})^2 (w')^2 + (\mathbf{r}.\hat{\mathbf{v}})^2 \text{Sin}[\omega_{er} t]^2 (w')^2 \right) - r^2 \left( (u')^2 + (v')^2 + (w')^2 \right) \right) \right) dm'[\mathbf{r}']$$

Substituting $(v')^2$ by $(w')^2$ $$G \int \frac{1}{r} P_2[\mathbf{r}, \mathbf{r}'] \, dm'[\mathbf{r}'] =$$

$$G \int \frac{1}{r} \left( \frac{1}{2r^4} \left( 3 \left( (\mathbf{r}.\hat{\mathbf{u}})^2 (u')^2 + \text{Cos}[\omega_{er} t]^2 (\mathbf{r}.\hat{\mathbf{v}})^2 (w')^2 + (\mathbf{r}.\hat{\mathbf{w}})^2 \text{Sin}[\omega_{er} t]^2 (w')^2 + \text{Cos}[\omega_{er} t]^2 (\mathbf{r}.\hat{\mathbf{w}})^2 (w')^2 + (\mathbf{r}.\hat{\mathbf{v}})^2 \text{Sin}[\omega_{er} t]^2 (w')^2 \right) - r^2 \left( (u')^2 + 2(w')^2 \right) \right) \right) dm'[\mathbf{r}']$$

Simplifying the trig $$G \int \frac{1}{r} P_2[\mathbf{r}, \mathbf{r}'] \, dm'[\mathbf{r}'] =$$

$$G \int \frac{1}{r} \left( \frac{1}{2r^4} \left( 3 \left( (\mathbf{r}.\hat{\mathbf{u}})^2 (u')^2 + (\mathbf{r}.\hat{\mathbf{v}})^2 (w')^2 + (\mathbf{r}.\hat{\mathbf{w}})^2 (w')^2 \right) - r^2 \left( (u')^2 + 2(w')^2 \right) \right) \right) dm'[\mathbf{r}']$$

Using $$r^2 = \left( (\mathbf{r}.\hat{\mathbf{u}})^2 + (\mathbf{r}.\hat{\mathbf{v}})^2 + (\mathbf{r}.\hat{\mathbf{w}})^2 \right)$$

We get $$G \int \frac{1}{r} P_2[\mathbf{r}, \mathbf{r}'] \, dm'[\mathbf{r}'] =$$
$$G \int \frac{1}{r} \left( \frac{1}{2r^4} \left( 3\left((\mathbf{r}.\hat{\mathbf{u}})^2 (u')^2 + \left(r^2 - (\mathbf{r}.\hat{\mathbf{u}})^2\right) (w')^2\right) - r^2 \left((u')^2 + 2(w')^2\right) \right) \right) dm'[\mathbf{r}']$$

Distributing we get $$G \int \frac{1}{r} P_2[\mathbf{r}, \mathbf{r}'] \, dm'[\mathbf{r}'] =$$
$$G \int \frac{1}{r} \left( \frac{1}{2r^4} \left( 3(\mathbf{r}.\hat{\mathbf{u}})^2 (u')^2 + 3r^2 (w')^2 - 3(\mathbf{r}.\hat{\mathbf{u}})^2 (w')^2 - r^2 (u')^2 - 2r^2 (w')^2 \right) \right) dm'[\mathbf{r}']$$

Simplifying we get $$G \int \frac{1}{r} P_2[\mathbf{r}, \mathbf{r}'] \, dm'[\mathbf{r}'] =$$
$$G \int \frac{1}{r} \left( \frac{1}{2r^4} \left( 3(\mathbf{r}.\hat{\mathbf{u}})^2 (u')^2 + r^2 (w')^2 - 3(\mathbf{r}.\hat{\mathbf{u}})^2 (w')^2 - r^2 (u')^2 \right) \right) dm'[\mathbf{r}']$$

Factoring we get $$G \int \frac{1}{r} P_2[\mathbf{r}, \mathbf{r}'] \, dm'[\mathbf{r}'] =$$
$$G \int \frac{1}{r} \left( \frac{1}{2r^4} \left(3(\mathbf{r}.\hat{\mathbf{u}})^2 - r^2\right) \left((u')^2 - (w')^2\right) \right) dm'[\mathbf{r}']$$

Factoring terms independent of r'

$$G \int \frac{1}{r} P_2[\mathbf{r}, \mathbf{r}'] \, dm'[\mathbf{r}'] =$$
$$\frac{G}{2r^5} \left(3(\mathbf{r}.\hat{\mathbf{u}})^2 - r^2\right) \int \left((u')^2 - (w')^2\right) dm'[\mathbf{r}']$$

But $$\int (u')^2 \, dm'[\mathbf{r}'] = I_1$$

the polar moment of inertia $$\int (v')^2 \, dm'[\mathbf{r}'] = I_2$$

$$\int (w')^2 \, dm'[\mathbf{r}'] = I_3$$

the equatorial moments of inertia. Thus $$G \int \frac{1}{r} P_2[\mathbf{r}, \mathbf{r}'] \, dm'[\mathbf{r}'] = \frac{G}{2r^5} \left(3(\mathbf{r} \cdot \hat{\mathbf{u}})^2 - r^2\right)(I_1 - I_3)$$

Note $I_2 = I_3$ because of axial symmetry

We can rearrange using $$\mathbf{r} = r\hat{\mathbf{r}}$$

to get $$G \int \frac{1}{r} P_2[\mathbf{r}, \mathbf{r}'] \, dm'[\mathbf{r}'] =$$

$$\frac{G}{2r^5}(I_1 - I_2)\left(3(\mathbf{r} \cdot \hat{\mathbf{u}})^2 - r^2\right) =$$

$$\frac{GM}{r}\left(\frac{R}{r}\right)^2 \left(\frac{(I_1 - I_2)}{MR^2}\right)\left(\frac{1}{2}\left(3(\hat{\mathbf{r}} \cdot \hat{\mathbf{u}})^2 - 1\right)\right) =$$

$$\frac{GM}{r}\left(\frac{R}{r}\right)^2 J_2 P_2[\hat{\mathbf{r}}, \hat{\mathbf{u}}]$$

where $$J_2 = \left(\frac{(I_1 - I_2)}{MR^2}\right)$$

Given axial symmetry, we can express $J_2$ as above, where $J_2$ has the usual definitions.

The details of the multipole expansion for an axially symmetric body can be found in Ref 1. Assuming the body is axial symmetric, a multipole expansion formula for $\phi[r]$, independent of coordinate system is $$\phi[\mathbf{r}] = \frac{-(MG)}{r}\left(1 - \sum_{n=2}^{\infty} J_n \left(\frac{R}{r}\right)^n P_n[\hat{\mathbf{r}}, \mathbf{u}]\right)$$

where $J_n$ are constant coefficients, that can be determined empirically, from the trajectories of currently orbiting satellites. $P_n$ is the Legendre polynomial of order n and parameter $\hat{r} \cdot u$. R is the equatorial radius. For the earth, the first few values of $J_n$ are displayed below $$J_2 = 1.083 \times 10^{-3}$$
$$J_3 = -2.5 \times 10^{-6}$$
$$J_4 = -1.6 \times 10^{-6}$$
$$J_5 = -0.2 \times 10^{-6}$$

Such an expansion is then used to calculate the orbits of satellites orbiting round the earth, assuming the earth is axially symmetric, and rotates about its axis of symmetry.

A more accurate description of the gravitional field is obtained by evaluating the effects due to all the deviations from spherical symmetry. A formula for the earth's potential V, taking all the deviations of the earth from spherical symmetry into account, can be found in Ref 3, and is represented by a spherical harmonic multipole expansion $$V = \frac{\mu}{r}\left(1 - \sum_{n=2}^{\infty}\left(\frac{a_E}{r}\right)^n J_n P_n[\sin[\theta]] - \sum_{n=2}^{\infty}\sum_{m=1}^{n}\left(\frac{a_E}{r}\right)^n (J_{n,n}\cos[m\lambda] + K_{n,m}\sin[m\lambda]) P_n[\sin[\theta]]\right)$$

where $a_E$ is the semi-major axis of the earth, r is the geocentric distance of the satellite, $\theta$ and $\lambda$ are the latitude and longitude. The $J_n$, $J_{n,m}$, and $K_{n,m}$ denote the zonal and tessaral coefficients of the harmonic development known as the earth model.

We derive, a multipole expansion, similar to the spherical harmonic expansion above, in that we do not assume axial symmetry of the body, but without needing to specify the coordinate system (such as spherical harmonic). It is therefore, valid for bodies that are not axially symmetric. This multipole expansion differs from the multipole expansion found in reference 1.

22 | OrbitCalculationsRewritePatentHomeLaptop38.nb

The quaternion implementation of the solution to Kepler's equation for predicting orbits is transformed into finding the root by numerical means of an equation, as opposed to numerically solving a non linear differential equation. The quaternion implementation has therefore superior numerical accuracy.

Quaternions are a subalgebra of geometric algebra and it would be useful to describe the regularising method using geometric algebra. The solution to Kepler's equation in geometric algebra is developed in Ref 1, but only for axially symmetric bodies.

■ Calculation of $J_n$ where n >1 without Assuming Axial Symmetry

Now for the general case n. We need to calculate $$-G \int \frac{1}{r} P_n[\mathbf{r}, \mathbf{r}'] \, dm'[\mathbf{r}']$$

Substituting for $P_n$ we have $$-G \int \frac{1}{r} P_n[\mathbf{r}, \mathbf{r}'] \, dm'[\mathbf{r}'] =$$

$$-G \int \frac{1}{r} \sum_{k=0}^{\text{Floor}[\frac{n}{2}]} \left(-\frac{1}{2} C_{n-k}\right) * ((n-k) C_{n-2k}) * \frac{(-2\mathbf{r}.\mathbf{r}')^{n-2k} (r')^{2k}}{r^{2(n-k)}} \, dm'[\mathbf{r}']$$

Distributing the integral we get $$-G \int \frac{1}{r} P_n[\mathbf{r}, \mathbf{r}'] \, dm'[\mathbf{r}'] =$$

$$-G \sum_{k=0}^{\text{Floor}[\frac{n}{2}]} \left(-\frac{1}{2} C_{n-k}\right) * ((n-k) C_{n-2k}) * \frac{1}{r^{2(n-k)+1}}$$

$$\int (-2\mathbf{r}.\mathbf{r}')^{n-2k} (r')^{2k} \, dm'[\mathbf{r}']$$

Using vectors $r\hat{\mathbf{r}}$, $r'\hat{\mathbf{r}}'$ for r, and r', where $\hat{\mathbf{r}}$, $\hat{\mathbf{r}}'$ are unit vectors we get $$-G \int \frac{1}{r} P_n[\mathbf{r}, \mathbf{r}'] \, dm'[\mathbf{r}'] =$$

$$-G \sum_{k=0}^{\text{Floor}\left[\frac{n}{2}\right]} \left(-\frac{1}{2} C_{n-k}\right) * ((n-k) C_{n-2k}) *$$

$$\frac{1}{r^{2(n-k)-1}}$$

$$\int \left(-2\, \hat{\mathbf{r}} \cdot \hat{\mathbf{r}}'\right)^{n-2k} (r\, r')^{n-2k} (r')^{2k} dm'[\mathbf{r}']$$

Simplifying $$-G \int \frac{1}{r} P_n[\mathbf{r}, \mathbf{r}']\, dm'[\mathbf{r}'] =$$

$$-G \sum_{k=0}^{\text{Floor}\left[\frac{n}{2}\right]} \left(-\frac{1}{2} C_{n-k}\right) * ((n-k) C_{n-2k}) *$$

$$\frac{1}{r^{2(n-k)+1-(n-2k)}}$$

$$\int \left(-2\, \hat{\mathbf{r}} \cdot \hat{\mathbf{r}}'\right)^{n-2k} r'^{n-2k} (r')^{2k} dm'[\mathbf{r}']$$

Expressing the terms involving r' and r a power of $\frac{r'}{r}$ $$-G \int \frac{1}{r} P_n[\mathbf{r}, \mathbf{r}']\, dm'[\mathbf{r}'] =$$

$$-\frac{G}{r} \sum_{k=0}^{\text{Floor}\left[\frac{n}{2}\right]} \left(-\frac{1}{2} C_{n-k}\right) * ((n-k) C_{n-2k}) *$$

$$\int \left(-2\, \hat{\mathbf{r}} \cdot \hat{\mathbf{r}}'\right)^{n-2k} \left(\frac{r'}{r}\right)^{n} dm'[\mathbf{r}']$$

As in the previous section, let $\hat{u}$ be a unit vector in the direction of the axis of rotation. Let $\hat{v}$ and $\hat{w}$ represent unit vectors orthogonal to $\hat{u}$ and orthogonal to each other. Then We can express r' as $$\hat{\mathbf{r}}' = u'\, \hat{\mathbf{u}}' + v'\, \hat{\mathbf{v}}' + w'\, \hat{\mathbf{w}}'$$

by choosing to express $\hat{r}'$ in terms of an axis that is rotating with the earth and we have $$\hat{\mathbf{u}} = \hat{\mathbf{u}}', \quad \hat{\mathbf{v}} = \hat{\mathbf{v}}'\, \text{Cos}[\omega_{er}\, t] - \hat{\mathbf{w}}'\, \text{Sin}[\omega_{er}\, t],$$

$$\hat{\mathbf{w}} = \hat{\mathbf{v}}'\, \text{Sin}[\omega_{er}\, t] + \hat{\mathbf{w}}'\, \text{Cos}[\omega_{er}\, t]$$

And

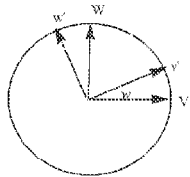

$$\hat{r} = (u\hat{u} + v\hat{v} + w\hat{w}) = (\hat{r}\cdot\hat{u})\hat{u} + (\hat{r}\cdot\hat{v})\hat{v} + (\hat{r}\cdot\hat{w})\hat{w}$$

And $$\hat{r}' = (u'\hat{u} + v'(\hat{v}\cos[\omega_{er}t] + \hat{w}\sin[\omega_{er}t]) + w'(-\hat{v}\sin[\omega_{er}t] + \hat{w}\cos[\omega_{er}t])) =$$
$$(u'\hat{u}' + (\cos[\omega_{er}t]v' - \sin[\omega_{er}t]w')\hat{v}' + (\sin[\omega_{er}t]v' + \cos[\omega_{er}t]w')\hat{w}')$$

$$\hat{r}\cdot\hat{r}' = (uu' + v(\cos[\omega_{er}t]v' + \sin[\omega_{er}t]w') + w(-\sin[\omega_{er}t]v' + \cos[\omega_{er}t]w'))$$

Then substituting r.r' and factoring $\left(\frac{1}{r}\right)^n$ we get $$-G\int\frac{1}{r}P_n[r,r']\,dm'[r'] =$$
$$-\frac{G}{r}\sum_{k=0}^{\text{Floor}[\frac{n}{2}]}\left(-\frac{1}{2}C_{n-k}\right)*((n-k)C_{n-2k})*(-2)^{n-2k}\left(\frac{1}{r}\right)^n *$$
$$\int((uu' + v(\cos[\omega_{er}t]v' + \sin[\omega_{er}t]w') + w(-\sin[\omega_{er}t]v' + \cos[\omega_{er}t]w'))^{n-2k}$$
$$(r')^n\,dm'[r']$$

Then substituting the values of u,v and w we get $$G \int \frac{1}{r} P_n[\mathbf{r}, \mathbf{r}'] \, dm'[\mathbf{r}'] =$$

$$-\frac{G}{r} \sum_{k=0}^{\text{Floor}[\frac{n}{2}]} \left(-\frac{1}{2} C_{n-k}\right) * ((n-k) \, C_{n-2k}) * (-2)^{n-2k} \left(\frac{1}{r}\right)^n *$$

$$\int ((\, (\hat{\mathbf{r}} \cdot \hat{\mathbf{u}}) \, u' +$$
$$(\hat{\mathbf{r}} \cdot \hat{\mathbf{v}}) \, (\cos[\omega_{er} t] \, v' + \sin[\omega_{er} t] \, w') +$$
$$(\hat{\mathbf{r}} \cdot \hat{\mathbf{w}}) \, (-\sin[\omega_{er} t] \, v' + \cos[\omega_{er} t] \, w'))^{n-2k}$$
$$(r')^n \, dm'[\mathbf{r}']$$

Expanding the expression raised to the power n-2k, we get $$-G \int \frac{1}{r} P_n[\mathbf{r}, \mathbf{r}'] \, dm'[\mathbf{r}'] =$$

$$-\frac{G}{r} \sum_{k=0}^{\text{Floor}[\frac{n}{2}]} \left(-\frac{1}{2} C_{n\,k}\right) * ((n-k) \, C_{n\,2k}) * (-2)^{n-2k} \left(\frac{1}{r}\right)^n *$$

$$\int \left( \sum_{i=0}^{n-2k} \sum_{j=0}^{i} ((n-2k) \, C_i * i C_j \, ((\hat{\mathbf{r}} \cdot \hat{\mathbf{u}}) \, u')^{n-2k-i} *\right.$$
$$((\hat{\mathbf{r}} \cdot \hat{\mathbf{v}}) \, (\cos[\omega_{er} t] \, v' + \sin[\omega_{er} t] \, w'))^{i-j} *$$
$$((\hat{\mathbf{r}} \cdot \hat{\mathbf{w}})$$
$$\left. (-\sin[\omega_{er} t] \, v' + \cos[\omega_{er} t] \, w'))^{j} \right) (r')^n \, dm'[\mathbf{r}']$$

But $$(\hat{\mathbf{r}}' \cdot \hat{\mathbf{u}}' = u') \wedge (\hat{\mathbf{r}}' \cdot \hat{\mathbf{v}}' = v') \wedge (\hat{\mathbf{r}}' \cdot \hat{\mathbf{w}}' = w')$$

Factoring and distributing, and interchanging the order of summation with integration, we get $$-G \int \frac{1}{r} P_n[r, r'] \, dm'[\mathbf{r}'] =$$

$$-\frac{G}{r} \sum_{k=0}^{\text{Floor}[\frac{n}{2}]} \sum_{i=0}^{n-2k} \sum_{j=0}^{i} \left(-\frac{1}{2} C_{n-k}\right) * ((n-k) \, C_{n-2k}) * (n-2k) \, C_i * i C_j *$$

$$(-2)^{n-2k} \left(\frac{1}{r}\right)^n \left( \left( (\hat{\mathbf{r}} \cdot \hat{\mathbf{u}})^{n-2k-i} (\hat{\mathbf{r}} \cdot \hat{\mathbf{v}})^{i-j} (\hat{\mathbf{r}} \cdot \hat{\mathbf{w}})^{j} \right) *\right.$$

$$\int \left( (\hat{\mathbf{r}}' \cdot \hat{\mathbf{u}}')^{n-2k-i} \right.$$
$$\left( \cos[\omega_{cr} t] (\hat{\mathbf{r}}' \cdot \hat{\mathbf{v}}') + \sin[\omega_{cr} t] (\hat{\mathbf{r}}' \cdot \hat{\mathbf{w}}') \right)^{i-j} *$$
$$\left( -\sin[\omega_{er} t] (\hat{\mathbf{r}}' \cdot \hat{\mathbf{v}}') + \right.$$
$$\left. \cos[\omega_{er} t] (\hat{\mathbf{r}}' \cdot \hat{\mathbf{w}}') \right)^{j} \bigg) (r')^n \, dm'[\mathbf{r}']$$

Expanding, we get $$-G \int \frac{1}{r} P_n[r, r'] \, dm'[\mathbf{r}'] =$$

$$-\frac{G}{r} \sum_{k[1]=0}^{\text{Floor}\frac{n}{2}} \sum_{i=0}^{n-2k[1]} \sum_{j=0}^{i} \left( -\frac{1}{2} C_{n \, k[1]} \right) *$$

$$((n-k[1]) C_{n-2k[1]}) * (n-2k[1]) C_i * iC_j *$$

$$(-2)^{n-2k[1]} \left( \frac{r'}{r} \right)^n \left( \left( (\hat{\mathbf{r}} \cdot \hat{\mathbf{u}})^{n-2k[1]-i} (\hat{\mathbf{r}} \cdot \hat{\mathbf{v}})^{i-j} (\hat{\mathbf{r}} \cdot \hat{\mathbf{w}})^{j} \right) *$$

$$\int \left( (\hat{\mathbf{r}}' \cdot \hat{\mathbf{u}}')^{n-2k[1]-i} * \right.$$

$$\left( \sum_{k[2]=0}^{i-j} (i-j) C_{k[2]} (\cos[\omega_{er} t] (\hat{\mathbf{r}}' \cdot \hat{\mathbf{v}}'))^{i-j-k[2]} * \right.$$

$$\left. (\sin[\omega_{er} t] (\hat{\mathbf{r}}' \cdot \hat{\mathbf{w}}'))^{k[2]} \right) *$$

$$\left( \sum_{k[3]=0}^{j} jC_{k[3]} (-\sin[\omega_{er} t] (\hat{\mathbf{r}}' \cdot \hat{\mathbf{v}}'))^{j-k[3]} * \right.$$

$$\left. (\cos[\omega_{er} t] (\hat{\mathbf{r}}' \cdot \hat{\mathbf{w}}'))^{k[3]} \right) \bigg) (r')^n \, dm'[\mathbf{r}']$$

Distributing $$-G \int \frac{1}{r} P_n[r, r'] \, dm'[\mathbf{r}'] =$$

$$-\frac{G}{r} \sum_{k[1]=0}^{\text{Floor}[\frac{n}{2}]} \sum_{i=0}^{n-2k[1]} \sum_{j=0}^{i} \left( -\frac{1}{2} C_{n-k[1]} \right) *$$

$$((n-k[1]) C_{n-2k[1]}) * (n-2k[1]) C_i * iC_j *$$

$$(-2)^{n-2k[1]} \left( \frac{r'}{r} \right)^n \left( \left( (\hat{\mathbf{r}} \cdot \hat{\mathbf{u}})^{n-2k[1]-i} (\hat{\mathbf{r}} \cdot \hat{\mathbf{v}})^{i-j} (\hat{\mathbf{r}} \cdot \hat{\mathbf{w}})^{j} \right) *$$

$$\int \left( (\hat{\mathbf{r}}' \cdot \hat{\mathbf{u}}')^{n-2k[1]-i} \right. *$$

$$\left( \sum_{k[2]=0}^{i-j} (i-j) C_{k[2]} (\cos[\omega_{er} t] (\hat{\mathbf{r}}' \cdot \hat{\mathbf{v}}'))^{i-j-k[2]} * \right.$$

$$(\sin[\omega_{er} t] (\hat{\mathbf{r}}' \cdot \hat{\mathbf{w}}'))^{k[2]} ) *$$

$$\left( \sum_{k[3]=0}^{j} jC_{k[3]} (-\sin[\omega_{er} t] (\hat{\mathbf{r}}' \cdot \hat{\mathbf{v}}'))^{j-k[3]} * \right.$$

$$\left. (\cos[\omega_{er} t] (\hat{\mathbf{r}}' \cdot \hat{\mathbf{w}}'))^{k[3]} ) \right) (r')^n dm'[\mathbf{r}']$$

Factoring under the integral sign $$-G \int \frac{1}{r} P_n[r, r'] \, dm'[\mathbf{r}'] =$$

$$-\frac{G}{r} \sum_{k[1]=0}^{\text{Floor}[\frac{n}{2}]} \sum_{i=0}^{n-2k[1]} \sum_{j=0}^{i} \left( -\frac{1}{2} C_{n-k[1]} \right) *$$

$$((n-k[1]) C_{n-2k[1]}) * (n-2k[1]) C_i * iC_j *$$

$$(-2)^{n-2k[1]} \left( \frac{r}{r} \right)^n \left( ((\hat{\mathbf{r}} \cdot \hat{\mathbf{u}})^{n-2k[1]-i} (\hat{\mathbf{r}} \cdot \hat{\mathbf{v}})^{i-j} (\hat{\mathbf{r}} \cdot \hat{\mathbf{w}})^j \right) *$$

$$\left( \left( \sum_{k[2]=0}^{i-j} (i-j) \right. \right.$$

$$\left. C_{k[2]} (\cos[\omega_{er} t])^{i-j-k[2]} (\sin[\omega_{er} t])^{k[2]} \right) *$$

$$\left( \sum_{k[3]=0}^{j} jC_{k[3]} (-\sin[\omega_{er} t])^{j-k[3]} (\cos[\omega_{er} t])^{k[3]} \right) \right) *$$

$$\int \left( (\hat{\mathbf{r}}' \cdot \hat{\mathbf{u}}')^{n-2k[1]-i} (\hat{\mathbf{r}}' \cdot \hat{\mathbf{v}}')^{i-j-k[2]} (\hat{\mathbf{r}}' \cdot \hat{\mathbf{w}}')^{k[2]} \right) *$$

$$\left( (\hat{\mathbf{r}}' \cdot \hat{\mathbf{v}}')^{j-k[3]} (\hat{\mathbf{r}}' \cdot \hat{\mathbf{w}}')^{k[3]} \right)$$

$$(r')^n dm'[\mathbf{r}']$$

Factoring under the integral sign $$-G \int \frac{1}{r} P_n[r, r'] \, dm'[r'] =$$

$$-\frac{G}{r} \sum_{k[1]=0}^{\text{Floor}[\frac{n}{2}]} \sum_{i=0}^{n-2k[1]} \sum_{j=0}^{i} \left(-\frac{1}{2} C_{n-k[1]}\right) *$$

$$((n-k) \, C_{n-2k[1]}) * (n-2k[1]) \, C_i * iC_j *$$

$$(-2)^{n-2k[1]} \left(\frac{1}{r}\right)^n \left(\left((\hat{r} \cdot \hat{u})^{n-2k[1]-i} (\hat{r} \cdot \hat{v})^{i-j} (\hat{r} \cdot \hat{w})^{j}\right) *\right.$$

$$\left(\left(\sum_{k[2]=0}^{i-j} (i-j)\right.\right.$$

$$\left.\left.C_{k[2]} \, (\text{Cos}[\omega_{er} t])^{i-j-k[2]} \, (\text{Sin}[\omega_{er} t])^{k[2]}\right) *\right.$$

$$\left(\sum_{k[3]=0}^{j} jC_{k[3]}\right.$$

$$\left.\left.(\text{Sin}[\omega_{er} t])^{j-k[3]} \, (\text{Cos}[\omega_{er} t])^{k[3]}\right)\right) *$$

$$\int \left((\hat{r}' \cdot \hat{u}')^{n-2k[1]-i}\right.$$

$$(\hat{r}' \cdot \hat{v}')^{i-j-k[2]} \, (\hat{r}' \cdot \hat{w}')^{k[2]}) *$$

$$\left((\hat{r}' \cdot \hat{v}')^{j-k[3]} \, (\hat{r}' \cdot \hat{w}')^{k[3]}\right)$$

$$(r')^n \, dm'[r']$$

Simplifying we get $$-G \int \frac{1}{r} P_n[r, r'] \, dm'[r'] =$$

$$-\frac{G}{r} \sum_{k[1]=0}^{\text{Floor}[\frac{n}{2}]} \sum_{i=0}^{n-2k[1]} \sum_{j=0}^{i} \sum_{k[2]=0}^{i-j} \sum_{k[3]=0}^{j} \left(-\frac{1}{2} C_{n-k[1]}\right) *$$

$$((n-k[1]) \, C_{n-2k[1]}) * (n-2k[1]) \, C_i * iC_j *$$

$$(i-j) \, C_{k[2]} * jC_{k[3]} *$$

$$\left(\frac{1}{r}\right)^n \left(\left((\hat{r}\cdot\hat{u})^{n-2k[1]-i}(\hat{r}\cdot\hat{v})^{i-j}(\hat{r}\cdot\hat{w})^j\right)\ast\right.$$

$$\left((\cos[\omega_{er}t])^{i-j-k[2]+k[3]}\right.$$

$$\left.\left.(\sin[\omega_{er}t])^{j-k[2]-k[3]}\right)\right)\ast$$

$$\int\left((\hat{r}'\cdot\hat{u}')^{n-2k[1]-i}(\hat{r}'\cdot\hat{v}')^{i-(k[2]+k[3])}\ast\right.$$

$$\left.(\hat{r}'\cdot\hat{w}')^{k[2]+k[3]}\right)(r')^n\,dm'[\mathbf{r}']$$

But $$\int\left((\hat{r}'\cdot\hat{u}')^{n-2k[1]-i}(\hat{r}'\cdot\hat{v}')^{i-(k[2]+k[3])}\ast\right.$$

$$\left.(\hat{r}'\cdot\hat{w}')^{(k[2]+k[3])}\right)(r')^n\,dm'[\mathbf{r}']$$

depends on the shape of the body and the coordinate system, $\hat{u}'$, $\hat{v}'$, $\hat{w}'$ used, and the shape of a rigid body is constant. Therefore, the integral depends only on the coordinate system, $\hat{u}'$, $\hat{v}'$, $\hat{w}'$ used. Putting the appropriate and usual scaling factors, let $$J[n][p,q,r][\hat{u}',\hat{v}',\hat{w}'] =$$

$$\frac{1}{MR^n}$$

$$\left(\int\left((\hat{r}'\cdot\hat{u}')^p(\hat{r}'\cdot\hat{v}')^q(\hat{r}'\cdot\hat{w}')^r\right)(r')^n\,dm'[\mathbf{r}']\right)$$

where R is the radius of the earth.

Substituting we get $$-G\int\frac{1}{r}P_n[r,r']\,dm'[\mathbf{r}'] =$$

$$-\frac{GM}{r}\sum_{k[1]=0}^{\text{Floor}\left|\frac{n}{2}\right|}\sum_{i=0}^{n-2k[1]}\sum_{j=0}^{i}\sum_{k[2]=0}^{i-j}\sum_{k[3]=0}^{j}\left(-\frac{1}{2}C_{n-k[1]}\right)\ast$$

$$((n-k[1])C_{n-2k[1]})\ast(n-2k[1])C_i\ast$$

$$iC_j\ast(i-j)C_{k[2]}\ast jC_{k[3]}\ast$$

$$(-2)^{n-2k[1]}(-1)^{j-k[3]}\left(\frac{R}{r}\right)^n((\,$$

$$(\hat{\mathbf{r}} \cdot \hat{\mathbf{u}})^{n-2k[1]-i} (\hat{\mathbf{r}} \cdot \hat{\mathbf{v}})^{i-j} (\hat{\mathbf{r}} \cdot \hat{\mathbf{w}})^{j} \ast$$
$$\left((\cos[\omega_{er} t])^{i-j-k[2]+k[3]} (\sin[\omega_{er} t])^{j-k[2]-k[3]}\right) \ast$$
$$J[n][n-2k[1]-i, i-(k[2]+k[3]), k[2]+k[3]][\hat{\mathbf{u}}', \hat{\mathbf{v}}', \hat{\mathbf{w}}']$$

Thus for the earth we have for the nth term of the multipole expansion $$-G \int \frac{1}{r} P_n[r, r'] \, dm'[\mathbf{r}'] =$$

$$-\frac{GM}{r} \sum_{k[1]=0}^{\text{Floor}[\frac{n}{2}]} \sum_{i=0}^{n-2k[1]} \sum_{j=0}^{i} \sum_{k[2]=0}^{i-j} \sum_{k[3]=0}^{j} \left(-\frac{1}{2} C_{n-k[1]}\right) \ast$$

$$((n-k[1]) C_{n-2k[1]}) \ast (n-2k) C_i \ast$$
$$iC_j \ast (i-j) C_{k[2]} \ast jC_{k[3]} \ast$$
$$(-2)^{n-2k[1]} (-1)^{k[2]} \left(\frac{R}{r}\right)^n ((\phantom{x}$$
$$(\hat{\mathbf{r}} \cdot \hat{\mathbf{u}})^{n-2k[1]-i} (\hat{\mathbf{r}} \cdot \hat{\mathbf{v}})^{i-j} (\hat{\mathbf{r}} \cdot \hat{\mathbf{w}})^{j} \ast$$
$$\left((\cos[\omega_{er} t])^{i-j-k[2]+k[3]} (\sin[\omega_{er} t])^{j-k[2]-k[3]}\right) \ast$$
$$J[n][n-2k[1]-i, i-(k[2]+k[3]), k[2]+k[3]][\hat{\mathbf{u}}', \hat{\mathbf{v}}', \hat{\mathbf{w}}'] \quad (9)$$

Note that $J[n][p, q, r][\hat{\mathbf{u}}', \hat{\mathbf{v}}', \hat{\mathbf{w}}']$, are functions of the unit vectors $\hat{\mathbf{u}}'$, $\hat{\mathbf{v}}'$, $\hat{\mathbf{w}}'$, and for a particular coordinate system for each p,q, and r, the value of $J[n][p, q, r][\hat{\mathbf{u}}', \hat{\mathbf{v}}', \hat{\mathbf{w}}']$ can be determined empirically for the earth, given the trajectories of orbiting satellites.

We note that we have arrived at the expression to use when we do not wish to assume axial symmetry.

We write a small program to calculate the first few terms of the multipole expansion. Note that this calculation needs to be done only occassionaly, and so we do not try to optimise the calculation.

```
MultipoleExpansionTerms[n_] :=
  Sum[
    Sum[
      Sum[
        Sum[
          Sum[- (G M)/r Binomial[-1/2, n - k[1]] * Binomial[n - k[1],
            n - 2 k[1]] * Binomial[n - 2 k[1], i] * Binomial[i, j] *
            Binomial[(i - j), k[2]] * Binomial[j, k[3]] *
            (-2)^(n-2 k[1]) * (-1)^(j-k[3]) (R/r)^n (r̂ . û)^(n-2 k[1] -i) (r̂ . v̂)^(i-j)
            (r̂ . ŵ)^j * ((Cos[ω_er t])^(i-j-k[2]+k[3]) (Sin[ω_er t])^(j+k[2]-k[3])) *
            J[n][n - 2 k[1] - i, i - (k[2] + k[3]),
            k[2] + k[3]][û, v̂, ŵ],
          {k[3], 0, j}],
        {k[2], 0, i - j}],
      {j, 0, i}],
    {i, 0, n - 2 k[1]}],
  {k[1], 0, Floor[n/2]}];
J[n_][x_, y_, 1][û, v̂, ŵ] := 0
J[n_][x_, 1, z_][û, v̂, ŵ] := 0
J[n_][1, y_, z_][û, v̂, ŵ] := 0
MultipoleExpansionTerms[1]
0
```

32 | OrbitCalculationsRewritePatentHomeLaptop38.nb

MultipoleExpansionTerms[2]

$$\frac{G M R^2 J[2][0, 0, 0][\hat{u}, \hat{v}, \hat{w}]}{2 r^3} -$$

$$\frac{3 G M R^2 \cos[t \omega_{er}]^2 (\hat{r}.\hat{w})^2 J[2][0, 0, 2][\hat{u}, \hat{v}, \hat{w}]}{2 r^3} -$$

$$\frac{3 G M R^2 \cos[t \omega_{er}] \hat{r}.\hat{v} \hat{r}.\hat{w} \sin[t \omega_{er}] J[2][0, 0, 2][\hat{u}, \hat{v}, \hat{w}]}{r^3} -$$

$$\frac{3 G M R^2 (\hat{r}.\hat{v})^2 \sin[t \omega_{er}]^2 J[2][0, 0, 2][\hat{u}, \hat{v}, \hat{w}]}{2 r^3} -$$

$$\frac{3 G M R^2 \cos[t \omega_{er}]^2 (\hat{r}.\hat{v})^2 J[2][0, 2, 0][\hat{u}, \hat{v}, \hat{w}]}{2 r^3} +$$

$$\frac{3 G M R^2 \cos[t \omega_{er}] \hat{r}.\hat{v} \hat{r}.\hat{w} \sin[t \omega_{er}] J[2][0, 2, 0][\hat{u}, \hat{v}, \hat{w}]}{r^3} -$$

$$\frac{3 G M R^2 (\hat{r}.\hat{w})^2 \sin[t \omega_{er}]^2 J[2][0, 2, 0][\hat{u}, \hat{v}, \hat{w}]}{2 r^3} -$$

$$\frac{3 G M R^2 (\hat{r}.\hat{u})^2 J[2][2, 0, 0][\hat{u}, \hat{v}, \hat{w}]}{2 r^3}$$

We check with Axial Symmetry

```
(MultipoleExpansionTerms[2] /.
    {(J[n_][p_, q_, r_][u_, v_, w_] /; r > q) →
        J[n][p, r, q][u, v, w]}) // Simplify
```

$$\frac{1}{2 r^3} G M R^2 \left( J[2][0, 0, 0][\hat{u}, \hat{v}, \hat{w}] - 3 \left( (\hat{r}.\hat{v})^2 J[2][0, 2, 0][\hat{u}, \hat{v}, \hat{w}] + (\hat{r}.\hat{w})^2 J[2][0, 2, 0][\hat{u}, \hat{v}, \hat{w}] + (\hat{r}.\hat{u})^2 J[2][2, 0, 0][\hat{u}, \hat{v}, \hat{w}] \right) \right)$$

MultipoleExpansionTerms[3]

We check with Axial Symmetry

```
(MultipoleExpansionTerms[3] /.
    {(J[n_][p_, q_, r_][u_, v_, w_] /; r > q) →
        J[n][p, r, q][u, v, w]}) // Simplify
```

```
MultipoleExpansionTerms[4]
(MultipoleExpansionTerms[4] /.
  {(J[n_][p_, q_, r_][u_, v_, w_] /; r > q) →
    J[n][p, r, q][u, v, w]}) // Simplify
```

Calculation of derivative of the nth term of Potential function $\phi[x, t]$, in terms of the new multipole expansion series We need to calculate the derivative of $$-G \int \frac{1}{r} P_n[r, r'] \, dm'[r'] =$$

$$-\frac{GM}{r} \sum_{k[1]=0}^{\text{Floor}[\frac{n}{2}]} \sum_{i=0}^{n-2k[1]} \sum_{j=0}^{i} \sum_{k[2]=0}^{i-j} \sum_{k[3]=0}^{j} \left(-\frac{1}{2} C_{n-k[1]}\right) *$$

$$((n - k[1]) C_{n\,2k[1]}) *$$
$$(n - 2 k[1]) \, {}_iC_j * (i - j) \, C_{k[2]} * j C_{k[3]} *$$
$$(-2)^{n-2k[1]} (-1)^{j-k[3]} \left(\frac{R}{r}\right)^n ((\,$$
$$(\hat{r}.\hat{u})^{n-2k[1]-i} (\hat{r}.\hat{v})^{i-j} (\hat{r}.\hat{w})^j) *$$
$$((\cos[\omega_{er} t])^{i-j-k[2]+k[3]}$$
$$(\sin[\omega_{er} t])^{j-k[2]-k[3]})) *$$
$$J[n][n - 2k[1] - i, i - (k[2] + k[3]), k[2] + k[3]][\hat{u}, \hat{v}, \hat{w}]$$

The nth multipole contribution to the force $\mathbf{f}$ is given by $$\partial_r \left(-G \int \frac{1}{r} P_n[r, r'] \, dm'[r']\right) =$$

$$\partial_r \left(-\frac{GM}{r} \sum_{k[1]=0}^{\text{Floor}[\frac{n}{2}]} \sum_{i=0}^{n-2k[1]} \sum_{j=0}^{i} \sum_{k[2]=0}^{i-j} \sum_{k[3]=0}^{j} \left(-\frac{1}{2} C_{n-k[1]}\right) * \right.$$

$$((n - k[1]) C_{n-2k[1]}) * (n - 2k) \, {}_iC_j * (i - j) \, C_{k[2]} * j C_{k[3]} *$$
$$(-2)^{n-2k[1]} (-1)^{j-k[3]}$$
$$\left(\frac{R}{r}\right)^n ((\,(\hat{r}.\hat{u})^{n-2k[1]-i} (\hat{r}.\hat{v})^{i-j} (\hat{r}.\hat{w})^j) *$$

$$\left(\left(\cos[\omega_{er} t]\right)^{i-j-k[2]+k[3]} \left(\sin[\omega_{er} t]\right)^{j-k[2]-k[3]}\right) *$$
$$J[n][n-2k[1]-i, i-(k[2]+k[3]), k[2]+k[3]][\hat{u}, \hat{v}, \hat{w}]) \tag{10}$$

We rearrange the terms that depend on r

$$\partial_{\mathbf{r}} \left(-G \int \frac{1}{r} P_n[r, r'] \, dm'[\mathbf{r}']\right) =$$

$$\partial_{\mathbf{r}} \left(-GM \sum_{k[1]=0}^{\text{Floor}[\frac{n}{2}]} \sum_{i=0}^{n-2k[1]} \sum_{j=0}^{i} \sum_{k[2]=0}^{i-j} \sum_{k[3]=0}^{j} \left(-\frac{1}{2} C_{n-k[1]}\right) * \right.$$
$$((n-k[1]) C_{n-2k[1]}) * (n-2k) C_i * iC_j *$$
$$(i-j) C_{k[2]} * jC_{k[3]} *$$
$$(-2)^{n-2k[1]} (-1)^{j-k[3]} R^n \left(\frac{1}{r}\right)^{n+1} ((\hat{\mathbf{r}} \cdot \hat{u})^{n-2k[1]-i} (\hat{\mathbf{r}} \cdot \hat{v})^{i-j} (\hat{\mathbf{r}} \cdot \hat{w})^j) *$$
$$\left(\left(\cos[\omega_{er} t]\right)^{i-j-k[2]+k[3]} \left(\sin[\omega_{er} t]\right)^{j-k[2]-k[3]}\right) *$$
$$J[n][n-2k[1]-i, i-(k[2]+k[3]), k[2]+k[3]][\hat{u}, \hat{v}, \hat{w}])$$

We factor out the terms that do not depend on r

$$\partial_{\mathbf{r}} \left(-G \int \frac{1}{r} P_n[r, r'] \, dm'[\mathbf{r}']\right) =$$

$$-GM \sum_{k[1]=0}^{\text{Floor}[\frac{n}{2}]} \sum_{i=0}^{n-2k[1]} \sum_{j=0}^{i} \sum_{k[2]=0}^{i-j} \sum_{k[3]=0}^{j} \left(-\frac{1}{2} C_{n-k[1]}\right) *$$
$$((n-k[1]) C_{n-2k[1]}) * (n-2k) C_i * iC_j *$$
$$(i-j) C_{k[2]} * jC_{k[3]} *$$
$$(-2)^{n-2k[1]} (-1)^{j-k[3]} R^n *$$
$$\left(\left(\cos[\omega_{er} t]\right)^{i-j-k[2]+k[3]} \left(\sin[\omega_{er} t]\right)^{j-k[2]-k[3]}\right) *$$
$$J[n][n-2k[1]-i, i-(k[2]+k[3]), k[2]+k[3]][\hat{u}, \hat{v}, \hat{w}] *$$

$$\partial_r\left(\left(\frac{1}{r}\right)^{n-1}\left((\hat{\mathbf{r}}\cdot\hat{\mathbf{u}})^{n-2k[1]-i}(\hat{\mathbf{r}}\cdot\hat{\mathbf{v}})^{i-j}(\hat{\mathbf{r}}\cdot\hat{\mathbf{w}})^j\right)\right)$$

We have to find the derivative of the following expression $$\partial_r\left(\left(\frac{1}{r}\right)^{n+1}(\hat{\mathbf{r}}\cdot\hat{\mathbf{u}})^{n-2k[1]-i}(\hat{\mathbf{r}}\cdot\hat{\mathbf{v}})^{i-j}(\hat{\mathbf{r}}\cdot\hat{\mathbf{w}})^j\right)$$

Replacing unit vector by $\mathbf{r}$ $$\partial_r\left(\left(\frac{1}{r}\right)^{n+1}\left(\frac{\mathbf{r}\cdot\hat{\mathbf{u}}}{r}\right)^{n-2k[1]-i}\left(\frac{\mathbf{r}\cdot\hat{\mathbf{v}}}{r}\right)^{i-j}\left(\frac{\mathbf{r}\cdot\hat{\mathbf{w}}}{r}\right)^j\right)$$

Simplifying $$\partial_r\left((r)^{-(n+1)-(n-2k[1]-i)-(i-j)-j}(\mathbf{r}\cdot\hat{\mathbf{u}})^{n-2k[1]-i}(\mathbf{r}\cdot\hat{\mathbf{v}})^{i-j}(\mathbf{r}\cdot\hat{\mathbf{w}})^j\right)$$

Simplifying $$\partial_r\left(r^{-(2(n-k[1])+1)}(\mathbf{r}\cdot\hat{\mathbf{u}})^{n-2k[1]-i}(\mathbf{r}\cdot\hat{\mathbf{v}})^{i-j}(\mathbf{r}\cdot\hat{\mathbf{w}})^j\right)$$

Using the results from Example 9

$$\partial_r\left(r^{-(2(n-k[1])+1)}(\mathbf{r}\cdot\hat{\mathbf{u}})^{n-2k[1]-i}(\mathbf{r}\cdot\hat{\mathbf{v}})^{i-j}(\mathbf{r}\cdot\hat{\mathbf{w}})^j\right) =$$

$$r^{-(n+2)}$$

$$\left((-(2(n-k[1])+1)\hat{\mathbf{r}})(\hat{\mathbf{r}}\cdot\hat{\mathbf{u}})^{n-2k[1]-i}(\hat{\mathbf{r}}\cdot\hat{\mathbf{v}})^{i-j}(\hat{\mathbf{r}}\cdot\hat{\mathbf{w}})^j + \right.$$

$$\left(\left((n-2k[1]-i)(\hat{\mathbf{r}}\cdot\hat{\mathbf{u}})^{n-2k[1]-i-1}\hat{\mathbf{u}}\right)(\hat{\mathbf{r}}\cdot\hat{\mathbf{v}})^{i-j}(\hat{\mathbf{r}}\cdot\hat{\mathbf{w}})^j\right) +$$

$$\left((\hat{\mathbf{r}}\cdot\hat{\mathbf{u}})^{n-2k[1]-i}\left((i-j)(\hat{\mathbf{r}}\cdot\hat{\mathbf{v}})^{i-j-1}\hat{\mathbf{v}}\right)(\hat{\mathbf{r}}\cdot\hat{\mathbf{w}})^j\right) +$$

$$\left.\left((\hat{\mathbf{r}}\cdot\hat{\mathbf{u}})^{n-2k[1]-i}(\hat{\mathbf{r}}\cdot\hat{\mathbf{v}})^{i-j}\left(j(\hat{\mathbf{r}}\cdot\hat{\mathbf{w}})^{j-1}\hat{\mathbf{w}}\right)\right)\right)$$

Thus $$\partial_r\left(-G\int\frac{1}{r}P_n[r,r']\,dm'[\mathbf{r}']\right) =$$

$$-GM\sum_{k[1]=0}^{\text{Floor}\left[\frac{n}{2}\right]}\sum_{i=0}^{n-2k[1]}\sum_{j=0}^{i}\sum_{k[2]=0}^{i-j}\sum_{k[3]=0}^{j}\left(-\frac{1}{2}C_{n-k[1]}\right)*$$

$$\left((n-k[1])C_{n-2k[1]}*(n-2k)C_i*iC_j*(i-j)C_{k[2]}*jC_{k[3]}*\right.$$

$$\left.(-2)^{n-2k[1]}(-1)^{j-k[3]}R^n*\right.$$

36 | *OrbitCalculationsRewritePatentHomeLaptop38.nb*

$$\left((\cos[\omega_{er} t])^{i-j-k[2]-k[3]} (\sin[\omega_{er} t])^{j-k[2]-k[3]}\right) *$$

$$J[n][n - 2k[1] - i, i - (k[2]+k[3]), k[2]+k[3]][\hat{u}, \hat{v}, \hat{w}] *$$

$$r^{-(n+2)}$$

$$\left((-(2(n-k[1])+1)\hat{r})(\hat{r}\cdot\hat{u})^{n-2k[1]-i}(\hat{r}\cdot\hat{v})^{i-j}(\hat{r}\cdot\hat{w})^{j} + \right.$$

$$\left(\left((n-2k[1]-i)(\hat{r}\cdot\hat{u})^{n-2k[1]-i-1}\hat{u}\right)(\hat{r}\cdot\hat{v})^{i-j}(\hat{r}\cdot\hat{w})^{j}\right) +$$

$$\left((\hat{r}\cdot\hat{u})^{n-2k[1]-i}\left((i-j)(\hat{r}\cdot\hat{v})^{i-j-1}\hat{v}\right)(\hat{r}\cdot\hat{w})^{j}\right) +$$

$$\left.\left((\hat{r}\cdot\hat{u})^{n-2k[1]-i}(\hat{r}\cdot\hat{v})^{i-j}\left(j(\hat{r}\cdot\hat{w})^{j-1}\hat{w}\right)\right)\right)$$

Rearranging the terms $$\partial_{\mathbf{r}}\left(-G\int\frac{1}{r}P_n[r, r']\,dm'[\mathbf{r}']\right) =$$

$$-GM\sum_{k[1]=0}^{\text{Floor}[\frac{n}{2}]}\sum_{i=0}^{n-2k[1]}\sum_{j=0}^{i}\sum_{k[2]=0}^{i-j}\sum_{k[3]=0}^{j}\left(-\frac{1}{2}C_{n\,k[1]}\right) *$$

$$((n-k[1])C_{n-2k[1]} * (n-2k)C_i *$$

$$iC_j * (i-j)C_{k[2]} * jC_{k[3]} *$$

$$(-2)^{n-2k[1]}(-1)^{j-k[3]}\left(\frac{R}{r}\right)^n *$$

$$\left((\cos[\omega_{er} t])^{i-j-k[2]-k[3]} (\sin[\omega_{er} t])^{j-k[2]-k[3]}\right) *$$

$$J[n][n - 2k[1] - i, i - (k[2]+k[3]), k[2]+k[3]][\hat{u}, \hat{v}, \hat{w}] *$$

$$r^{-2}\left((-(2(n-k[1])+1)\hat{r})(\hat{r}\cdot\hat{u})^{n-2k[1]-i}(\hat{r}\cdot\hat{v})^{i-j}(\hat{r}\cdot\hat{w})^{j} + \right.$$

$$\left(\left((n-2k[1]-i)(\hat{r}\cdot\hat{u})^{n-2k[1]-i-1}\hat{u}\right)(\hat{r}\cdot\hat{v})^{i-j}(\hat{r}\cdot\hat{w})^{j}\right) +$$

$$\left((\hat{r}\cdot\hat{u})^{n-2k[1]-i}\left((i-j)(\hat{r}\cdot\hat{v})^{i-j-1}\hat{v}\right)(\hat{r}\cdot\hat{w})^{j}\right) +$$

$$\left.\left((\hat{r}\cdot\hat{u})^{n-2k[1]-i}(\hat{r}\cdot\hat{v})^{i-j}\left(j(\hat{r}\cdot\hat{w})^{j-1}\hat{w}\right)\right)\right) \quad (11)$$

Clear[ForceContributionMultipoleExpansionTerms]

```
ForceContributionMultipoleExpansionTerms[n_] :=
 Sum[
  Sum[
   Sum[
    Sum[
     Sum[
      -(G M) Binomial[-1/2, n - k[1]] *
       Binomial[n - k[1], n - 2 k[1]] * Binomial[n - 2 k[1], i] *
       Binomial[i, j] * Binomial[i - j, k[2]] *
       Binomial[j, k[3]] * (-2)^(n-2 k[1]) * (-1)^(j-k[3]) * (R/r)^n
       J[n][n - 2 k[1] - i, i - (k[2] + k[3]), k[2] + k[3]][û, v̂,
        ŵ] * ((Cos[ω_er t])^(i-j-k[2]+k[3]) (Sin[ω_er t])^(j+k[2]-k[3])) *
       (r^-2 (-(2 (n - k[1]) + 1) (r̂ . û)^(n-2 k[1] -i)
              (r̂ . v̂)^(i-j) * (r̂ . ŵ)^j r̂ +

(n - 2 k[1] - i)
               (r̂ . û)^(n-2 k[1] -i-1) (r̂ . v̂)^(i-j) * (r̂ . ŵ)^j û +

(i - j) (r̂ . û)^(n-2 k[1] -i) (r̂ . v̂)^(i-j-1) (r̂ . ŵ)^j v̂ + j (r̂ . û)^(n-2 k[1] -i) (r̂ . v̂)^(i-j) (r̂ . ŵ)^(j-1) ŵ)),
     {k[3], 0, j}],
    {k[2], 0, i - j}],
   {j, 0, i}],
  {i, 0, n - 2 k[1]}],
 {k[1], 0, Floor[n/2]}]
```

MultipoleExpansionTerms[2]

$$\frac{G M R^2 J[2][0, 0, 0][\hat{u}, \hat{v}, \hat{w}]}{2 r^3} -$$

$$\frac{3 G M R^2 \cos[t \omega_{er}]^2 (\hat{r}.\hat{w})^2 J[2][0, 0, 2][\hat{u}, \hat{v}, \hat{w}]}{2 r^3} -$$

$$\frac{3 G M R^2 \cos[t \omega_{er}] \hat{r}.\hat{v} \, \hat{r}.\hat{w} \sin[t \omega_{er}] J[2][0, 0, 2][\hat{u}, \hat{v}, \hat{w}]}{r^3} -$$

$$\frac{3 G M R^2 (\hat{r}.\hat{v})^2 \sin[t \omega_{er}]^2 J[2][0, 0, 2][\hat{u}, \hat{v}, \hat{w}]}{2 r^3} -$$

$$\frac{3 G M R^2 \cos[t \omega_{er}]^2 (\hat{r}.\hat{v})^2 J[2][0, 2, 0][\hat{u}, \hat{v}, \hat{w}]}{2 r^3} +$$

$$\frac{3 G M R^2 \cos[t \omega_{er}] \hat{r}.\hat{v} \, \hat{r}.\hat{w} \sin[t \omega_{er}] J[2][0, 2, 0][\hat{u}, \hat{v}, \hat{w}]}{r^3} -$$

$$\frac{3 G M R^2 (\hat{r}.\hat{w})^2 \sin[t \omega_{er}]^2 J[2][0, 2, 0][\hat{u}, \hat{v}, \hat{w}]}{2 r^3} -$$

$$\frac{3 G M R^2 (\hat{r}.\hat{u})^2 J[2][2, 0, 0][\hat{u}, \hat{v}, \hat{w}]}{2 r^3}$$

ForceContributionMultipoleExpansionTerms[1]

0

ForceContributionMultipoleExpansionTerms[1]

0

Note that when the origin of the coordinate system is at the center of gravity of the body, then $J[1][0, 0, 1][\hat{u}, \hat{v}, \hat{w}], J[1][0, 1, 0][\hat{u}, \hat{v}, \hat{w}]$ and $J[1][1, 0, 0][\hat{u}, \hat{v}, \hat{w}]$ are zero.

ForceContributionMultipoleExpansionTerms[2]

ForceContributionMultipoleExpansionTerms[3]

ForceContributionMultipoleExpansionTerms[4]

ForceContributionMultipoleExpansionTerms[5]

Note that when the system is axially symmetric we can introduce the axiom $J[n\_][a\_, b\_, c\_][u\_, v\_, w\_] \, /; \, c > b := J[n][a, c, b][u, v, w]$

```
ForceContributionMultipoleExpansionTerms[3] // Simplify
```

We quote some geoid values found
http : // geophysics.ou.edu/solid_earth/notes/geoid/earths_geoid.htm Table 2.2 Coefficients of spherical harmonics in the expansion of the gravitational potential of the Earth

| (a) Zonal harmonics | | | |
|---|---|---|---|
| $10^6 J_2$ | 1082·6 | $10^6 J_3$ | −2·54 |
| $J_4$ | −1·59 | $J_5$ | −0·21 |
| $J_6$ | 0·50 | $J_7$ | −0·40 |
| $J_8$ | −0·12 | $J_9$ | 0 |
| $J_{10}$ | −0·35 | $J_{11}$ | 0 |
| $J_{12}$ | −0·04 | $J_{13}$ | 0 |
| $J_{14}$ | −0·07 | $J_{15}$ | −0·20 |
| $J_{16}$ | 0·19 | $J_{17}$ | 0 |
| $J_{18}$ | −0·23 | $J_{19}$ | 0 |
| | | $J_{21}$ | 0·26 |

(Values from Kozai (1969) and King Hele *et al.* (1969).)

■ Angular Momentun Plane

Let $r = r[\tau]$ be the orbit of a particle of unit mass with the Newtoninan equation of motion $$\ddot{\mathbf{r}} = -\frac{k\,\hat{\mathbf{r}}}{r^2} + \mathbf{f}$$

The angular momentum for unit mass is defined as $$L \equiv \mathbf{r} \wedge \dot{\mathbf{r}}$$

It can be shown that L is a bivector $$L \equiv \mathbf{r} \wedge \dot{\mathbf{r}} = r^2\,\hat{\mathbf{r}}\,\dot{\hat{\mathbf{r}}}$$

Proof $$\mathbf{r} = r\,\hat{\mathbf{r}}$$

$$\dot{\mathbf{r}} = \dot{r}\,\hat{\mathbf{r}} + r\,\dot{\hat{\mathbf{r}}}$$

$$L \equiv \mathbf{r} \wedge \dot{\mathbf{r}} = r\,\hat{\mathbf{r}} \wedge \left(\dot{r}\,\hat{\mathbf{r}} + r\,\dot{\hat{\mathbf{r}}}\right) = r\,\hat{\mathbf{r}} \wedge r\,\dot{\hat{\mathbf{r}}} = r^2\,\hat{\mathbf{r}} \wedge \dot{\hat{\mathbf{r}}}$$

Thus L is a bivector. We get the third equality, from the distributive law, and using the fact $$r\,\hat{r} \wedge \dot{r}\,\hat{r} = 0$$

We next show $$\hat{r} \cdot \dot{\hat{r}} = 0$$

From the unit vector $\hat{r}$ $$\hat{r}\,\hat{r} = 1 \implies \dot{\hat{r}}\,\hat{r} + \hat{r}\,\dot{\hat{r}} = 0 \implies \hat{r} \cdot \dot{\hat{r}} = 0$$

We get the first implication by differentiating both sides w.r.t t, and the second implication from the definition of the dot product in geometric algebra.

Thus we can replace, in L, the outer product $\wedge$, by the geometric product.

$$L \equiv \mathbf{r} \wedge \dot{\mathbf{r}} = r^2\,\hat{r}\,\dot{\hat{r}}$$

Simplifying the Geometric Algebra equation of Motion

Choosing $\sigma_1$ and U and proving $U^\dagger\,\sigma_1 = \sigma_1\,U$

We make appropriate choices for U and $\sigma_1$ to simplify the geometric algebra equation of motion. Given the initial position vector $r_{\text{Init}}$ and velocity vector $\dot{r}_{\text{Init}}$ of the orbiting body, we can specify the bivector component of U to be proportional to $\hat{r}_{\text{Init}} \wedge \dot{\hat{r}}_{\text{Init}}$ i.e.

$$\langle U \rangle_2 = \alpha\,\hat{r}_{\text{Init}} \wedge \dot{\hat{r}}_{\text{Init}}$$

where $\alpha$ is some scalar that is to be specified later. $\langle U \rangle_2$ is in the plane of the angular momentum of the satellite.

We re free to choose $\sigma_1$ in the equation for $\mathbf{r}$. We choose $\sigma_1$ to be $\hat{r}_{\text{Init}}$, the unit vector of initial position of the satellite. Then $$\sigma_1 \wedge \langle U^\dagger \rangle_2 = 0$$

Then replacing the outer product $\wedge$, with the geometric product we get $$\sigma_1 \wedge \langle U^\dagger \rangle_2 = \sigma_1\,U^\dagger + (-1)^2 \langle U^\dagger \rangle_2\,\sigma_1 = 0$$

This implies $$U^\dagger\,\sigma_1 = \sigma_1\,U$$

provided that $\sigma_1$ lies in the plane defined by U i.e.

$$\sigma_1 \wedge \langle U \rangle_2 = 0$$

Expressing the above in terms of geometric products we get $$\frac{1}{2} \left( \sigma_1 \langle U \rangle_2 + (-1)^2 \langle U \rangle_2 \sigma_1 \right) = 0$$

Simplifying, we get $$\sigma_1 \langle U \rangle_2 + \langle U \rangle_2 \sigma_1 = 0$$

Taking revision of the second term, we get $$\sigma_1 \langle U \rangle_2 - \langle U^\dagger \rangle_2 \sigma_1 = 0$$

Rearranging, we get $$\sigma_1 \langle U \rangle_2 = \langle U^\dagger \rangle_2 \sigma_1$$

Also we have for any scalar $$\sigma_1 \langle U \rangle_0 = \langle U \rangle_0 \sigma_1 = \langle U^\dagger \rangle_0 \sigma_1$$

Thus we have $$U^\dagger \sigma_1 = \sigma_1 U$$

And using reversion, $$\sigma_1 U^\dagger = U \sigma_1$$

▪ Proving the subsidary condition is satisfied

We now show, in the sequence below that the subsidary condition is satisfied in a system with these choices of $\sigma_1$ and $U$.

$$\langle U^\dagger \sigma_1 \dot{U} \rangle_3 = \langle \sigma_1 U \dot{U} \rangle_3 =$$

$$\langle \sigma_1 (\langle U \rangle_0 + \langle U \rangle_2)(\langle \dot{U} \rangle_0 + \langle \dot{U} \rangle_2) \rangle_3$$

Substituting for our choice of $\langle U \rangle_2$ $$\left( \hat{r}_{\text{Init}} \left( \langle U \rangle_0 + \left( \alpha \hat{r}_{\text{Init}} \wedge \hat{r}_{\text{Init}} \right) \right) \left( \langle \dot{U} \rangle_0 + \dot{\alpha} \hat{r}_{\text{Init}} \wedge \hat{r}_{\text{Init}} \right) \right)_3 =$$

Distributing $$\left\langle \left( \langle U \rangle_0 \hat{r}_{\text{Init}} + \alpha \hat{r}_{\text{Init}} \right) \left( \langle \dot{U} \rangle_0 + \dot{\alpha} \hat{r}_{\text{Init}} \wedge \hat{r}_{\text{Init}} \right) \right\rangle_3 =$$

$$\left\langle \langle U \rangle_0 \langle \dot{U} \rangle_0 \hat{r}_{\text{Init}} + \langle U \rangle_0 \dot{\alpha} \hat{r}_{\text{Init}} + \alpha \langle \dot{U} \rangle_0 \hat{r}_{\text{Init}} - \alpha \dot{\alpha} \hat{r}_{\text{Init}} \right\rangle_3 = 0$$

*42 | OrbitCalculationsRewritePatentHomeLaptop38.nb*

◼ Using $\sigma_1 U^\dagger = U \sigma_1$ to simplify the equation of motion The equation of motion with U as above and $\sigma_1 = \hat{r}_{Init}$, becomes Thus we get the equation of motion in geometric algebra.

$$2 \frac{d^2}{ds^2} U - E U = U \mathbf{r} \left( \sum_{n=2}^{\infty} \partial_\mathbf{r} \left( -G \int \frac{1}{r} P_n[r, r'] \, dm'[\mathbf{r}'] \right) \right) =$$

$$-GM \left( \sum_{n=2}^{\infty} \sum_{k[1]=0}^{\text{Floor}\left[\frac{n}{2}\right]} \sum_{i=0}^{n-2k[1]} \sum_{j=0}^{i} \sum_{k[2]=0}^{i-j} \sum_{k[3]=0}^{j} \left( -\frac{1}{2} C_{n-k[1]} \right) * \right.$$

$$((n-k[1]) \, C_{n-2k[1]} * (n-2k) \, C_i *$$

$$i C_j * (i-j) \, C_{k[2]} * j C_{k[3]} *$$

$$(-2)^{n-2k[1]} \, (-1)^{j-k[3]} \left( \frac{R}{r} \right)^n *$$

$$((\cos[\omega_{er} t])^{i-j-k[2]+k[3]}$$

$$(\sin[\omega_{er} t])^{j-k[2]-k[3]} )) *$$

$$J[n][n-2k[1]-i, \, i-(k[2]+k[3]), \, k[2]+k[3]][\hat{\mathbf{u}}, \hat{\mathbf{v}}, \hat{\mathbf{w}}] *$$

$$U \mathbf{r} \, r^{-2}$$

$$\left( (-(2(n-k[1])+1) \, \hat{\mathbf{r}}) \left( \frac{\left( (U^\dagger \sigma_1 U) \, \hat{\mathbf{u}} + \hat{\mathbf{u}} (U^\dagger \sigma_1 U) \right)}{2 |U|^2} \right)^{n-2k[1]-i} \right.$$

$$\left( \frac{\left( (U^\dagger \sigma_1 U) \, \hat{\mathbf{v}} + \hat{\mathbf{v}} (U^\dagger \sigma_1 U) \right)}{2 |U|^2} \right)^{i-j} \left( \frac{\left( (U^\dagger \sigma_1 U) \, \hat{\mathbf{w}} + \hat{\mathbf{w}} (U^\dagger \sigma_1 U) \right)}{2 |U|^2} \right)^{j} +$$

$$\left( \left( (n-2k[1]-i) \left( \frac{\left( (U^\dagger \sigma_1 U) \, \hat{\mathbf{u}} + \hat{\mathbf{u}} (U^\dagger \sigma_1 U) \right)}{2 |U|^2} \right)^{n-2k[1]-i-1} \hat{\mathbf{u}} \right) \right.$$

$$\left( \frac{\left( (U^\dagger \sigma_1 U) \, \hat{\mathbf{v}} + \hat{\mathbf{v}} (U^\dagger \sigma_1 U) \right)}{2 |U|^2} \right)^{i-j} \left( \frac{\left( (U^\dagger \sigma_1 U) \, \hat{\mathbf{w}} + \hat{\mathbf{w}} (U^\dagger \sigma_1 U) \right)}{2 |U|^2} \right)^{j} +$$

$$\left( \left( \frac{\left( (U^\dagger \sigma_1 U) \, \hat{\mathbf{u}} + \hat{\mathbf{u}} (U^\dagger \sigma_1 U) \right)}{2 |U|^2} \right)^{n-2k[1]-i} \right.$$

$$\left( (i-j) \left( \frac{\left( (U^\dagger \sigma_1 U) \hat{\mathbf{v}} + \hat{\mathbf{v}} (U^\dagger \sigma_1 U) \right)}{2 |U|^2} \right)^{i-j-1} \hat{\mathbf{v}} \right)$$

$$\left( \frac{\left( (U^\dagger \sigma_1 U) \hat{\mathbf{w}} + \hat{\mathbf{w}} (U^\dagger \sigma_1 U) \right)}{2 |U|^2} \right)^{j} \right) +$$

$$\left( \left( \frac{\left( (U^\dagger \sigma_1 U) \hat{\mathbf{u}} + \hat{\mathbf{u}} (U^\dagger \sigma_1 U) \right)}{2 |U|^2} \right)^{n-2k[1]-i} \right.$$

$$\left( \frac{\left( (U^\dagger \sigma_1 U) \hat{\mathbf{v}} + \hat{\mathbf{v}} (U^\dagger \sigma_1 U) \right)}{2 |U|^2} \right)^{i-j}$$

(12)

$$\left. \left( j \left( \frac{\left( (U^\dagger \sigma_1 U) \hat{\mathbf{w}} + \hat{\mathbf{w}} (U^\dagger \sigma_1 U) \right)}{2 |U|^2} \right)^{j-1} \hat{\mathbf{w}} \right) \right)$$

After making the substitution $$\sigma_1 U^\dagger = U \sigma_1$$

in the equation of motion we get, $$2 \frac{d^2}{ds^2} U - E U = U \mathbf{r} \left( \sum_{n=2}^{\infty} \partial_r \left( -G \int \frac{1}{r} P_n[r, r'] \, dm'[\mathbf{r}'] \right) \right) =$$

$$C M \left( \sum_{n=2}^{\infty} \sum_{k[1]=0}^{\text{Floor}\left|\frac{n}{2}\right|} \sum_{i=0}^{n-2k[1]} \sum_{j=0}^{i} \sum_{k[2]=0}^{i-j} \sum_{k[3]=0}^{j} \left( \frac{1}{2} C_{n-k[1]} \right) \ast \right.$$

$$((n - k[1]) C_{n-2k[1]} \ast (n - 2k) C_i \ast$$

$$i C_j \ast (i - j) C_{k[2]} \ast j C_{k[3]} \ast$$

$$(-2)^{n-2k[1]} (-1)^{j-k[3]} \left( \frac{R}{r} \right)^n \ast$$

$$\left( (\text{Cos}[\omega_{er} t])^{i-j-k[2]+k[3]} \right.$$

$$(\text{Sin}[\omega_{er} t])^{j-k[2]-k[3]} ) \ast$$

$$J[n][n - 2k[1] - i, i - (k[2] + k[3]), k[2] + k[3]] [\hat{\mathbf{u}}, \hat{\mathbf{v}}, \hat{\mathbf{w}}] \ast$$

$U\mathbf{r}\ r^{-2}$ $$\left(\left(-(2(n-k[1])+1)\hat{\mathbf{r}}\right)\left(\frac{\left(\left(\sigma_1 U^2\right)\hat{\mathbf{u}}+\hat{\mathbf{u}}\left(\sigma_1 U^2\right)\right)}{2|U|^2}\right)^{n-2k[1]-i}\right.$$

$$\left(\frac{\left(\left(\sigma_1 U^2\right)\hat{\mathbf{v}}+\hat{\mathbf{v}}\left(\sigma_1 U^2\right)\right)}{2|U|^2}\right)^{i-j}\left(\frac{\left(\left(\sigma_1 U^2\right)\hat{\mathbf{w}}+\hat{\mathbf{w}}\left(\sigma_1 U^2\right)\right)}{2|U|^2}\right)^{j} +$$

$$\left(\left((n-2k[1]-i)\left(\frac{\left(\left(\sigma_1 U^2\right)\hat{\mathbf{u}}+\hat{\mathbf{u}}\left(\sigma_1 U^2\right)\right)}{2|U|^2}\right)^{n-2k[1]-i-1}\hat{\mathbf{u}}\right)\right.$$

$$\left(\frac{\left(\left(\sigma_1 U^2\right)\hat{\mathbf{v}}+\hat{\mathbf{v}}\left(\sigma_1 U^2\right)\right)}{2|U|^2}\right)^{i-j}\left(\frac{\left(\left(\sigma_1 U^2\right)\hat{\mathbf{w}}+\hat{\mathbf{w}}\left(\sigma_1 U^2\right)\right)}{2|U|^2}\right)^{j} +$$

$$\left(\left(\frac{\left(\left(\sigma_1 U^2\right)\hat{\mathbf{u}}+\hat{\mathbf{u}}\left(\sigma_1 U^2\right)\right)}{2|U|^2}\right)^{n-2k[1]-i}\right.$$

$$\left((i-j)\left(\frac{\left(\left(\sigma_1 U^2\right)\hat{\mathbf{v}}+\hat{\mathbf{v}}\left(\sigma_1 U^2\right)\right)}{2|U|^2}\right)^{i-j-1}\hat{\mathbf{v}}\right)$$

$$\left(\frac{\left(\left(\sigma_1 U^2\right)\hat{\mathbf{w}}+\hat{\mathbf{w}}\left(\sigma_1 U^2\right)\right)}{2|U|^2}\right)^{j} +$$

$$\left(\left(\frac{\left(\left(\sigma_1 U^2\right)\hat{\mathbf{u}}+\hat{\mathbf{u}}\left(\sigma_1 U^2\right)\right)}{2|U|^2}\right)^{n-2k[1]-i}\right.$$

$$\left(\frac{\left(\left(\sigma_1 U^2\right)\hat{\mathbf{v}}+\hat{\mathbf{v}}\left(\sigma_1 U^2\right)\right)}{2|U|^2}\right)^{i-j}$$

$$\left.\left.\left(j\left(\frac{\left(\left(\sigma_1 U^2\right)\hat{\mathbf{w}}+\hat{\mathbf{w}}\left(\sigma_1 U^2\right)\right)}{2|U|^2}\right)^{j-1}\hat{\mathbf{w}}\right)\right)\right)$$

After making the substitution $$\sigma_1 = \hat{\mathbf{r}}_{Init}$$

in the equation of motion we get, $$2\frac{d^2}{ds^2}U - EU = U\mathbf{r}\left(\sum_{n=2}^{\infty}\partial_\mathbf{r}\left(-G\int\frac{1}{r}P_n[r,r']\,dm'[\mathbf{r}']\right)\right) =$$

$$-GM \left( \sum_{n=2}^{\infty} \sum_{k[1]=0}^{\text{Floor}\left[\frac{n}{2}\right]} \sum_{i=0}^{n-2k[1]} \sum_{j=0}^{i} \sum_{k[2]=0}^{i-j} \sum_{k[3]=0}^{j} \left(-\frac{1}{2} C_{n-k[1]}\right) * \right.$$

$$((n-k[1]) C_{n-2k[1]} *$$
$$(n-2k) C_i * jC_j * (i-j) C_{k[2]} * jC_{k[3]} *$$
$$(-2)^{n-2k[1]} (-1)^{j-k[3]} \left(\frac{R}{r}\right)^n *$$
$$((\cos[\omega_{er} t])^{i-j-k[2]+k[3]}$$
$$(\sin[\omega_{er} t])^{j-k[2]-k[3]}) *$$

$$J[n][n-2k[1]-i, i-(k[2]+k[3]), k[2]+k[3]][\hat{u}, \hat{v}, \hat{w}] *$$
$$U \mathbf{r} \; r^{-2}$$

$$\left( (-(2(n-k[1])+1) \hat{\mathbf{r}}) \left( \frac{((\hat{\mathbf{r}}_{\text{Init}} U^2) \hat{u} + \hat{u} (\hat{\mathbf{r}}_{\text{Init}} U^2))}{2|U|^2} \right)^{n-2k[1]-i} \right.$$

$$\left( \frac{((\hat{\mathbf{r}}_{\text{Init}} U^2) \hat{v} + \hat{v} (\hat{\mathbf{r}}_{\text{Init}} U^2))}{2|U|^2} \right)^{i-j}$$

$$\left( \frac{((\hat{\mathbf{r}}_{\text{Init}} U^2) \hat{w} + \hat{w} (\hat{\mathbf{r}}_{\text{Init}} U^2))}{2|U|^2} \right)^{j} +$$

$$\left( \left( (n-2k[1]-i) \left( \frac{((\hat{\mathbf{r}}_{\text{Init}} U^2) \hat{u} + \hat{u} (\hat{\mathbf{r}}_{\text{Init}} U^2))}{2|U|^2} \right)^{n-2k[1]-i-1} \hat{u} \right) \right.$$

$$\left( \frac{((\hat{\mathbf{r}}_{\text{Init}} U^2) \hat{v} + \hat{v} (\hat{\mathbf{r}}_{\text{Init}} U^2))}{2|U|^2} \right)^{i-j}$$

$$\left. \left( \frac{((\hat{\mathbf{r}}_{\text{Init}} U^2) \hat{w} + \hat{w} (\hat{\mathbf{r}}_{\text{Init}} U^2))}{2|U|^2} \right)^{j} \right) +$$

$$\left( \left( \frac{((\hat{\mathbf{r}}_{\text{Init}} U^2) \hat{u} + \hat{u} (\hat{\mathbf{r}}_{\text{Init}} U^2))}{2|U|^2} \right)^{n-2k[1]-i} \right.$$

$$\left( (i-j) \left( \frac{\left( \left( \hat{r}_{Init}\, U^2 \right) \hat{v} + \hat{v} \left( \hat{r}_{Init}\, U^2 \right) \right)}{2\,|U|^2} \right)^{i-j-1} \hat{v} \right)$$

$$\left( \frac{\left( \left( \hat{r}_{Init}\, U^2 \right) \hat{w} + \hat{w} \left( \hat{r}_{Init}\, U^2 \right) \right)}{2\,|U|^2} \right)^{j} +$$

$$\left( \left( \frac{\left( \left( \hat{r}_{Init}\, U^2 \right) \hat{u} + \hat{u} \left( \hat{r}_{Init}\, U^2 \right) \right)}{2\,|U|^2} \right)^{n-2\,k[i]-i} \right.$$

$$\left( \frac{\left( \left( \hat{r}_{Init}\, U^2 \right) \hat{v} + \hat{v} \left( \hat{r}_{Init}\, U^2 \right) \right)}{2\,|U|^2} \right)^{i\,j}$$

$$\left. \left( j \left( \frac{\left( \left( \hat{r}_{Init}\, U^2 \right) \hat{w} + \hat{w} \left( \hat{r}_{Init}\, U^2 \right) \right)}{2\,|U|^2} \right)^{j-1} \hat{w} \right) \right)$$

∎ Defining $\kappa \left[ U,\, \hat{r}_{Init},\, \hat{\tilde{r}}_{Init},\, \hat{w} \right]$ We need to consider expressions of the following form $$\frac{\left( \hat{r}_{Init}\, U^2 \right)}{2} \hat{w} + \hat{w}\, \frac{\left( \hat{r}_{Init}\, U^2 \right)}{2}$$

Let $$U = \beta + \alpha\, \hat{r}_{Init} \wedge \hat{\tilde{r}}_{Init}$$

Then $$U^2 = \left( \beta + \alpha\, \hat{r}_{Init} \wedge \hat{\tilde{r}}_{Init} \right) \left( \beta + \alpha\, \hat{r}_{Init} \wedge \hat{\tilde{r}}_{Init} \right)$$

Expanding $$U^2 = \left( \beta^2 + 2\,\alpha\,\beta\, \hat{r}_{Init} \wedge \hat{\tilde{r}}_{Init} + \alpha^2 \left( \hat{r}_{Init} \wedge \hat{\tilde{r}}_{Init} \right) \left( \hat{r}_{Init} \wedge \hat{\tilde{r}}_{Init} \right) \right)$$

Using $$\hat{r}_{Init} \wedge \hat{\tilde{r}}_{Init} = \hat{r}_{Init}\, \hat{\tilde{r}}_{Init}$$

and simplifying we get $$U^2 = \left( \beta^2 - \alpha^2 + 2\,\alpha\,\beta\, \hat{r}_{Init} \wedge \hat{\tilde{r}}_{Init} \right)$$

Thus we get $$\hat{r}_{Init} U^2 = \hat{r}_{Init} \left( \beta^2 - \alpha^2 + 2\alpha\beta\, \hat{r}_{Init} \wedge \hat{\tilde{r}}_{Init} \right)$$

Distributing we get $$\hat{r}_{Init} U^2 = \left( \beta^2 - \alpha^2 \right) \hat{r}_{Init} + 2\alpha\beta\, \hat{\tilde{r}}_{Init}$$

Thus we get $$\frac{\left( \hat{r}_{Init} U^2 \right)}{2} = \frac{\left( \beta^2 - \alpha^2 \right)}{2} \hat{r}_{Init} + \alpha\beta\, \hat{\tilde{r}}_{Init}$$

Finally $$\frac{\left( \hat{r}_{Init} U^2 \right)}{2} \hat{w} + \hat{w} \frac{\left( \hat{r}_{Init} U^2 \right)}{2} =$$

$$\left( \beta^2 - \alpha^2 \right) \hat{r}_{Init} \cdot \hat{w} + 2\alpha\beta\, \hat{\tilde{r}}_{Init} \cdot \hat{w}$$

Define $$\kappa \left[ U, \hat{r}_{Init}, \hat{\tilde{r}}_{Init}, \hat{w} \right] =$$

$$\frac{\left( \left( \beta^2 - \alpha^2 \right) \hat{r}_{Init} \cdot \hat{w} + 2\alpha\beta\, \hat{\tilde{r}}_{Init} \cdot \hat{w} \right)}{r_{Init}}$$

where $$\beta = \langle U \rangle_0$$

and $$\alpha = \langle U \rangle_2 \left( \hat{\tilde{r}}_{Init} \wedge \hat{r}_{Init} \right)$$

We divide $\left( \left( \beta^2 - \alpha^2 \right) \hat{r}_{Init} \cdot \hat{w} + 2\alpha\beta\, \hat{\tilde{r}}_{Init} \cdot \hat{w} \right)$ by $r_{Init}$ in order to maintain precision. This is new

■ Equation of Motion in terms of $\kappa \left[ U, \hat{r}_{Init}, \hat{\tilde{r}}_{Init}, \hat{w} \right]$ Simplifying by substituting $\kappa \left[ U, \hat{r}_{Init}, \hat{\tilde{r}}_{Init}, \hat{w} \right]$ in the expression for the equation of motion, $$2 \frac{d^2}{ds^2} U - E U = U \mathbf{r} \left( \sum_{n=2}^{\infty} \partial_\mathbf{r} \left( -G \int \frac{1}{r} P_n[r, r'] \, dm'[\mathbf{r}'] \right) \right) =$$

$$-GM \left( \sum_{n=2}^{\infty} \sum_{k[1]=0}^{\text{Floor}[\frac{n}{2}]} \sum_{i=0}^{n-2k[1]} \sum_{j=0}^{i} \sum_{k[2]=0}^{i-j} \sum_{k[3]=0}^{j} \left( -\frac{1}{2} C_{n\,k[1]} \right) * \right.$$

$$(n - k[1]) \, C_{n-2k[1]} * (n - 2k) \, C_i * iC_j * (i - j) \, C_{k[2]} * jC_{k[3]} *$$

$$(-2)^{n-2k[1]} (-1)^{j-k[3]} \left( \frac{R}{r} \right)^n *$$

$$\left( (\cos[\omega_{er} t])^{i-j-k[2]+k[3]} (\sin[\omega_{er} t])^{j-k[2]-k[3]} \right) *$$

$$J[n][n - 2k[1] - i, i - (k[2] + k[3]), k[2] + k[3]] \cdot [\hat{\mathbf{u}}, \hat{\mathbf{v}}, \hat{\mathbf{w}}] *$$

$$U \mathbf{r} \, r^{-2}$$

$$\left( (-(2(n - k[1]) + 1) \hat{\mathbf{r}}) \left( \frac{\kappa\left[U, \hat{\mathbf{r}}_{\text{Init}}, \hat{\dot{\mathbf{r}}}_{\text{Init}}, \hat{\mathbf{u}}\right] r_{\text{Init}}}{|U|^2} \right)^{n-2k[1]-i} \right.$$

$$\left( \frac{\kappa\left[U, \hat{\mathbf{r}}_{\text{Init}}, \hat{\dot{\mathbf{r}}}_{\text{Init}}, \hat{\mathbf{v}}\right] r_{\text{Init}}}{|U|^2} \right)^{i-j}$$

$$\left( \frac{\kappa\left[U, \hat{\mathbf{r}}_{\text{Init}}, \hat{\dot{\mathbf{r}}}_{\text{Init}}, \hat{\mathbf{w}}\right] r_{\text{Init}}}{|U|^2} \right)^{j} +$$

$$\left( \left( (n - 2k[1] - i) \left( \frac{\kappa\left[U, \hat{\mathbf{r}}_{\text{Init}}, \hat{\dot{\mathbf{r}}}_{\text{Init}}, \hat{\mathbf{u}}\right] r_{\text{Init}}}{|U|^2} \right)^{n-2k[1]-i-1} \hat{\mathbf{u}} \right) \right.$$

$$\left( \frac{\kappa\left[U, \hat{\mathbf{r}}_{\text{Init}}, \hat{\dot{\mathbf{r}}}_{\text{Init}}, \hat{\mathbf{v}}\right] r_{\text{Init}}}{|U|^2} \right)^{i-j}$$

$$\left. \left( \frac{\kappa\left[U, \hat{\mathbf{r}}_{\text{Init}}, \hat{\dot{\mathbf{r}}}_{\text{Init}}, \hat{\mathbf{w}}\right] r_{\text{Init}}}{|U|^2} \right)^{j} \right) +$$

$$\left(\left(\frac{\kappa\left[U, \hat{r}_{Init}, \hat{\hat{r}}_{Init}, \hat{u}\right] r_{Init}}{|U|^2}\right)^{n-2k[1]-i}\right.$$

$$\left((i-j)\left(\frac{\kappa\left[U, \hat{r}_{Init}, \hat{\hat{r}}_{Init}, \hat{v}\right] r_{Init}}{|U|^2}\right)^{i-j-1} \hat{v}\right)$$

$$\left.\left(\frac{\kappa\left[U, \hat{r}_{Init}, \hat{\hat{r}}_{Init}, \hat{w}\right] r_{Init}}{|U|^2}\right)^{j}\right) +$$

$$\left(\left(\frac{\kappa\left[U, \hat{r}_{Init}, \hat{\hat{r}}_{Init}, \hat{u}\right] r_{Init}}{|U|^2}\right)^{n-2k[1]-i}\right.$$

$$\left(\frac{\kappa\left[U, \hat{r}_{Init}, \hat{\hat{r}}_{Init}, \hat{v}\right] r_{Init}}{|U|^2}\right)^{i-j}$$

$$\left.\left(j\left(\frac{\kappa\left[U, \hat{r}_{Init}, \hat{\hat{r}}_{Init}, \hat{w}\right] r_{Init}}{|U|^2}\right)^{j-1} \hat{w}\right)\right)\right)$$

Factoring $\frac{R}{r}$, $$2\frac{d^2}{ds^2}U - EU = U\,\mathbf{r}\left(\sum_{n=2}^{\infty}\partial_{\mathbf{r}}\left(-G\int\frac{1}{r}P_n[r, r']\,dm'[\mathbf{r}']\right)\right) =$$

$$-\frac{1}{r}U\,\hat{\mathbf{r}}\,GM\left(\sum_{n=2}^{\infty}\left(\frac{R}{r}\right)^n \sum_{k[1]=0}^{Floor[\frac{n}{2}]} \sum_{i=0}^{n-2k[1]} \sum_{j=0}^{i} \sum_{k[2]=0}^{i-j} \sum_{k[3]=0}^{j} \left(-\frac{1}{2}C_{n-k[1]}\right) *\right.$$

$$((n-k[1])\,C_{n-2k[1]} * (n-2k)\,C_i * iC_j * (i-j)\,C_{k[2]} * jC_{k[3]} *$$

$$(-2)^{n-2k[1]}\,(-1)^{j-k[3]} *$$

$$\left((\cos[\omega_{er}\,t])^{i-j-k[2]+k[3]}\right.$$

$$\left.(\sin[\omega_{er}\,t])^{j-k[2]-k[3]}\right)\right) *$$

$$J[n][n-2k[1]-i, i-(k[2]+k[3]), k[2]+k[3]][\hat{u}, \hat{v}, \hat{w}] *$$

$$\Bigg( \big( -(2(n-k[1])+1)\,\hat{r} \big)$$

$$\left(\frac{|U|^2}{r_{Init}}\right)^{-(n-2k[1])} \left(\kappa\big[U,\,\hat{r}_{Init},\,\hat{\dot{r}}_{Init},\,\hat{u}\big]\right)^{n-2k[1]-i}$$

$$\left(\kappa\big[U,\,\hat{r}_{Init},\,\hat{\dot{r}}_{Init},\,\hat{v}\big]\right)^{i-j} \left(\kappa\big[U,\,\hat{r}_{Init},\,\hat{\dot{r}}_{Init},\,\hat{w}\big]\right)^{j} +$$

$$\left(\frac{|U|^2}{r_{Init}}\right)^{-(n-2k[1]-1)}$$

$$\left(\left((n-2k[1]-i)\,\left(\kappa\big[U,\,\hat{r}_{Init},\,\hat{\dot{r}}_{Init},\,\hat{u}\big]\right)^{n-2k[1]-i-1}\hat{u}\right)\right.$$

$$\left(\kappa\big[U,\,\hat{r}_{Init},\,\hat{\dot{r}}_{Init},\,\hat{v}\big]\right)^{i-j} \left(\kappa\big[U,\,\hat{r}_{Init},\,\hat{\dot{r}}_{Init},\,\hat{w}\big]\right)^{j}\right) +$$

$$\left(\frac{|U|^2}{r_{Init}}\right)^{-(n-2k[1]-1)} \left(\left(\kappa\big[U,\,\hat{r}_{Init},\,\hat{\dot{r}}_{Init},\,\hat{u}\big]\right)^{n-2k[1]-i}\right.$$

$$\left((i-j)\,\left(\kappa\big[U,\,\hat{r}_{Init},\,\hat{\dot{r}}_{Init},\,\hat{v}\big]\right)^{i-j-1}\hat{v}\right)$$

$$\left(\kappa\big[U,\,\hat{r}_{Init},\,\hat{\dot{r}}_{Init},\,\hat{w}\big]\right)^{j}\right) +$$

$$\left(\frac{|U|^2}{r_{Init}}\right)^{-(n-2k[1]-1)}$$

$$\left(\left(\kappa\big[U,\,\hat{r}_{Init},\,\hat{\dot{r}}_{Init},\,\hat{u}\big]\right)^{n-2k[1]-i}\right.$$

$$\left.\left(\kappa\big[U,\,\hat{r}_{Init},\,\hat{\dot{r}}_{Init},\,\hat{v}\big]\right)^{i-j} \left(j\,\left(\kappa\big[U,\,\hat{r}_{Init},\,\hat{\dot{r}}_{Init},\,\hat{w}\big]\right)^{j-1}\hat{w}\right)\right)\Bigg)$$

Factoring $\frac{1}{r^n} = \frac{1}{(|U|^2)^n}$, and replacing $\left(\frac{R}{r}\right)^n = \left(\frac{R}{r_{Init}}\right)^n \left(\frac{|U|^2}{r_{Init}}\right)^n$ $$2\frac{d^2}{ds^2}U - EU = U\,\mathbf{r}\left(\sum_{n=2}^{\infty}\partial_\mathbf{r}\left(-G\int\frac{1}{r}P_n[r,\,r']\,dm'[\mathbf{r}']\right)\right) =$$

$$-\frac{1}{r}\,U\,\hat{\mathbf{r}}\,GM\left(\sum_{n=2}^{\infty}\left(\frac{R}{r_{Init}}\right)^n \left(\frac{|U|^2}{r_{Init}}\right)^{-n} \left(\frac{|U|^2}{r_{Init}}\right)^{-n} *$$

$$\sum_{k[1]=0}^{\text{Floor}\left[\frac{n}{2}\right]} \sum_{i=0}^{n-2k[1]} \sum_{j=0}^{i} \sum_{k[2]=0}^{i-j} \sum_{k[3]=0}^{j} \left(\frac{1}{2} C_{n-k[1]}\right) *$$

$$((n-k[1]) C_{n-2k[1]} * (n-2k) C_i * iC_j * (i-j) C_{k[2]} * jC_{k[3]} *$$

$$(-2)^{n-2k[1]} (-1)^{j-k[3]} *$$

$$((\cos[\omega_{er} t])^{i-j-k[2]+k[3]}$$

$$(\sin[\omega_{er} t])^{j-k[2]+k[3]})) *$$

$$J[n][n-2k[1]-i, i-(k[2]+k[3]), k[2]+k[3]][\hat{u}, \hat{v}, \hat{w}] *$$

$$\Bigg((-(2(n-k[1])+1)\hat{r})$$

$$\left(\frac{|U|^2}{r_{\text{Init}}}\right)^{2k[1]} \left(\kappa\left[U, \hat{r}_{\text{Init}}, \hat{\dot{r}}_{\text{Init}}, \hat{u}\right]\right)^{n-2k[1]-i}$$

$$\left(\kappa\left[U, \hat{r}_{\text{Init}}, \hat{\dot{r}}_{\text{Init}}, \hat{v}\right]\right)^{i-j} \left(\kappa\left[U, \hat{r}_{\text{Init}}, \hat{\dot{r}}_{\text{Init}}, \hat{w}\right]\right)^{j} +$$

$$\left(\frac{|U|^2}{r_{\text{Init}}}\right)^{2k[1]+1}$$

$$\left(\left((n-2k[1]-i)\left(\kappa\left[U, \hat{r}_{\text{Init}}, \hat{\dot{r}}_{\text{Init}}, \hat{u}\right]\right)^{n-2k[1]-i-1} \hat{u}\right)\right.$$

$$\left(\kappa\left[U, \hat{r}_{\text{Init}}, \hat{\dot{r}}_{\text{Init}}, \hat{v}\right]\right)^{i-j} \left(\kappa\left[U, \hat{r}_{\text{Init}}, \hat{\dot{r}}_{\text{Init}}, \hat{w}\right]\right)^{j} +$$

$$\left(\frac{|U|^2}{r_{\text{Init}}}\right)^{2k[1]+1} \left(\left(\kappa\left[U, \hat{r}_{\text{Init}}, \hat{\dot{r}}_{\text{Init}}, \hat{u}\right]\right)^{n-2k[1]-i}\right.$$

$$\left((i-j)\left(\kappa\left[U, \hat{r}_{\text{Init}}, \hat{\dot{r}}_{\text{Init}}, \hat{v}\right]\right)^{i-j-1} \hat{v}\right)$$

$$\left(\kappa\left[U, \hat{r}_{\text{Init}}, \hat{\dot{r}}_{\text{Init}}, \hat{w}\right]\right)^{j}\Bigg) +$$

$$\left(\frac{|U|^2}{r_{\text{Init}}}\right)^{2k[1]+1} \left(\left(\kappa\left[U, \hat{r}_{\text{Init}}, \hat{\dot{r}}_{\text{Init}}, \hat{u}\right]\right)^{n-2k[1]-i}\right.$$

$$\left(\kappa\left[U, \hat{r}_{\text{Init}}, \hat{\dot{r}}_{\text{Init}}, \hat{v}\right]\right)^{i-j} \left(j\left(\kappa\left[U, \hat{r}_{\text{Init}}, \hat{\dot{r}}_{\text{Init}}, \hat{w}\right]\right)^{j-1} \hat{w}\right)\Bigg)\Bigg)$$

But

52 | *OrbitCalculationsRewritePatentHomeLaptop38.nb*

$$\hat{\mathbf{r}} = \frac{\left(U^\dagger \hat{\mathbf{r}}_{Init} U\right)}{|U|^2}$$

Thus $$\frac{1}{r} U \hat{\mathbf{r}} GM = \frac{1}{r} U \frac{\left(U^\dagger \hat{\mathbf{r}}_{Init} U\right)}{|U|^2} GM = \frac{\hat{\mathbf{r}}_{Init} U}{|U|^2} GM =$$

$$\frac{1}{r_{Init}} r_{Init} \frac{\hat{\mathbf{r}}_{Init} U}{|U|^2} GM = \frac{1}{r_{Init}} \left(\frac{|U|^2}{r_{Init}}\right)^{-1} \hat{\mathbf{r}}_{Init} U GM$$

Thus the equation of motion becomes $$2 \frac{d^2}{ds^2} U - EU = U\mathbf{r} \left(\sum_{n=2}^{\infty} \partial_\mathbf{r} \left(-G \int \frac{1}{r} P_n[r, r'] \, dm'[\mathbf{r}']\right)\right) =$$

$$-\frac{1}{r_{Init}} \left(\frac{|U|^2}{r_{Init}}\right)^{-1} \hat{\mathbf{r}}_{Init} U GM$$

$$\left(\sum_{n=2}^{\infty} \left(\frac{R}{r_{Init}}\right)^n \left(\frac{|U|^2}{r_{Init}}\right)^{-n} \left(\frac{|U|^2}{r_{Init}}\right)^{-n}\right)$$

$$\sum_{k[1]=0}^{Floor\left[\frac{n}{2}\right]} \sum_{i=0}^{n-2k[1]} \sum_{j=0}^{i} \sum_{k[2]=0}^{i-j} \sum_{k[3]=0}^{j} \left(-\frac{1}{2} C_{n-k[1]}\right) *$$

$$\left(\left(n-k[1]\right) C_{n-2k[1]} *\right.$$
$$(n-2k) C_i * iC_j * (i-j) C_{k[2]} * jC_{k[3]} *$$
$$(-2)^{n-2k[1]} (-1)^{j-k[3]} *$$
$$\left((\cos[\omega_{er} t])^{i-j-k[2]+k[3]}\right.$$
$$\left.\left.(\sin[\omega_{er} t])^{j-k[2]-k[3]}\right)\right) *$$

$$J[n][n-2k[1]-i, i-(k[2]+k[3]), k[2]+k[3]][\hat{\mathbf{u}}, \hat{\mathbf{v}}, \hat{\mathbf{w}}] *$$

$$\left(-(2(n-k[1])-1)\hat{\mathbf{r}}\right)$$

$$\left(\frac{|U|^2}{r_{Init}}\right)^{2k[1]} \left(\kappa\left[U, \hat{\mathbf{r}}_{Init}, \hat{\tilde{\mathbf{r}}}_{Init}, \hat{\mathbf{u}}\right]\right)^{n-2k[1]-i}$$

$$\left(\kappa\left[U, \hat{r}_{Init}, \hat{\hat{r}}_{Init}, \hat{v}\right]\right)^{i-j}$$

$$\left(\kappa\left[U, \hat{r}_{Init}, \hat{\hat{r}}_{Init}, \hat{w}\right]\right)^{j} +$$

$$\left(\frac{|U|^2}{r_{Init}}\right)^{2k[1]+1}$$

$$\left(\left((n - 2k[1] - i)\left(\kappa\left[U, \hat{r}_{Init}, \hat{\hat{r}}_{Init}, \hat{u}\right]\right)^{n-2k[1]-i-1} \hat{u}\right)\right.$$

$$\left(\kappa\left[U, \hat{r}_{Init}, \hat{\hat{r}}_{Init}, \hat{v}\right]\right)^{i-j}$$

$$\left.\left(\kappa\left[U, \hat{r}_{Init}, \hat{\hat{r}}_{Init}, \hat{w}\right]\right)^{j}\right) +$$

$$\left(\frac{|U|^2}{r_{Init}}\right)^{2k[1]+1} \left(\left(\kappa\left[U, \hat{r}_{Init}, \hat{\hat{r}}_{Init}, \hat{u}\right]\right)^{n-2k[1]-i}\right.$$

$$\left((i-j)\left(\kappa\left[U, \hat{r}_{Init}, \hat{\hat{r}}_{Init}, \hat{v}\right]\right)^{i-j-1} \hat{v}\right)$$

$$\left.\left(\kappa\left[U, \hat{r}_{Init}, \hat{\hat{r}}_{Init}, \hat{w}\right]\right)^{j}\right) +$$

$$\left(\frac{|U|^2}{r_{Init}}\right)^{2k[1]+1} \left(\left(\kappa\left[U, \hat{r}_{Init}, \hat{\hat{r}}_{Init}, \hat{u}\right]\right)^{n-2k[1]-i}\right.$$

$$\left(\kappa\left[U, \hat{r}_{Init}, \hat{\hat{r}}_{Init}, \hat{v}\right]\right)^{i-j}$$

$$\left.\left(j\left(\kappa\left[U, \hat{r}_{Init}, \hat{\hat{r}}_{Init}, \hat{w}\right]\right)^{j-1} \hat{w}\right)\right)\right)$$

- Expanding $\left(\frac{|U|^2}{r_{Init}}\right)$ as a series

As long as $2\, r_{init} > r$ $$\left(\frac{|U|^2}{r_{Init}}\right) = 1 + \alpha$$

where $\text{Abs}[\alpha]$ is less than 1. Then $$\left(\frac{|U|^2}{r_{Init}}\right) = \sum_{p=0}^{\infty} (-1)^p \left(\frac{|U|^2}{r_{Init}} - 1\right)^p$$

54 | OrbitCalculationsRewritePatentHomeLaptop38.nb

By making the substion $\sum_{p=0}^{\infty} (-1)^p \left( \frac{|U|^2}{r_{Init}} - 1 \right)^p$ in the expression for the equation of motion, $$2 \frac{d^2}{ds^2} U - E U = U \mathbf{r} \left( \sum_{n=2}^{\infty} \partial_{\mathbf{r}} \left( -G \int \frac{1}{r} P_n[r, r'] \, dm'[\mathbf{r}'] \right) \right) =$$

$$-\frac{1}{r_{Init}} \hat{\mathbf{r}}_{Init} \, U \, G \, M$$

$$\left( \sum_{n=2}^{\infty} \left( \frac{R}{r_{Init}} \right)^n \left( \sum_{p=0}^{\infty} (-1)^p \left( \frac{|U|^2}{r_{Init}} - 1 \right)^p \right)^{2n+1} \right.$$

$$\sum_{k[1]=0}^{Floor\left[\frac{n}{2}\right]} \sum_{i=0}^{n-2k[1]} \sum_{j=0}^{i} \sum_{k[2]=0}^{i-j} \sum_{k[3]=0}^{j} \left( -\frac{1}{2} C_{n,k[1]} \right) *$$

$$\left( (n-k[1]) \, C_{n-2k[1]} * (n-2k) \, C_i * iC_j * (i-j) \, C_{k[2]} * jC_{k[3]} * \right.$$

$$(-2)^{n-2k[1]} \, (-1)^{j-k[3]} *$$

$$\left( (\cos[\omega_{er} t])^{i-j-k[2]+k[3]} \right.$$

$$\left. (\sin[\omega_{er} t])^{j-k[2]-k[3]} \right) *$$

$$J[n][n - 2k[1] - i, \, i - (k[2] + k[3]), \, k[2] + k[3]][\hat{\mathbf{u}}, \hat{\mathbf{v}}, \hat{\mathbf{w}}] *$$

$$\left( (-(2(n-k[1])+1) \, \hat{\mathbf{r}} \, ) \right.$$

$$\left( \frac{|U|^2}{r_{Init}} \right)^{2k[1]} \left( \kappa \left[ U, \, \hat{\mathbf{r}}_{Init}, \, \hat{\hat{\mathbf{r}}}_{Init}, \, \hat{\mathbf{u}} \right] \right)^{n-2k[1]-i}$$

$$\left( \kappa \left[ U, \, \hat{\mathbf{r}}_{Init}, \, \hat{\hat{\mathbf{r}}}_{Init}, \, \hat{\mathbf{v}} \right] \right)^{i-j} \left( \kappa \left[ U, \, \hat{\mathbf{r}}_{Init}, \, \hat{\hat{\mathbf{r}}}_{Init}, \, \hat{\mathbf{w}} \right] \right)^{j} +$$

$$\left( \frac{|U|^2}{r_{Init}} \right)^{2k[1]+1}$$

$$\left( \left( (n - 2k[1] - i) \left( \kappa \left[ U, \, \hat{\mathbf{r}}_{Init}, \, \hat{\hat{\mathbf{r}}}_{Init}, \, \hat{\mathbf{u}} \right] \right)^{n-2k[1]-i-1} \hat{\mathbf{u}} \right) \right.$$

$$\left( \kappa \left[ U, \, \hat{\mathbf{r}}_{Init}, \, \hat{\hat{\mathbf{r}}}_{Init}, \, \hat{\mathbf{v}} \right] \right)^{i-j}$$

$$\left. \left( \kappa \left[ U, \, \hat{\mathbf{r}}_{Init}, \, \hat{\hat{\mathbf{r}}}_{Init}, \, \hat{\mathbf{w}} \right] \right)^{j} \right) +$$

$$\left(\frac{|U|^2}{r_{Init}}\right)^{2k[1]+1} \left(\left(\kappa\left[U, \hat{r}_{Init}, \hat{\dot{r}}_{Init}, \hat{u}\right]\right)^{n-2k[1]-i}\right.$$

$$\left((i-j)\left(\kappa\left[U, \hat{r}_{Init}, \hat{\dot{r}}_{Init}, \hat{v}\right]\right)^{i-j-1}\hat{v}\right)$$

$$\left(\kappa\left[U, \hat{r}_{Init}, \hat{\dot{r}}_{Init}, \hat{w}\right]\right)^{j}\right) +$$

$$\left(\frac{|U|^2}{r_{Init}}\right)^{2k[1]+1} \left(\left(\kappa\left[U, \hat{r}_{Init}, \hat{\dot{r}}_{Init}, \hat{u}\right]\right)^{n-2k[1]-i}\right.$$

$$\left(\kappa\left[U, \hat{r}_{Init}, \hat{\dot{r}}_{Init}, \hat{v}\right]\right)^{i-j}$$

$$\left.\left(j\left(\kappa\left[U, \hat{r}_{Init}, \hat{\dot{r}}_{Init}, \hat{w}\right]\right)^{j-1}\hat{w}\right)\right)\right)$$

Defining $\Gamma_n$

Let $$\Gamma_n\left[J, \hat{u}, \hat{v}, \hat{w}, \hat{r}_{Init}, \hat{\dot{r}}_{Init}\right] = \left(\sum_{p=0}^{\infty} (-1)^p \left(\frac{|U|^2}{r_{Init}} - 1\right)^p\right)^{2n+1}$$

$$\sum_{i=0}^{n-2k[1]} \sum_{j=0}^{i} \sum_{k[2]=0}^{i-j} \sum_{k[3]=0}^{j} \left(-\frac{1}{2} C_{n-k[1]}\right) * (n-k[1])$$

$$C_{n-2k[1]} * (n-2k) C_i * iC_j * (i-j) C_{k[2]} * jC_{k[3]} *$$

$$(-2)^{n-2k[1]} (-1)^{j-k[3]} *$$

$$\left((\cos[\omega_{er} t])^{i-j-k[2]+k[3]}\right.$$

$$\left.(\sin[\omega_{er} t])^{j-k[2]-k[3]}\right) *$$

$$J[n][n-2k[1]-i, i-(k[2]+k[3]), k[2]+k[3]][\hat{u}, \hat{v}, \hat{w}] *$$

$$\left((-(2(n-k[1])-1)\hat{r})\right.$$

$$\left(\frac{|U|^2}{r_{Init}}\right)^{2k[1]} \left(\kappa\left[U, \hat{r}_{Init}, \hat{\dot{r}}_{Init}, \hat{u}\right]\right)^{n-2k[1]-i}$$

$$\left(\kappa\left[U, \hat{r}_{Init}, \hat{\dot{r}}_{Init}, \hat{v}\right]\right)^{i-j} \left(\kappa\left[U, \hat{r}_{Init}, \hat{\dot{r}}_{Init}, \hat{w}\right]\right)^{j} +$$

$$\left(\frac{|U|^2}{r_{Init}}\right)^{2k[1]+1}$$

$$\left(\left((n-2k[1]-i)\left(\kappa\left[U, \hat{r}_{Init}, \hat{\dot{r}}_{Init}, \hat{u}\right]\right)^{n-2k[1]-i-1}\hat{u}\right)\right.$$

$$\left(\kappa\left[U, \hat{r}_{Init}, \hat{\dot{r}}_{Init}, \hat{v}\right]\right)^{i-j}\left(\kappa\left[U, \hat{r}_{Init}, \hat{\dot{r}}_{Init}, \hat{w}\right]\right)^{j}\right) +$$

$$\left(\frac{|U|^2}{r_{Init}}\right)^{2k[1]+1}\left(\left(\kappa\left[U, \hat{r}_{Init}, \hat{\dot{r}}_{Init}, \hat{u}\right]\right)^{n-2k[1]-i}\right.$$

$$\left.\left((i-j)\left(\kappa\left[U, \hat{r}_{Init}, \hat{\dot{r}}_{Init}, \hat{v}\right]\right)^{i-j-1}\hat{v}\right)\right.$$

$$\left.\left(\kappa\left[U, \hat{r}_{Init}, \hat{\dot{r}}_{Init}, \hat{w}\right]\right)^{j}\right) +$$

$$\left(\frac{|U|^2}{r_{Init}}\right)^{2k[1]+1}$$

$$\left(\left(\kappa\left[U, \hat{r}_{Init}, \hat{\dot{r}}_{Init}, \hat{u}\right]\right)^{n-2k[1]-i}\right.$$

$$\left(\kappa\left[U, \hat{r}_{Init}, \hat{\dot{r}}_{Init}, \hat{v}\right]\right)^{i-j}$$

$$\left.\left(j\left(\kappa\left[U, \hat{r}_{Init}, \hat{\dot{r}}_{Init}, \hat{w}\right]\right)^{j-1}\hat{w}\right)\right)\right) \quad (13)$$

We note that $\Gamma_n\left[U, \hat{u}, \hat{v}, \hat{w}, \hat{r}_{Init}, \hat{\dot{r}}_{Init}\right]$ also depends on the constants multipole constants, $J[n][p, q, r][\hat{u}, \hat{v}, \hat{w}]$. Once the unit vectors $\hat{u}$, $\hat{v}$, $\hat{w}$ have been fixed, $J[n][p, q, r][\hat{u}, \hat{v}, \hat{w}]$ is a constant.

For each n, $\Gamma_n\left[U, \hat{u}, \hat{v}, \hat{w}, \hat{r}_{Init}, \hat{\dot{r}}_{Init}\right]$ need only be calculated once, to yield a function in terms of U, given the initial position $r_{Init}$, and initial velocity $\dot{r}_{Init}$, and the unit vectors $\hat{u}$, $\hat{v}$, $\hat{w}$, as $\Gamma_n\left[U, \hat{u}, \hat{v}, \hat{w}, \hat{r}_{Init}, \hat{\dot{r}}_{Init}\right]$ then just depends on U, the rest of the inputs being constant.

◼ The equation of Motion in terms of $\Gamma_n$

The expression for the equation of motion, $$2\frac{d^2}{ds^2}U - EU =$$

$$-\frac{1}{r_{Init}} \hat{r}_{Init} \, U \, G \, M$$

$$\left( \sum_{n=2}^{\infty} \left( \frac{R}{r_{Init}} \right)^n \Gamma_n \left[ U, \, \hat{u}, \, \hat{v}, \, \hat{w}, \, \hat{r}_{Init}, \, \hat{\dot{r}}_{Init} \right] \right)$$

Applying Perturbation Theory to the Equation Of Motion

Generating the perturbed version of t $$\frac{d}{ds} = r \frac{d}{dt} \implies \frac{dt}{ds} = r = |U|^2$$

Integrating $$t = \int_0^s |U[s]|^2 \, ds$$

When $U[s]$ is of the form $$U = \sum_{i=0}^{\infty} \epsilon^i \, U_i$$

$$t = \int_0^s |U[s1]|^2 \, ds1 = \int_0^s \langle U[s1] \, U[s1]^\dagger \rangle_0 \, ds1 =$$

$$\int_0^s \left\langle \left( \sum_{i=0}^{\infty} \epsilon^i \, U_i[s1] \right) \left( \sum_{j=0}^{\infty} \epsilon^j \, U_j[s1] \right)^\dagger \right\rangle_0 ds1$$

Distributing $$t = \sum_{i=0}^{\infty} \epsilon^i \left( \sum_{j=0}^{i} \int_0^s \langle U_{i-j}[s1] \, U_j[s1]^\dagger \rangle_0 \, ds \right)$$

When $U_i[s]$ is of the form $$U_i[s] = \sum_{j=0}^{\lambda_{U_i}} \left( \alpha_{i,j} \, e^{j \, \omega_{i,j} \, s} + \beta_{i,j} \, e^{j \, \omega_{i,j} \, s} \right)$$

Where $\alpha_{i,j}$, $\beta_{i,j}$ and $\omega_{i,j}$ do not depend on s, and $\beta_{i,j}$ is a 2-blade independent of s, and all the $\beta_{i,j}$ lie in the same plane and $\lambda_{U_i}$ is the number of distinct frequencies that $\omega_{i,j}$ that constitute $U_i[s]$. Then $$t = \sum_{i=0}^{\infty} \epsilon^i \left( \sum_{j=0}^{i} \int_0^s \langle U_{i-j}[s1] \, U_j[s1]^\dagger \rangle_0 \, ds1 \right) =$$

$$\sum_{i=0}^{\infty} \epsilon^i \left( \sum_{k=0}^{i} \int_0^s \left\langle \left( \sum_{j[1]=0}^{\lambda_{U_{i-k}}} \left( \alpha_{i-k,j[1]} \, e^{j \, \omega_{i-k,j[1]} \, s1} + \beta_{i-k,j[1]} \, e^{j \, \omega_{i-k,j[1]} \, s1} \right) \right) \right. \right.$$

$$\left( \sum_{j[2]=0}^{\lambda_{U_k}} \left( \alpha_{k,j[1]} \, e^{j \, \omega_{k,j[2]} \, s1} + \right. \right.$$

$$\left. \left. \left. \beta_{i-k,j[2]} \, e^{j \, \omega_{k,j[2]} \, s1} \right) \right)^\dagger \right\rangle_0 ds1 \right)$$

Distributing and integrating and assuming all the bivectors lie in the same plane $$t = \sum_{i=0}^{\infty} \epsilon^i \left( \sum_{j=0}^{i} \int_0^s \langle U_{i-j}[s1] \, U_j[s1]^\dagger \rangle_0 \, ds1 \right) =$$

$$\sum_{i=0}^{\infty} \epsilon^i \left( \sum_{k=0}^{i} \left( \sum_{j[1]=0}^{\lambda_{i-k}} \sum_{j[2]=0}^{\lambda_k} \left( \int_0^s \alpha_{i-k,j[1]} \, \alpha_{k,j[1]} \, e^{j \, (\omega_{i-k,j[1]} + \omega_{k,j[2]}) \, s1} \, ds1 + \right. \right. \right.$$

$$\left. \left. \left. \int_0^s \beta_{i-k,j[1]} \, \beta_{i-k,j[2]}^\dagger \, e^{j \, (\omega_{i-k,j[1]} + \omega_{k,j[2]}) \, s1} \, ds1 \right) \right) \right)$$

The above expression can be expressed as $$t = \sum_{i=0}^{\infty} \epsilon^i \left( \sum_{j=0}^{i} \int_0^s \langle U_{i-j}[s1] \, U_j[s1]^\dagger \rangle_0 \, ds1 \right) =$$

$$\sum_{i=0}^{\infty} \epsilon^i \left( \sum_{k=0}^{i} \left( \sum_{j[1]=0}^{\lambda_{i-k}} \sum_{j[2]=0}^{\lambda_k} \left( \alpha_{i-k,j[1]} \, \alpha_{k,j[1]} \, \frac{\left( e^{j \, (\omega_{i-k,j[1]} + \omega_{k,j[2]}) \, s} - 1 \right)}{j \, (\omega_{i-k,j[1]} + \omega_{k,j[2]})} + \right. \right. \right.$$

$$\left. \left. \left. \beta_{i-k,j[2]}^\dagger \, \frac{\beta_{i-k,j[1]} \left( e^{j \, (\omega_{i-k,j[1]} + \omega_{k,j[2]}) \, s} - 1 \right)}{j \, (\omega_{i-k,j[1]} + \omega_{k,j[2]})} \right) \right) \right)$$

We can therefore express t as a linear combination of distinct exponential frequencies after simplification $$t = \sum_{i=0}^{\infty} \epsilon^i \left( \sum_{j=0}^{i} \int_0^s \langle U_{i-j}[s1] \, U_j[s1]^\dagger \rangle_0 \, ds1 \right) = \sum_{i=0}^{\infty} \epsilon^i \sum_{j=0}^{\lambda_{t,i}} \alpha_{t,i,j} \, e^{i \omega_{t,i,j} s}$$

where $\lambda_{t,i}$ is the number of exponentials present.

Getting the perturbed version of $\kappa\left[U, \hat{r}_{Init}, \hat{\dot{r}}_{Init}, \hat{w}\right]$ $$\kappa\left[U, \hat{r}_{Init}, \hat{\dot{r}}_{Init}, \hat{w}\right] = \frac{\left((\beta^2 - \alpha^2) \, \hat{r}_{Init} \cdot \hat{w} + 2\alpha\beta \, \hat{\dot{r}}_{Init} \cdot \hat{w}\right)}{r_{Init}}$$

When $$\beta = \left\langle \sum_{i=0}^{\infty} \epsilon^i U_i \right\rangle_0$$

and $$\alpha = \left\langle \sum_{i=0}^{\infty} \epsilon^i U_i \right\rangle_2 \left( \hat{\dot{r}}_{Init} \wedge \hat{r}_{Init} \right)$$

$$\beta_i = \langle U_i \rangle_0$$

and $$\alpha_i = \langle U_i \rangle_2 \left( \hat{\dot{r}}_{Init} \wedge \hat{r}_{Init} \right)$$

Then $$\beta = \left\langle \sum_{i=0}^{\infty} \epsilon^i U_i \right\rangle_0 = \sum_{i=0}^{\infty} \epsilon^i \langle U_i \rangle_0 = \sum_{i=0}^{\infty} \epsilon^i \beta_i$$

Then $$\alpha = \left\langle \sum_{i=0}^{\infty} \epsilon^i U_i \right\rangle_2 = \sum_{i=0}^{\infty} \epsilon^i \langle U_i \rangle_2 = \sum_{i=0}^{\infty} \epsilon^i \alpha_i$$

$$\kappa\left[U, \hat{r}_{Init}, \hat{\dot{r}}_{Init}, \hat{w}\right] = \frac{1}{r_{Init}}\left(\left(\left(\sum_{i=0}^{\infty}\epsilon^i \beta_i\right)\left(\sum_{j=0}^{\infty}\epsilon^j \beta_j\right) - \left(\sum_{i=0}^{\infty}\epsilon^i \alpha_i\right)\left(\sum_{j=0}^{\infty}\epsilon^j \alpha_j\right)\right)\hat{r}_{Init}\cdot\hat{w} + 2\left(\sum_{i=0}^{\infty}\epsilon^i \alpha_i\right)\left(\sum_{j=0}^{\infty}\epsilon^j \beta_j\right)\hat{\dot{r}}_{Init}\cdot\hat{w}\right)$$

Distributing and factoring $$\kappa\left[U, \hat{r}_{Init}, \hat{\dot{r}}_{Init}, \hat{w}\right] = \frac{1}{r_{Init}}\left(\sum_{i=0}^{\infty}\sum_{j=0}^{\infty}\epsilon^{i+j}(\beta_i \beta_j - \alpha_i \alpha_j)\,\hat{r}_{Init}\cdot\hat{w} + 2\sum_{i=0}^{\infty}\sum_{j=0}^{\infty}\epsilon^{i+j}\alpha_i \beta_j\,\hat{\dot{r}}_{Init}\cdot\hat{w}\right)$$

Changing the order of the summation $$\kappa\left[U, \hat{r}_{Init}, \hat{\dot{r}}_{Init}, \hat{w}\right] = \sum_{i=0}^{\infty}\epsilon^i \frac{1}{r_{Init}}\left(\sum_{j=0}^{i}(\beta_{i-j}\beta_j - \alpha_{i-j}\alpha_j)\right)\hat{r}_{Init}\cdot\hat{w} + 2\sum_{i=0}^{\infty}\epsilon^i \frac{1}{r_{Init}}\left(\sum_{j=0}^{i}\alpha_{i-j}\beta_j\right)\hat{\dot{r}}_{Init}\cdot\hat{w}$$

Define $$\kappa\left[i, U, \hat{r}_{Init}, \hat{\dot{r}}_{Init}, \hat{w}\right] = \frac{1}{r_{Init}}\left(\sum_{j=0}^{i}(\beta_{i-j}\beta_j - \alpha_{i-j}\alpha_j)\right)\hat{r}_{Init}\cdot\hat{w} + 2\frac{1}{r_{Init}}\left(\sum_{j=0}^{i}\alpha_{i-j}\beta_j\right)\hat{\dot{r}}_{Init}\cdot\hat{w}$$

Then $$\kappa\left[U, \hat{r}_{Init}, \hat{\dot{r}}_{Init}, \hat{w}\right] = \sum_{i=0}^{\infty} \epsilon^{i} \kappa\left[i, U, \hat{r}_{Init}, \hat{\dot{r}}_{Init}, \hat{w}\right]$$

and $$\kappa\left[0, U, \hat{r}_{Init}, \hat{\dot{r}}_{Init}, \hat{w}\right] = \kappa\left[U_0, \hat{r}_{Init}, \hat{\dot{r}}_{Init}, \hat{w}\right]$$

- Getting the perturbed version of $\Gamma_n\left[U, \hat{u}, \hat{v}, \hat{w}, \hat{r}_{Init}, \hat{\dot{r}}_{Init}\right]$ $$\Gamma_n\left[U, \hat{u}, \hat{v}, \hat{w}, \hat{r}_{Init}, \hat{\dot{r}}_{Init}\right] =$$

$$\left(\sum_{p=0}^{\infty} (-1)^p \left(\frac{|U|^2}{r_{Init}} - 1\right)^p\right)^{2n+1}$$

$$\sum_{i=0}^{n-2k[1]} \sum_{j=0 k[2]=0}^{i} \sum_{k[3]=0}^{i-j} \sum_{k[3]=0}^{j} \left(-\frac{1}{2} C_{n-k[1]}\right) *$$

$$\left((n - k[1]) C_{n-2k[1]} *\right.$$
$$(n - 2k) C_i * iC_j * (i - j) C_{k[2]} * jC_{k[3]} *$$
$$(-2)^{n-2k[1]} (-1)^{j-k[3]} *$$
$$\left((Cos[\omega_{er} t])^{i-j-k[2]+k[3]}\right.$$
$$\left.\left.(Sin[\omega_{er} t])^{j-k[2]-k[3]}\right)\right) *$$

$$J[n][n - 2k[1] - i, i - (k[2] + k[3]), k[2] + k[3]][\hat{u}, \hat{v}, \hat{w}] *$$

$$\left((-(2(n - k[1])) + 1) \hat{r}\right.$$

$$\left(\frac{|U|^2}{r_{Init}}\right)^{2k[1]} \left(\kappa\left[U, \hat{r}_{Init}, \hat{\dot{r}}_{Init}, \hat{u}\right]\right)^{n-2k[1]-i}$$

$$\left(\kappa\left[U, \hat{r}_{Init}, \hat{\dot{r}}_{Init}, \hat{v}\right]\right)^{i-j}$$

$$\left(\kappa\left[U, \hat{r}_{Init}, \hat{\dot{r}}_{Init}, \hat{w}\right]\right)^{j} +$$

$$\left(\frac{|U|^2}{r_{Init}}\right)^{2k[1]+1}$$

$$\left(\left((n - 2k[1] - i) \left(\kappa\left[U, \hat{r}_{Init}, \hat{\dot{r}}_{Init}, \hat{u}\right]\right)^{n-2k[1]-i-1} \hat{u}\right)\right.$$

$$\left(\kappa\left[U, \hat{r}_{Init}, \hat{\dot{r}}_{Init}, \hat{v}\right]\right)^{i-j}$$
$$\left(\kappa\left[U, \hat{r}_{Init}, \hat{\dot{r}}_{Init}, \hat{w}\right]\right)^{j}\right) +$$
$$\left(\frac{|U|^2}{r_{Init}}\right)^{2k[1]+1} \left(\left(\kappa\left[U, \hat{r}_{Init}, \hat{\dot{r}}_{Init}, \hat{u}\right]\right)^{n-2k[1]-i}\right.$$
$$\left((i-j)\left(\kappa\left[U, \hat{r}_{Init}, \hat{\dot{r}}_{Init}, \hat{v}\right]\right)^{i-j-1} \hat{v}\right)$$
$$\left(\kappa\left[U, \hat{r}_{Init}, \hat{\dot{r}}_{Init}, \hat{w}\right]\right)^{j}\right) +$$
$$\left(\frac{|U|^2}{r_{Init}}\right)^{2k[1]+1} \left(\left(\kappa\left[U, \hat{r}_{Init}, \hat{\dot{r}}_{Init}, \hat{u}\right]\right)^{n-2k[1]-i}\right.$$
$$\left(\kappa\left[U, \hat{r}_{Init}, \hat{\dot{r}}_{Init}, \hat{v}\right]\right)^{i-j}$$
$$\left.\left.\left(j\left(\kappa\left[U, \hat{r}_{Init}, \hat{\dot{r}}_{Init}, \hat{w}\right]\right)^{j-1} \hat{w}\right)\right)\right)$$

Substituting $$U = \sum_{i=0}^{\infty} \epsilon^i U_i$$

and $$t = \sum_{i=0}^{\infty} \epsilon^i \left(\sum_{j=0}^{i} \int_0^s \langle U_{i-j}[s1] U_j[s1]^{\dagger}\rangle_0 \, ds\right) = \sum_{i=0}^{\infty} \epsilon^i \sum_{j=0}^{\lambda_{t,i}} \alpha_{t,j} e^{j\omega_{t,j} s}$$

into $\Gamma_n\left[U, \hat{u}, \hat{v}, \hat{w}, \hat{r}_{Init}, \hat{\dot{r}}_{Init}\right]$ we get $$\Gamma_n\left[\sum_{i=0}^{\infty} \epsilon^i U_i, \hat{u}, \hat{v}, \hat{w}, \hat{r}_{Init}, \hat{\dot{r}}_{Init}\right] =$$

$$\left(\sum_{p=0}^{\infty} (-1)^p \left(\frac{|\sum_{k[4]=0}^{\infty} \epsilon^{k[4]} U_{k[4]}|^2}{r_{Init}} - 1\right)^p\right)^{2n} *$$

$$\left(\sum_{i=0}^{n-2k[1]} \sum_{j=0}^{i} \sum_{k[2]=0}^{i-j} \sum_{k[3]=0}^{j} \left(-\frac{1}{2} C_{n-k[1]}\right) *\right.$$

$$\begin{aligned}
&\Big((n-k[1])\, C_{n-2k[1]} * \\
&(n-2k)\, C_i * iC_j * (i-j)\, C_{k[2]} * jC_{k[3]} * \\
&(-2)^{n-2k[1]} (-1)^{j-k[3]} * \\
&\Bigg(\Bigg(\cos\Bigg[\omega_{er}\Bigg(\sum_{k[5]=0}^{\infty}\epsilon^{k[5]} \sum_{m[1]=0}^{\lambda_{z,k[5]}} \alpha_{t,k[5],m[1]}\, e^{j\,\omega_{t,k[5],m[1]}\, s}\Bigg)\Bigg]\Bigg)^{i-j-k[2]+k[3]} * \\
&\Bigg(\sin\Bigg[\omega_{er}\Bigg(\sum_{k[6]=0}^{\infty}\epsilon^{k[6]} \sum_{m[2]=0}^{\lambda_{z,k[6]}} \alpha_{t,k[6],m[2]}\, e^{j\,\omega_{t,k[6],m[2]}\, s}\Bigg)\Bigg]\Bigg)^{j+k[2]-k[3]}\Bigg) * \\
&J[n][n-2k[1]-i,\ i-(k[2]+k[3]),\ k[2]+k[3]][\hat{\mathbf{u}},\hat{\mathbf{v}},\hat{\mathbf{w}}] * \\
&\Bigg(-(2(n-k[1])+1)\,\hat{\mathbf{r}}\,\Bigg)\Bigg(\frac{|\sum_{k[7]=0}^{\infty}\epsilon^{k[7]} U_{k[7]}|^2}{r_{Init}}\Bigg)^{2k[1]} \\
&\Bigg(\sum_{k[8]=0}^{\infty}\epsilon^{k[8]}\,\kappa\Big[k[8],\, U,\, \hat{\mathbf{r}}_{Init},\, \hat{\dot{\mathbf{r}}}_{Init},\, \hat{\mathbf{u}}\Big]\Bigg)^{n-2k[1]-i} \\
&\Bigg(\sum_{k[9]=0}^{\infty}\epsilon^{k[9]}\,\kappa\Big[k[9],\, U,\, \hat{\mathbf{r}}_{Init},\, \hat{\dot{\mathbf{r}}}_{Init},\, \hat{\mathbf{v}}\Big]\Bigg)^{i-j} \\
&\Bigg(\sum_{k[10]=0}^{\infty}\epsilon^{k[10]}\,\kappa\Big[k[10],\, U,\, \hat{\mathbf{r}}_{Init},\, \hat{\dot{\mathbf{r}}}_{Init},\, \hat{\mathbf{w}}\Big]\Bigg)^{j} \ +
\end{aligned}$$

$$\left(\frac{\left|\sum_{k[11]=0}^{\infty} \epsilon^{k[11]} U_{k[11]}\right|^2}{r_{Init}}\right)^{2k[1]+1} \left(\left((n-2k[1]-i)\right.\right.$$

$$\left(\sum_{k[12]=0}^{\infty} \epsilon^{k[12]} \kappa\left[k[12], U, \hat{r}_{Init}, \hat{\dot{r}}_{Init}, \hat{u}\right]\right)^{n-2k[1]-i-1} \hat{u}\right)$$

$$\left(\sum_{k[13]=0}^{\infty} \epsilon^{k[13]} \kappa\left[k[13], U, \hat{r}_{Init}, \hat{\dot{r}}_{Init}, \hat{v}\right]\right)^{i-j}$$

$$\left.\left(\sum_{k[14]=0}^{\infty} \epsilon^{k[14]} \kappa\left[k[14], U, \hat{r}_{Init}, \hat{\dot{r}}_{Init}, \hat{w}\right]\right)^{j}\right) +$$

$$\left(\frac{\left|\sum_{k[14]=0}^{\infty} \epsilon^{k[14]} U_{k[14]}\right|^2}{r_{Init}}\right)^{2k[1]+1} *$$

$$\left(\left(\sum_{k[15]=0}^{\infty} \epsilon^{k[15]} \kappa\left[k[15], U, \hat{r}_{Init}, \hat{\dot{r}}_{Init}, \hat{u}\right]\right)^{n-2k[1]-i} *\right.$$

$$\left((i-j)\left(\sum_{k[16]=0}^{\infty} \epsilon^{k[16]} \kappa\left[k[16], U, \hat{r}_{Init}, \hat{\dot{r}}_{Init}, \hat{v}\right]\right)^{i-j-1} \hat{v}\right)$$

$$\left.\left(\sum_{k[17]=0}^{\infty} \epsilon^{k[17]} \kappa\left[k[17], U, \hat{r}_{Init}, \hat{\dot{r}}_{Init}, \hat{w}\right]\right)^{j}\right) +$$

$$\left(\frac{\left|\sum_{k[18]=0}^{\infty} \epsilon^{k[18]} U_{k[18]}\right|^2}{r_{Init}}\right)^{2k[1]+1} *$$

$$\left(\left(\sum_{k[19]=0}^{\infty} \epsilon^{k[19]} \kappa\left[k[19], U, \hat{r}_{Init}, \hat{\dot{r}}_{Init}, \hat{u}\right]\right)^{n-2k[1]-i}\right.$$

$$\left(\sum_{k[20]=0}^{\infty} \epsilon^{k[20]} \kappa\left[k[20], U, \hat{r}_{Init}, \hat{\dot{r}}_{Init}, \hat{v}\right]\right)^{i-j}$$

$$\left.\left.\left.\left(j\left(\sum_{k[21]=0}^{\infty} \epsilon^{k[21]} \kappa\left[k[21], U, \hat{r}_{Init}, \hat{\dot{r}}_{Init}, \hat{w}\right]\right)^{j-1} \hat{w}\right)\right)\right)\right)$$

Define $$\Gamma_{n,i}\left[U, \hat{u}, \hat{v}, \hat{w}, \hat{r}_{Init}, \hat{\dot{r}}_{Init}\right] =$$

$$\frac{1}{i!} \frac{\partial^i \Gamma_n\left[\sum_{i=0}^{\infty} \epsilon^i U_i, \hat{u}, \hat{v}, \hat{w}, \hat{r}_{Init}, \hat{\dot{r}}_{Init}\right]}{\partial \epsilon^i} \bigg|_{\epsilon=0}$$

A computer algebra system may be used to calculate the functions rather than doing this manually.

$$\Gamma_n\left[\sum_{i=0}^{\infty} \epsilon^i U_i, \hat{u}, \hat{v}, \hat{w}, \hat{r}_{Init}, \hat{\dot{r}}_{Init}\right] =$$

$$\sum_{i=0}^{\infty} \epsilon^i \Gamma_{n,i}\left[U, \hat{u}, \hat{v}, \hat{w}, \hat{r}_{Init}, \hat{\dot{r}}_{Init}\right]$$

■ Generating the Perturbed Equations

We demonstrate the perturbation method by generating the the first three (up to and equal to 2nd Order) using standard perturbation theory $$2\frac{d^2}{ds^2} U - E U =$$

$$-\frac{1}{r_{Init}} \hat{r}_{Init} U G M$$

$$\left(\sum_{n=2}^{\infty} \left(\frac{R}{r_{Init}}\right)^n \Gamma_n\left[U, \hat{u}, \hat{v}, \hat{w}, \hat{r}_{Init}, \hat{\dot{r}}_{Init}\right]\right) =$$

The above equation is an example of a weakly non-linear equation to which one may apply perturbation techniques e.g Lindstedt-Poincare (Ref 4) to generate analytic solutions correct to a given order. Vrbik (Ref 8) has produced perturbed solutions to orbits using quaternion.

We proceed to demonstrate the method

Let $$\epsilon = -\frac{1}{r_{Init}} \implies r_{Init} = -\frac{1}{\epsilon} \tag{15}$$

And let $$U = \sum_{i=0}^{\infty} \epsilon^i U_i \tag{16}$$

And let $$\omega = \sum_{i=0}^{\infty} \epsilon^i \omega_i$$

Where $$\frac{-E}{2} = \omega^2$$

Then we get for the equation of motion $$2\frac{d^2}{ds^2}\left(\sum_{i=0}^{\infty} \epsilon^i U_i\right) - E\left(\sum_{i=0}^{\infty} \epsilon^i U_i\right) =$$

$$-\frac{1}{r_{Init}} \hat{r}_{Init} \left(\sum_{i=0}^{\infty} \epsilon^i U_i\right) GM$$

$$\left(\sum_{n=2}^{\infty} \left(\frac{R}{r_{Init}}\right)^n \Gamma_n\left[\left(\sum_{i=0}^{\infty} \epsilon^i U_i\right), \hat{u}, \hat{v}, \hat{w}, \hat{r}_{Init}, \dot{\hat{r}}_{Init}\right]\right)$$

Substituting for E and $-\frac{1}{r_{Init}}$ we get for the equation of motion $$\frac{d^2}{ds^2}\left(\sum_{i=0}^{\infty} \epsilon^i U_i\right) + \left(\sum_{i=0}^{\infty} \epsilon^i \omega_i\right)\left(\sum_{i=0}^{\infty} \epsilon^i \omega_i\right)\left(\sum_{i=0}^{\infty} \epsilon^i U_i\right) =$$

$$\frac{\epsilon}{2} \hat{r}_{Init} \left(\sum_{i=0}^{\infty} \epsilon^i U_i\right) GM$$

$$\left(\sum_{n=2}^{\infty} \left(\frac{R}{r_{Init}}\right)^n \Gamma_n\left[\left(\sum_{i=0}^{\infty} \epsilon^i U_i\right), \hat{u}, \hat{v}, \hat{w}, \hat{r}_{Init}, \dot{\hat{r}}_{Init}\right]\right)$$

Substituting for $\Gamma_n\left[\left(\sum_{i=0}^{\infty} \epsilon^i U_i\right), \hat{u}, \hat{v}, \hat{w}, \hat{r}_{Init}, \dot{\hat{r}}_{Init}\right]$ we get for the equation of motion $$\frac{d^2}{ds^2}\left(\sum_{i=0}^{\infty} \epsilon^i U_i\right) + \left(\sum_{i=0}^{\infty} \epsilon^i \omega_i\right)\left(\sum_{i=0}^{\infty} \epsilon^i \omega_i\right)\left(\sum_{i=0}^{\infty} \epsilon^i U_i\right) =$$

$$\frac{\epsilon}{2}\, \hat{r}_{Init} \left( \sum_{i=0}^{\infty} \epsilon^i U_i \right) GM$$

$$\left( \sum_{n=2}^{\infty} \left( \frac{R}{r_{Init}} \right)^n \left( \sum_{i=0}^{\infty} \epsilon^i \Gamma_{n,i}\left[ U,\, \hat{u},\, \hat{v},\, \hat{w},\, \hat{r}_{Init},\, \hat{\dot{r}}_{Init} \right] \right) \right)$$

Rearranging the summation we get for the equation of motion $$\frac{d^2}{ds^2}\left( \sum_{i=0}^{\infty} \epsilon^i U_i \right) + \sum_{i=0}^{\infty} \epsilon^i \left( \sum_{k=0}^{i} U_{i-k} \left( \sum_{j=0}^{k} \omega_{k-j}\, \omega_j \right) \right) =$$

$$\frac{\epsilon}{2}\, \hat{r}_{Init}\; GM$$

$$\left( \sum_{n=2}^{\infty} \left( \frac{R}{r_{Init}} \right)^n \left( \sum_{i=0}^{\infty} \epsilon^i \left( \sum_{j=0}^{i} U_{i-j}\, \Gamma_{n,j}\left[ U,\, \hat{u},\, \hat{v},\, \hat{w},\, \hat{r}_{Init},\, \hat{\dot{r}}_{Init} \right] \right) \right) \right)$$

Factoring we get for the equation of motion $$\sum_{i=0}^{\infty} \epsilon^i \left( \frac{d^2}{ds^2} U_i + \left( \sum_{k=0}^{i} U_{i-k} \left( \sum_{j=0}^{k} \omega_{k-j}\, \omega_j \right) \right) \right) =$$

$$\frac{1}{2} \sum_{i=0}^{\infty} \epsilon^{i-1} \left( \hat{r}_{Init}\; GM \left( \sum_{n=2}^{\infty} \left( \frac{R}{r_{Init}} \right)^n \right. \right.$$

$$\left. \left. \left( \left( \sum_{j=0}^{i} U_{i-j}\, \Gamma_{n,j}\left[ U,\, \hat{u},\, \hat{v},\, \hat{w},\, \hat{r}_{Init},\, \hat{\dot{r}}_{Init} \right] \right) \right) \right) \right)$$

■ Approximate the Right Hand Side of Equation Of Motion by exponentials

■ Approximating $\cos[\omega_{er}\, t]$ and $\sin[\omega_{er}\, t]$ as a sum of exponentials We have shown that we can express t as a linear combination of distinct exponential frequencies.

$$t =$$

$$\sum_{i=0}^{\infty} \epsilon^i \left( \sum_{j=0}^{i} \int_0^s \langle U_{i-j}[s1]\, U_j[s1]^\dagger \rangle_0\, ds1 \right) = \sum_{i=0}^{\infty} \epsilon^i \sum_{j=0}^{\lambda_{t,i}} \alpha_{t,i,j}\, e^{i\, \omega_{t,i,j}\, s}$$

Using a Taylor's expansion for Sin we can get the following series $$\text{Sin}[\omega_{er} t] = \sum_{i=0}^{\lambda_{Sin}} \frac{j^i}{(i+1)!} \left( \omega_{er} \sum_{k=0}^{\infty} \epsilon^k \sum_{j=0}^{\lambda_{t,i}} \alpha_{t,k,j} e^{j \omega_{t,k,j} s} \right)^{i+1}$$

$$\text{Cos}[\omega_{er} t] = \sum_{i=0}^{\lambda_{Cos}} \frac{j^i}{(i)!} \left( \omega_{er} \sum_{k=0}^{\infty} \epsilon^k \sum_{j=0}^{\lambda_{t,i}} \alpha_{t,k,j} e^{j \omega_{t,k,j} s} \right)^{i}$$

Where $\lambda_{Sin}$, and $\lambda_{Cos}$ are the number of terms to use for the desired accuracy and $j$ is complex square root of -1.

We can thus put this expression into the form $$\text{Sin}[\omega_{er} t] = \sum_{i=0}^{\infty} \epsilon^i \sum_{j=0}^{\lambda_{Sin,i}} \alpha_{Sin,i,j} e^{j \omega_{Sin,i,j} s}$$

And $$\text{Cos}[\omega_{er} t] = \sum_{i=0}^{\infty} \epsilon^i \sum_{j=0}^{\lambda_{Cos,i}} \alpha_{Cos,i,j} e^{j \omega_{Cos,i,j} s}$$

Where $\lambda_{Sin,i}$, and $\lambda_{Cos,i}$ are the number of exponentials $e^{j \omega_{Cos,i,j} s}$ generated for the desired accuracy.

■ Approximating $\left( \frac{|U|^2}{r_{Init}} \right)^n$ as a sum of exponentials Thus the solution to 0th order equaton is given by $$U_0[s] = U_{Init} \text{Cos}[\omega_0 s] + \frac{\left( \frac{dU}{ds} \big|_{s=0} \right)}{\omega_0} \text{Sin}[\omega_0 s]$$

Substituting the initial values into the solution $$U_0[s] = r_{Init}^{\frac{1}{2}} \text{Cos}[\omega_0 s] + \frac{r_{Init}^{\frac{1}{2}} \hat{r}_{Init} \dot{r}_{Init}}{2 \omega_0} \text{Sin}[\omega_0 s]$$

We show further on that $$\left( U_0[s] U_0[s]^\dagger \right) =$$

$$r_{Init} + \frac{2k}{(2\omega_0)^2} \text{Sin}[\omega_0 s]^2 = r_{Init} \left( 1 + \frac{k}{2 \omega_0^2 r_{Init}} \text{Sin}[\omega_0 s]^2 \right)$$

Thus $$\left(\frac{|U_0|^2}{r_{Init}}\right) = \frac{(U_0[s]\,U_0[s]^\dagger)}{r_{Init}} = \left(1 + \frac{k}{2\,\omega_0^2\,r_{Init}}\operatorname{Sin}[\omega_0\,s]^2\right)$$

Now $$|U|^2 = \left(\sum_{i=0}^{\infty} \epsilon^i\,U_i[s1]\right)\left(\sum_{j=0}^{\infty}\epsilon^j\,U_j[s1]\right)^\dagger = \sum_{i=0}^{\infty}\sum_{j=0}^{\infty}\epsilon^{i+j}\,U_i[s]\,U_j[s]^\dagger$$

This simplifies to $$|U|^2 = \sum_{i=0}^{\infty}\epsilon^i\sum_{j=0}^{i}U_{i-j}[s]\,U_j[s]^\dagger$$

Unfolding we get $$|U|^2 = U_0[s]\,U_0[s]^\dagger + \sum_{i=1}^{\infty}\epsilon^i\sum_{j=0}^{i}U_{i-j}[s]\,U_j[s]^\dagger$$

Thus $$\left(\frac{|U|^2}{r_{Init}}\right) = \frac{(U_0[s]\,U_0[s]^\dagger)}{r_{Init}} + \frac{\left(\sum_{i=1}^{\infty}\epsilon^i\sum_{j=0}^{i}U_{i-j}[s]\,U_j[s]^\dagger\right)}{r_{Init}}$$

Thus we get $$\left(\frac{|U|^2}{r_{Init}}\right) =$$

$$\left(1 + \frac{k}{2\,\omega_0^2\,r_{Init}}\operatorname{Sin}[\omega_0\,s]^2\right) + \frac{\left(\sum_{i=1}^{\infty}\epsilon^i\sum_{j=0}^{i}U_{i-j}[s]\,U_j[s]^\dagger\right)}{r_{Init}}$$

We therefore have $$\left(\frac{|U|^2}{r_{Init}}\right) = 1 + \alpha$$

Where $$\alpha = \frac{1}{r_{Init}}\left(\frac{k}{2\,\omega_0^2}\operatorname{Sin}[\omega_0\,s]^2 + \left(\sum_{i=1}^{\infty}\epsilon^i\sum_{j=0}^{i}U_{i-j}[s]\,U_j[s]^\dagger\right)\right)$$

The quantity $$\frac{k}{2\omega_0^2}$$

is bounded by a small integer, so that $$1 \gg \left| \frac{1}{r_{Init}} \left( \frac{k}{2\omega_0^2} \sin[\omega_0 s]^2 + \sum_{i=1}^{\infty} \epsilon^i \sum_{j=0}^{i} U_{i-j}[s] U_j[s]^\dagger \right) \right|$$

Thus it is valid to use the approximation $$(1 + \alpha)^{-1} = 1 - \alpha + \alpha^2 - \alpha^3 + \alpha^4 \ldots$$

for satellite orbits where $r_{Init}$ is greater than $10^5$ meters

The expression is thus a sum of exponential functions $$\left( \frac{|U_0|^2}{r_{Init}} \right) = \left( 1 + \frac{k}{2\omega_0^2 r_{Init}} \left( \frac{e^{j\omega_0 s} - e^{-j\omega_0 s}}{2j} \right)^2 \right)$$

For positive n $$\left( \frac{|U_0|^2}{r_{Init}} \right)^n = \left( 1 + \frac{k}{2\omega_0^2 r_{Init}} \left( \frac{e^{j\omega_0 s} - e^{-j\omega_0 s}}{2j} \right)^2 \right)^n$$

is also a sum of exponential functions.

We deal with negative n in the following way $$\left( \frac{|U|^2}{r_{Init}} \right)^{-n} = \left( \left( \frac{|U|^2}{r_{Init}} \right)^{-1} \right)^n =$$

$$\left( \sum_{i=0}^{\infty} (-1)^i \left( \frac{k}{2\omega_0^2 r_{Init}} \left( \frac{e^{j\omega_0 s} - e^{-j\omega_0 s}}{2j} \right)^2 + \right. \right.$$

$$\left. \left. \sum_{m=1}^{\infty} \epsilon^m \sum_{l=0}^{m} U_{m-l}[s] U_l[s]^\dagger \right)^i \right)^n$$

Let the last term of this series to be used be denoted $$\lambda_{rRatio}$$

The number of terms to use depends on the orbit of the satellite. When the encentricity of the orbit is small, then only a few terms need be used. For satellite orbits which are nearly circular, then only as few as 4 terms may be sufficient. Also, if it is possible to select the initial position, then select the position that is approximately the square root of the product of the nearest and furtherst distances.

$$\left(\frac{|U|^2}{r_{Init}}\right)^n = \left(\left(\frac{|U|^2}{r_{Init}}\right)^1\right)^n =$$

$$\left(\sum_{i=0}^{\lambda_{rRatio}} (-1)^i \left(\frac{k}{2\omega_0^2 r_{Init}} \left(\frac{\left(e^{j\omega_0 s} - e^{-j\omega_0 s}\right)}{2j}\right)^2 + \sum_{m=1}^{\infty} \epsilon^m \sum_{l=0}^{m} U_{m-1}[s] U_1[s]^\dagger\right)^i\right)^n$$

We can therefore put this expression in the form $$\left(\frac{|U|^2}{r_{Init}}\right)^{-n} = \sum_{i=0}^{\infty} \epsilon^i \sum_{j=0}^{\lambda_{rRatio,n,i}} \alpha_{rRatio,n,i,j} e^{j\omega_{rRatio,n,i,j} s}$$

- Expressing $\kappa\left[U, \hat{r}_{Init}, \hat{\dot{r}}_{Init}, \hat{w}\right]$ as a sum of exponentials

We have defined $$\kappa\left[U, \hat{r}_{Init}, \hat{\dot{r}}_{Init}, \hat{w}\right] =$$
$$(\beta^2 - \alpha^2) \hat{r}_{Init} \cdot \hat{w} + 2\alpha\beta \hat{\dot{r}}_{Init} \cdot \hat{w}$$

where $$\beta = \langle U \rangle_0$$

and $$\alpha = \langle U \rangle_2 \left(\hat{r}_{Init} \wedge \hat{\dot{r}}_{Init}\right)$$

When U can be expressed as $$U[s] = \left(\sum_{i=0}^{\lambda_U} \beta_{U,i} e^{j\omega_{U,i} s}\right) + \left(\sum_{i=0}^{\lambda_U} \alpha_{U,i} e^{j\omega_{U,i} s}\right) \hat{r}_{Init} \wedge \hat{\dot{r}}_{Init}$$

where the number of distinct exponentials is $\lambda_U+1$.

$$\kappa\left[U, \hat{r}_{Init}, \hat{\hat{r}}_{Init}, \hat{w}\right] =$$

$$\left(\left(\sum_{i=0}^{\lambda_U} \beta_{U,i}\, e^{j\omega_{U,i} s}\right)\left(\sum_{j=0}^{\lambda_U} \beta_{U,j}\, e^{j\omega_{U,j} s}\right) - \left(\sum_{i=0}^{\lambda_U} \alpha_{U,i}\, e^{j\omega_{U,i} s}\right)\left(\sum_{j=0}^{\lambda_U} \alpha_{U,j}\, e^{j\omega_{U,j} s}\right)\right) \hat{r}_{Init}\cdot\hat{w} +$$

$$2\left(\sum_{i=0}^{\lambda_U} \alpha_{U,i}\, e^{j\omega_{U,i} s}\right)\left(\sum_{j=0}^{\lambda_U} \beta_{U,j}\, e^{j\omega_{U,j} s}\right) \hat{\hat{r}}_{Init}\cdot\hat{w}$$

This may be simplified to $$\kappa\left[U, \hat{r}_{Init}, \hat{\hat{r}}_{Init}, \hat{w}\right] =$$

$$\left(\left(\sum_{i=0}^{\lambda_U}\sum_{j=0}^{\lambda_U} \beta_{U,i}\,\beta_{U,j}\, e^{j(\omega_{U,i}+\omega_{U,j}) s}\right) - \left(\sum_{i=0}^{\lambda_U}\sum_{j=0}^{\lambda_U} \alpha_{U,i}\,\alpha_{U,j}\, e^{j(\omega_{U,i}+\omega_{U,j}) s}\right)\right) \hat{r}_{Init}\cdot\hat{w} +$$

$$2\left(\sum_{i=0}^{\lambda_U}\sum_{j=0}^{\lambda_U} \alpha_{U,i}\,\beta_{U,j}\, e^{j(\omega_{U,i}+\omega_{U,j}) s}\right) \hat{\hat{r}}_{Init}\cdot\hat{w}$$

There may be some frequencies in the above expression that may occur more than once. The expression can therefore be put in the form $$\kappa\left[U, \hat{r}_{Init}, \hat{\hat{r}}_{Init}, \hat{w}\right] =$$

$$\left(\sum_{i=0}^{\lambda_K} \beta_{K,i}\, e^{j\omega_{K,i} s}\right) \hat{r}_{Init}\cdot\hat{w} + 2\left(\sum_{i=0}^{\lambda_K} \alpha_{K,i}\, e^{j\omega_{K,i} s}\right) \hat{\hat{r}}_{Init}\cdot\hat{w}$$

We have shown that $$\kappa\left[i, U, \hat{r}_{Init}, \hat{\hat{r}}_{Init}, \hat{w}\right] =$$

$$\frac{1}{r_{Init}} \left( \sum_{j=0}^{i} (\beta_{i-j} \beta_j - \alpha_{i-j} \alpha_j) \right) \hat{r}_{Init} \cdot \hat{w} +$$

$$2 \frac{1}{r_{Init}} \left( \sum_{j=0}^{i} \alpha_{i-j} \beta_j \right) \hat{\tilde{r}}_{Init} \cdot \hat{w}$$

Let $$U_i[s] = \left( \sum_{l=0}^{\lambda_{U,i}} \beta_{U,i,l} e^{j\omega_{U,i,l} s} \right) + \left( \sum_{l=0}^{\lambda_{U,i}} \alpha_{U,i,l} e^{j\omega_{U,i,l} s} \right) \hat{r}_{Init} \wedge \hat{\tilde{r}}_{Init}$$

Then $$\kappa\left[ i, \, U, \, \hat{r}_{Init}, \, \hat{\tilde{r}}_{Init}, \, \hat{w} \right] =$$

$$\frac{1}{r_{Init}} \left( \sum_{j=0}^{i} \left( \left( \sum_{l=0}^{\lambda_{U,i-j}} \beta_{U,i-j,l} e^{j\omega_{U,i-j,l} s} \right) \left( \sum_{l=0}^{\lambda_{U,j}} \beta_{U,j,l} e^{j\omega_{U,j,l} s} \right) - \right. \right.$$

$$\left. \left. \left( \sum_{l=0}^{\lambda_{U,i-j}} \alpha_{U,i-j,l} e^{j\omega_{U,i-j,l} s} \right) \left( \sum_{l=0}^{\lambda_{U,j}} \alpha_{U,j,l} e^{j\omega_{U,j,l} s} \right) \right) \right) \hat{r}_{Init} \cdot \hat{w} +$$

$$2 \frac{1}{r_{Init}}$$

$$\left( \sum_{j=0}^{i} \left( \sum_{l=0}^{\lambda_{U,i-j}} \alpha_{U,i-j,l} e^{j\omega_{U,i-j,l} s} \right) \left( \sum_{l=0}^{\lambda_{U,j}} \beta_{U,j,l} e^{j\omega_{U,j,l} s} \right) \right) \hat{\tilde{r}}_{Init} \cdot \hat{w}$$

Thus we can express $\kappa\left[ i, \, U, \, \hat{r}_{Init}, \, \hat{\tilde{r}}_{Init}, \, \hat{w} \right]$ in the following form $$\kappa\left[ i, \, U, \, \hat{r}_{Init}, \, \hat{\tilde{r}}_{Init}, \, \hat{w} \right] =$$

$$\left( \sum_{j=0}^{\lambda_\kappa} \beta_{\kappa,i,j} e^{j\omega_{\kappa,i,j} s} \right) \hat{r}_{Init} \cdot \hat{w} +$$

$$2 \left( \sum_{j=0}^{\lambda_\kappa} \alpha_{\kappa,i,j} e^{j\omega_{\kappa,i,j} s} \right) \hat{\tilde{r}}_{Init} \cdot \hat{w}$$

- Expressing $r_n[U, \hat{u}, \hat{v}, \hat{w}, \hat{r}_{Init}, \hat{\dot{r}}_{Init}]$ as a sum of exponentials

We have shown that $r_n[U, \hat{u}, \hat{v}, \hat{w}, \hat{r}_{Init}, \hat{\dot{r}}_{Init}]$ can be expressed as a sum of terms that are products of terms that can be expresses as exponentials. We can therefore express $r_n[U, \hat{u}, \hat{v}, \hat{w}, \hat{r}_{Init}, \hat{\dot{r}}_{Init}]$ as a sum of exponential terms $$r_n[U, \hat{u}, \hat{v}, \hat{w}, \hat{r}_{Init}, \hat{\dot{r}}_{Init}] =$$

$$\sum_{i=0}^{\infty} \epsilon^i \sum_{j=0}^{\lambda_{r,n,i}} \alpha_{r,n,i,j} \, e^{j \omega_{r,n,i,j} s}$$

where $\lambda_{r,n,i}$ represents the number of distinct exponentials $e^{j \omega_{r,n,i,j} s}$ in the ith perturbation

The equations of motion Perturbation Theory

The perturbed equation of motion is given by $$\sum_{i=0}^{\infty} \epsilon^i \left( \frac{d^2}{ds^2} U_i + \left( \sum_{k=0}^{i} U_{i,k} \left( \sum_{j=0}^{k} \omega_{k-j} \omega_j \right) \right) \right) =$$

$$\frac{1}{2} \sum_{i=0}^{\infty} \epsilon^{i+1} \left( \hat{r}_{Init} \, GM \left( \sum_{n=2}^{\lambda_{Multipole}} \left( \frac{R}{r_{Init}} \right)^n * \right.\right.$$

$$\left.\left. \left( \sum_{j=0}^{i} U_{i-j} \, r_{n,j}[U, \hat{u}, \hat{v}, \hat{w}, \hat{r}_{Init}, \hat{\dot{r}}_{Init}] \right) \right) \right)$$

The constraints on $\omega$ $$\sum_{i=0}^{\infty} \epsilon^i \left( \sum_{j=0}^{i} \omega_{i-j} \omega_j \right) = -\frac{E}{2}$$

The initial condition on position $$r_{Init} = U_{Init}^{\dagger} \, \hat{r}_{Init} \, U_{Init} = \hat{r}_{Init} \, (U_{Init})^2$$

This simplifies to $$r_{Init} = \hat{r}_{Init} \left( \sum_{i=0}^{\infty} \epsilon^i U_{i,Init} \right) \left( \sum_{j=0}^{\infty} \epsilon^j U_{j,Init} \right) =$$

$$\hat{\mathbf{r}}_{Init} \sum_{i=0}^{\infty} \epsilon^i \left( \sum_{j=0}^{i} U_{i-j,Init} U_{j,Init} \right)$$

Thus $$r_{Init} = \sum_{i=0}^{\infty} \epsilon^i \left( \sum_{j=0}^{i} U_{i-j,Init} U_{j,Init} \right)$$

Where we regard $U_i$ as a function of s $$U_{i,Init} = U_i[0]$$

Let $$U'_{i,Init} = \frac{dU_i[s]}{ds} \bigg|_{s=0}$$

The initial condition on velocity $$r \frac{d}{dt} = \frac{d}{ds}$$

Therefore, $$\dot{\mathbf{r}} = \frac{d\mathbf{r}}{dt} = \frac{1}{r} \frac{d}{ds} \hat{\mathbf{r}}_{Init} \sum_{i=0}^{\infty} \epsilon^i \left( \sum_{j=0}^{i} U_{i-j} U_j \right)$$

Substituting for r $$\mathbf{r}_{Init} \dot{\mathbf{r}}_{Init} = \frac{d}{ds} \left( \sum_{i=0}^{\infty} \epsilon^i \left( \sum_{j=0}^{i} U_{i-j} U_j \right) \right) \bigg|_{s=0}$$

Rearranging the summations $$\mathbf{r}_{Init} \dot{\mathbf{r}}_{Init} = \sum_{i=0}^{\infty} \epsilon^i \left( \sum_{j=0}^{i} ( U'_{i-j,Init} U_{j,Init} + U_{i-j,Init} U'_{j,Init}) \right)$$

■ Extracting the order equations

Ignoring $O(\epsilon)$ $$\left( \frac{d^2}{ds^2} U_0 + \omega_0^2 U_0 \right) = 0 \qquad (17)$$

76 | OrbitCalculationsRewritePatentHomeLaptop38.nb $$\omega_0\,\omega_0 = -\frac{E}{2}$$

$$r_{Init} = U_{0,Init}\,U_{0,Init}$$

$$\mathbf{r}_{Init}\,\dot{\mathbf{r}}_{Init} = U'_{0,Init}\,U_{0,Init} + U_{0,Init}\,U'_{0,Init}$$

Ignoring $O(\epsilon^2)$

The perturbed equation of motion is given by $$\sum_{i=0}^{1}\epsilon^i\left(\frac{d^2}{ds^2}U_i + \left(\sum_{k=0}^{i}U_{i-k}\left(\sum_{j=0}^{k}\omega_{k-j}\,\omega_j\right)\right)\right) =$$

$$\frac{1}{2}\sum_{i=0}^{0}\epsilon^{i+1}\left(\hat{\mathbf{r}}_{Init}\;GM\left(\sum_{n=2}^{\lambda_{Multipole}}\left(\frac{R}{r_{Init}}\right)^n\ast\right.\right.$$

$$\left.\left.\left(\left(\sum_{j=0}^{i}U_{i-j}\,\Gamma_{n,j}\left[U,\hat{\mathbf{u}},\hat{\mathbf{v}},\hat{\mathbf{w}},\hat{\mathbf{r}}_{Init},\dot{\hat{\mathbf{r}}}_{Init}\right]\right)\right)\right)\right) \quad (18)$$

$$\sum_{i=0}^{1}\epsilon^i\left(\sum_{j=0}^{i}\omega_{i-j}\,\omega_j\right) = -\frac{E}{2}$$

$$r_{Init} = \sum_{i=0}^{1}\epsilon^i\left(\sum_{j=0}^{i}U_{i-j,Init}\,U_{j,Init}\right)$$

$$\mathbf{r}_{Init}\,\dot{\mathbf{r}}_{Init} = \sum_{i=0}^{1}\epsilon^i\left(\sum_{j=0}^{i}\left(U'_{i-j,Init}\,U_{j,Init} + U_{i-j,Init}\,U'_{j,Init}\right)\right)$$

Ignoring $O(\epsilon^{\lambda_{Pert}+1})$ $$\sum_{i=0}^{\lambda_{Pert}}\epsilon^i\left(\frac{d^2}{ds^2}U_i + \left(\sum_{k=0}^{i}U_{i-k}\left(\sum_{j=0}^{k}\omega_{k-j}\,\omega_j\right)\right)\right) =$$

$$\frac{1}{2}\sum_{i=0}^{\lambda_{Pert}-1}\epsilon^{i-1}\left(\hat{\mathbf{r}}_{Init}\;GM\left(\sum_{n=2}^{\lambda_{Multipole}}\left(\frac{R}{r_{Init}}\right)^n\ast\right.\right.$$

$$\left.\left.\left(\left(\sum_{j=0}^{i}U_{i-j}\,\Gamma_{n,j}\left[U,\hat{\mathbf{u}},\hat{\mathbf{v}},\hat{\mathbf{w}},\hat{\mathbf{r}}_{Init},\dot{\hat{\mathbf{r}}}_{Init}\right]\right)\right)\right)\right)$$

$$\sum_{i=0}^{\lambda_{Pert}} \epsilon^i \left( \sum_{j=0}^{i} \omega_{i-j} \, \omega_j \right) = -\frac{E}{2}$$

$$r_{Init} = \sum_{i=0}^{\lambda_{Pert}} \epsilon^i \left( \sum_{j=0}^{i} U_{i-j,Init} \, U_{j,Init} \right)$$

$$r_{Init} \, \dot{r}_{Init} = \sum_{i=0}^{\lambda_{Pert}} \epsilon^i \left( \sum_{j=0}^{i} ( U'_{i-j,Init} \, U_{j,Init} + U_{i-j,Init} \, U'_{j,Init} ) \right)$$

The solutions to these equation of motion of the orbiting satellite of different order are uniquely determined correct to a the accuracy of approximation given the initial position, $r_{Init}$, and initial velocity, $\dot{r}_{Init}$, of the orbiting satellite by a deterministic expression. Details of how to convert the initial position vector and the initial velocity of the satellite are shown next

■ Linear second order equations and the stability condition

An equation of the form $$\frac{d^2 x[s]}{ds^2} + \omega^2 x[s] = \sum_{i=1}^{n} A_i \, e^{j \alpha_i s}$$

has a solution of the form $$x[s] = a \, e^{j \omega s} + b \, e^{-j \omega s} + \sum_{i=1}^{n} \frac{A_i}{\omega^2 - \alpha_i^2} \, e^{j \alpha_i s}$$

where $$x[s] = a \, e^{j \omega s} + b \, e^{-j \omega s}$$

is called the general solution which is parameterised by three variables a, b, and $\omega$. The solution $$x[s] = \sum_{i=1}^{n} \frac{A_i}{\omega^2 - \alpha_i^2} \, e^{j \alpha_i s}$$

ic called the particular solution.

If for some i $$\omega^2 - \alpha_i^2 = 0$$

then $$\frac{1}{\omega^2 - \alpha_i^2} \to \infty$$

Consider $$\frac{d^2 x[s]}{ds^2} + \omega^2 x[s] = e^{j\omega s}$$

which has a paricular solution of $$x[s] = s\, e^{j\omega s}$$

This particular solution is unstable because x[s] tends to ∞ as s tends to ∞. Thus for stable solutions, we have for i, such that $$\omega^2 - \alpha_i^2 = 0$$

we impose the condition $A_i = 0$

Solving the order equations and the form of their solutions

In this section we assume that the constants $\mathbf{\Gamma_n}\left[U, \hat{u}, \hat{v}, \hat{w}, \hat{r}_{Init}, \hat{\dot{r}}_{Init}\right]$ have been calculated.

We show next, how to calculate the unique solution to this equation of motion of the orbiting satellite correct to the accuracy of approximation required given the initial position and velocity of the orbiting satellite by a deterministic expression.

Linear second order equations and the stability condition

An equation of the form $$\frac{d^2 x[s]}{ds^2} + \omega^2 x[s] = \sum_{i=1}^{n} A_i\, e^{j\alpha_i s}$$

has a solution of the form $$x[s] = a\, e^{j\omega s} + b\, e^{-j\omega s} + \sum_{i=1}^{n} \frac{A_i}{\omega^2 - \alpha_i^2} e^{j\alpha_i s}$$

where $$x[s] = a\, e^{j\omega s} + b\, e^{-j\omega s}$$

is called the general solution which is parameterised by three variables a, b, and $\omega$. The solution $$x[s] = \sum_{i=1}^{n} \frac{A_i}{\omega^2 - \alpha_i^2} e^{j\alpha_i s}$$

is called the particular solution.

If for some i $$\omega^2 - \alpha_i^2 = 0$$

then $$\frac{1}{\omega^2 - \alpha_i^2} \to \infty$$

Consider $$\frac{d^2 x[s]}{ds^2} + \omega^2 x[s] = e^{j\omega s}$$

which has a paricular solution of $$x[s] = s\, e^{j\omega s}$$

This particular solution is unstable because $x[s]$ tends to $\infty$ as s tends to $\infty$. Thus for stable solutions, we have for i, such that $$\omega^2 - \alpha_i^2 = 0$$

we impose the condition $A_i = 0$

■ 0<sup>th</sup> Order Solution

The 0th order equaton is given by $$\left( \frac{d^2}{ds^2} U_0 + \omega_0^2 U_0 \right) = 0$$

$$\omega_0^2 = -\frac{E}{2}$$

where $\left( \frac{\dot{r}^2}{2} - \frac{k}{r} \right) = E$, the Kepler energy which is a positive constant. Note that the Keppler energy is a constant of motion and a scalar and so commutes with all expressions.

$$r_{Init} = U_{0,Init}^\dagger \hat{r}_{Init} U_{0,Init}$$

$$\dot{r}_{Init} = \left( U_0^\dagger \hat{r}_{Init} U_0 \right) \frac{d}{ds} \left( U_0^\dagger \hat{r}_{Init} U_0 \right)$$

We have shown before that $$U_{Init} = r_{Init}^{\frac{1}{2}} \tag{19}$$

And $$\frac{1}{2} r_{Init}^{\frac{1}{2}} \hat{r}_{Init} \dot{r}_{Init} = \frac{dU}{ds}\bigg|_{s=0} \tag{20}$$

Thus the solution to 0th order equaton is given by $$U_0[s] = U_{0,Init} \cos[\omega_0 s] + \frac{\left(\frac{dU_0}{ds}\big|_{s=0}\right)}{\omega_0} \sin[\omega_0 s]$$

Substituting the initial values into the solution $$U_0[s] = r_{Init}^{\frac{1}{2}} \cos[\omega_0 s] + \frac{r_{Init}^{\frac{1}{2}} \hat{r}_{Init} \dot{r}_{Init}}{2\omega_0} \sin[\omega_0 s]$$

First Order Solution

The first order equation becomes $$\epsilon^0 \left( \frac{d^2}{ds^2} U_0 + U_0 \omega_0^2 \right) +$$

$$\epsilon^1 \left( \left( \frac{d^2}{ds^2} U_1 + \left( \sum_{k=0}^{1} U_{1\,k} \left( \sum_{j=0}^{k} \omega_{k-j} \omega_j \right) \right) \right) \right) =$$

$$\frac{1}{2} \left( \epsilon^{0+1} \left( \hat{r}_{Init} \; GM \left( \sum_{n=-2}^{A_{Multipole}} \left( \frac{R}{r_{Init}} \right)^n * \right. \right. \right.$$

$$\left. \left. \left. \left( \left( \sum_{j=0}^{0} U_{0-j} \, \Gamma_{n,j} \left[ U, \hat{u}, \hat{v}, \hat{w}, \hat{r}_{Init}, \dot{\hat{r}}_{Init} \right] \right) \right) \right) \right)$$

This simplifies to $$\epsilon^0 \left( \frac{d^2}{ds^2} U_0 + U_0 \omega_0^2 \right) +$$

$$\epsilon^1 \left( \frac{d^2}{ds^2} U_1 + \omega_0^2 U_1 + (\omega_1 \omega_0 + \omega_0 \omega_1) U_0 \right) =$$

$$\left( e^1 \left( \hat{r}_{Init} \ G\,M \left( \sum_{n=2}^{\lambda_{Multipole}} \left(\frac{R}{r_{Init}}\right)^n U_0 \sum_{j=0}^{\lambda_{T,n,0}} \alpha_{T,n,0,j}\, e^{j\,\omega_{T,n,0,j}\,s} \right) \right) \right)^{\frac{1}{2}}$$

This can be expressed as $$\left( \frac{d^2}{ds^2} U_0 + U_0\, \omega_0^2 \right) = 0$$

And $$\left( \frac{d^2}{ds^2} U_1 + \omega_0^2\, U_1 = -(\omega_1\, \omega_0 + \omega_0\, \omega_1)\, U_0 \right) +$$

$$\left( \left( \hat{r}_{Init} \ G\,M \left( \sum_{n=2}^{\lambda_{Multipole}} \left(\frac{R}{r_{Init}}\right)^n U_0 \left( \sum_{j=0}^{\lambda_{T,n,0}} \alpha_{T,n,0,j}\, e^{j\,\omega_{T,n,0,j}\,s} \right) \right) \right) \right)^{\frac{1}{2}}$$

We thus have a system of two differential equations. The general solution from the first equation $$U_0[s] = a\, e^{j\,\omega_0\,s} + b\, e^{-j\,\omega_0\,s}$$

can be substituted in to the second equation.

$$\left( \frac{d^2}{ds^2} U_1 + \omega_0^2\, U_1 = -(\omega_1\, \omega_0 + \omega_0\, \omega_1)\, \left( a\, e^{j\,\omega_0\,s} + b\, e^{-j\,\omega_0\,s} \right) \right) +$$

$$\frac{1}{2}\left( \left( \hat{r}_{Init} \ G\,M \left( \sum_{n=2}^{\lambda_{Multipole}} \left(\frac{R}{r_{Init}}\right)^n \right. \right. \right.$$

$$\left. \left. \left. \left( a\, e^{j\,\omega_0\,s} + b\, e^{-j\,\omega_0\,s} \right) \left( \sum_{j=0}^{\lambda_{T,n,0}} \alpha_{T,n,0,j}\, e^{j\,\omega_{T,n,0,j}\,s} \right) \right) \right) \right)$$

The right hand side of the second equation can be expressed as a sum of exponentials The coefficient of the exponential $e^{j\,\omega_0\,s}$ is given by $$-(\omega_1\, \omega_0 + \omega_0\, \omega_1)\, a \ +$$

$$\frac{1}{2} \left( \hat{r}_{\text{Init}} \; G \; M \; * \right.$$

$$\left. \left( \sum_{n=2}^{\lambda_{\text{Multipole}}} \left( \frac{R}{r_{\text{Init}}} \right)^n \left( \sum_{j=0}^{\lambda_{r,n,0}} a \, \alpha_{r,n,0,j} \, \delta[\omega_{r,n,0,j}] \; + \right.\right.\right.$$

$$\left.\left.\left. b \, \alpha_{r,n,0,j} \, \delta[\omega_{r,n,0,j} - 2\omega_0] \right) \right) \right)$$

Applying the stability condition we get a value for $\omega_1$ $$\omega_1 = \frac{1}{4 \omega_0 \, a} \left( \hat{r}_{\text{Init}} \; G \; M \; * \right.$$

$$\left( \sum_{n=2}^{\lambda_{\text{Multipole}}} \left( \frac{R}{r_{\text{Init}}} \right)^n \left( \sum_{j=0}^{\lambda_{r,n,0}} a \, \alpha_{r,n,0,j} \, \delta[\omega_{r,n,0,j}] \; + \right.\right.$$

$$\left.\left.\left. b \, \alpha_{r,n,0,j} \, \delta[\omega_{r,n,0,j} - 2\omega_0] \right) \right) \right)$$

Note we would get the same walue for $\omega_1$ if we considered the coefficient of the exponential $e^{-j \omega_0 s}$ Substituting this value of $\omega_1$ into the equation we get a differential equation for $U_1$, where the right hand side is entirely in terms of a, b, and $\omega_0$. We can therefore calculate the particular solution of $U_1$.

Note, by construction, the particular solution of $U_1$ is stable.

We can proceed finding $\omega_2$, $U_2$, $\omega_3$, $U_3$, $\omega_4$, $U_4$, ...... up to the desired level of perturbation We have shown that $$U_i[s] = \sum_{j=0}^{\lambda_{U,i}} \alpha_{U,i,j} \, e^{j \omega_{U,i,j} s}$$

for $i = 0, 1$ so far, where $\lambda_{U,i}$ is the number of exponentials in the solution. $\alpha_{U,i,j}$, $\omega_{U,i,j}$, and will be expressed in terms of a, b, and $\omega_0$ and we can express U[s] to order 1 accuracy.

$$U[s] = \sum_{i=0}^{1} \epsilon^i \sum_{j=0}^{\lambda_{U,i}} \alpha_{U,i,j} \, e^{j \omega_{U,i,j} s}$$

We will demonstrate the next stage of the method using the first order perterbation equation $$\sum_{i=0}^{1} \epsilon^i \left( \sum_{j=0}^{i} \omega_{i-j} \omega_j \right) = -\frac{E}{2}$$

By substituting the value of $\omega_1$ into the equation that constrains $\omega$ $$\epsilon^0 \omega_0^2 + \epsilon^1 \left( \sum_{j=0}^{1} \omega_{i-j} \omega_j \right) = \omega_0^2 + \epsilon^1 (\omega_1 \omega_0 + \omega_0 \omega_1) = -\frac{E}{2}$$

we get an eqation entirely in terms of a, b, $\omega_0$.

By substituting the value of $U_0[0]$, $U_1[0]$ into the initial position equation $$r_{Init} = \sum_{i=0}^{1} \epsilon^i \left( \sum_{j=0}^{i} U_{i-j,Init} U_{j,Init} \right) =$$

$$U_{0,Init}^2 + U_{1,Init} U_{0,Init} + U_{0,Init} U_{1,Init}$$

we get the second equation entirely in terms of a, b, $\omega_0$.

We can calculate $U'_0[s]$ and $U'_1[s]$ in terms of terms of a, b, $\omega_0$ and s.

By substituting the solution of $U_0[0]$, $U_1[0]$, $U'_0[0]$ and $U'_1[0]$ into $$r_{Init} \dot{r}_{Init} =$$

$$\sum_{i=0}^{1} \epsilon^i \left( \sum_{j=0}^{i} ( U'_{i-j,Init} U_{j,Init} + U_{i-j,Init} U'_{j,Init} ) \right) =$$

$$U'_{0,Init} U_{0,Init} + U_{0,Init} U'_{0,Init} + U'_{1,Init} U_{0,Init} +$$
$$U_{1,Init} U'_{0,Init} + U'_{0,Init} U_{1,Init} + U_{0,Init} U'_{1,Init}$$

we get the third equation entirely in terms of a, b, $\omega_0$.

We now have a situation where we have three unknowns a, b, $\omega_0$, and three equations(the 3 boundary conditions). We can solve for these three equations for the 3 ubknowns using any of the standard methods such as FletcherPowel algorithm We can substitute the values of a,b, and $\omega_0$ into $$U_i[s] = \sum_{j=0}^{\lambda_{U,i}} \alpha_{U,i,j} e^{j \omega_{U,i,j} s}$$

and now have a formula in terms of s only. At this stage $$U[s] = \sum_{i=0}^{1} \epsilon^i \sum_{j=0}^{\lambda_{U,i}} \alpha_{U,i,j} e^{j\omega_{U,i,j} s}$$

is expressed in terms of s only.

$$U[s]\,U[s]^\dagger = \left(\sum_{i=0}^{1} \epsilon^i \sum_{j=0}^{\lambda_{U,i}} \alpha_{U,i,j} e^{j\omega_{U,i,j} s}\right) \left(\sum_{k=0}^{1} \epsilon^k \sum_{l=0}^{\lambda_{U,k}} \alpha_{U,k,l} e^{j\omega_{U,k,l} s}\right) =$$

$$\sum_{i=0}^{1}\sum_{k=0}^{1} \epsilon^i \epsilon^k \left(\sum_{j=0}^{\lambda_{U,i}} \alpha_{U,i,j} e^{j\omega_{U,i,j} s}\right) \left(\sum_{l=0}^{\lambda_{U,k}} \alpha_{U,k,l} e^{j\omega_{U,k,l} s}\right) =$$

$$\sum_{i=0}^{2} \epsilon^i \sum_{k=0}^{i} \left(\sum_{j=0}^{\lambda_{U,i-k}} \alpha_{U,i-k,j} e^{j\omega_{U,i-k,j} s}\right) \left(\sum_{l=0}^{\lambda_{U,k}} \alpha_{U,k,l} e^{j\omega_{U,k,l} s}\right)$$

Now we can put $$\sum_{k=0}^{i-k} \left(\sum_{j=0}^{\lambda_{U,i-k}} \alpha_{U,i-k,j} e^{j\omega_{U,i-k,j} s}\right) \left(\sum_{l=0}^{\lambda_{U,k}} \alpha_{U,k,l} e^{j\omega_{U,k,l} s}\right) =$$

$$\sum_{j=0}^{\lambda_{UU^\dagger,i}} \alpha_{UU^\dagger,i,j} e^{j\omega_{UU^\dagger,i,j} s}$$

and so we have $$U[s]\,U[s]^\dagger = \sum_{i=0}^{2} \epsilon^i \left(\sum_{j=0}^{\lambda_{UU^\dagger,i}} \alpha_{UU^\dagger,i,j} e^{j\omega_{UU^\dagger,i,j} s}\right)$$

where as usual $\lambda_{UU^\dagger,i}$ represents the number of exponentials required to represent the contribution of the ith perterbation component Note that $\alpha_{UU^\dagger,i,j}$ and $\omega_{UU^\dagger,i,j}$ can be precalculated in terms of a,b, and $\omega_0$ $$U[s]\,U[s]^\dagger = \sum_{i=0}^{2} \epsilon^i \left(\sum_{j=0}^{\lambda_{UU^\dagger,i}} \alpha_{UU^\dagger,i,j} e^{j\omega_{UU^\dagger,i,j} s}\right)$$

One needs to evaluate the following equation in order to get the position of satellite.

$$t = \int_0^s U[s]\, U[s]^\dagger\, ds = \sum_{i=0}^{2} \epsilon^i \sum_{j=0}^{\lambda_{UU^\dagger,i}} \frac{\alpha_{UU^\dagger,i,j}}{\omega_{UU^\dagger,i,j}} \left( e^{j\,\omega_{UU^\dagger,i,j}\,s} - 1 \right)$$

One can simplify the expression for t to the form of $$t = \sum_{i=0}^{2} \epsilon^i \sum_{j=0}^{\lambda_{tExpr,i}} \alpha_{tExpr,i,j}\, e^{j\,\omega_{tExpr,i,j}\,s}$$

$n^{th}$ Order Solution

To get the nth order solution,

1) WorkingOrder = 0

2) $U_0$ = Solution of differential equation of order 0 in terms of the unknowns a,b, and $\omega_0$.

3) WorkingOrder = WorkingOrder + 1;

4) DiffEq$_{\text{WorkingOrder}}$= Substitute $U_{\text{WorkingOrder}-1}$ into the differential equation for (WorkingOrder).

5) Solve for $\omega_{\text{WorkingOrder}}$ using the stability condition on DiffEq$_{\text{WorkingOrder}}$. (Note that $\omega_{\text{WorkingOrder}}$ is in terms of the unknowns a,b, and $\omega_0$.) Store $\omega_{\text{WorkingOrder}}$.

6) SolvableDiffEq$_{\text{WorkingOrder}}$ = Substitute $\omega_{\text{WorkingOrder}}$ into DiffEq$_{\text{WorkingOrder}}$ 7) $U_{\text{WorkingOrder}}$= Particular Solution of SolvableDiffEq$_{\text{WorkingOrder}}$.(Note that $U_{\text{WorkingOrder}}$ is in terms of the unknowns a,b, and $\omega_0$.) Store $U_{\text{WorkingOrder}}$.

8) If WorkingOrder = n, goto 9 else goto 3

9) Substitute the values of $\omega_1, \omega_2, \omega_3, ...\omega_n$ and $U_0, U_1, U_2, U_3, ... U_n$ into the constraint equation and initial condition equations, to get 3 equations connecting the initial conditions with a,b and $\omega_0$.

10) Solve equations in step 9 to get values of a,b, and $\omega_0$ in terms of the initial conditions only.

11) Substitute values from 10 into $U_0, U_1, U_2, U_3, ... U_n$ to get $U_0, U_1, U_2, U_3, ... U_n$ in terms of the initial conditions.

Calculating the position at time t

One needs to solve the following equation in order to get the position of satellite at time $t_1$ given the initial conditions at time $t_0$. We have shown before that $$t_1 - t_0 = \int_0^s U[s]\, U[s]^\dagger \, ds = \sum_{i=0}^{Order_{Pert}} \epsilon^i \sum_{j=0}^{\lambda_{tExpr,i}} \alpha_{tExpr,i,j}\, e^{j\, \omega_{tExpr,i,j}\, s_1}$$

Let $\Xi[k]$, where $$\Xi[k] := t_1 - t_0 = \sum_{i=0}^{k} \epsilon^i \sum_{j=0}^{\lambda_{tExpr,i}} \alpha_{tExpr,i,j}\, e^{j\, \omega_{tExpr,i,j}\, s_1} \qquad (21)$$

be the equation that needs to be solved, given a perturbation solution of order k.

$\Xi[k]$, is a non-linear equation, for k>1, and entirely in terms of the initial conditions once we have solved for a,b, and $\omega_0$. One of the methods of solving it would be to get an estimate of $s_1$, using, $\Xi[0]$, the zero order perturbation equation, then using the solution of $\Xi[0]$ as initial input for Newton-Raphson method for solving $\Xi[1]$, and so on until one arrives at the solution for the appropriate equation to be solved.

After solving the above equation where $s_1$ is the only unknown we can calculate the position using $$\mathbf{r} = U^\dagger[s_1]\, \hat{\mathbf{r}}_{Init}\, U[s_1]$$

■ Determining the Multipole constants J[n][p, q, r][û, v̂, ŵ]

One can set up equations involving J[n][p, q, r][û, v̂, ŵ], if the positions, $\mathbf{r}_{t_i}$, of a satellite are known accurately at different times $t_i$. Let $s_i$ be the associated value with $t_i$, where $s_i$ is unknown but $\{t_i, \mathbf{r}_{t_i}, s_i\}$ can be substituted into the following pair of equations for each i $$t_i - t_0 = \int_0^{s_i} U[s]\, U[s]^\dagger \, ds = \sum_{k=0}^{Order_{Pert}} \epsilon^k \sum_{j=0}^{\lambda_{tExpr,k}} \alpha_{tExpr,k,j}\, e^{j\, \omega_{tExpr,k,j}\, s_i}$$

And $$\mathbf{r}_{t_i} = U^\dagger[s_i]\, \hat{\mathbf{r}}_{Init}\, U[s_i]$$

We also have the three equations linking the initial conditions with the unknowns a,b, and $\omega_0$.

The unknowns in all these equations are J[n][p, q, r][û, v̂, ŵ] and the $s_i$ and a,b, and $\omega_0$.

One needs at least one point for each $J[n][p, q, r][\hat{u}, \hat{v}, \hat{w}]$ that is unknown. If there are several points, then these equations can be solved using least mean squared techniques to increase the accuracy with which the $J[n][p, q, r][\hat{u}, \hat{v}, \hat{w}]$ are determined. Also, several different satellites can be used to increase the accuracy of the solutions to the constants $J[n][p, q, r][\hat{u}, \hat{v}, \hat{w}]$.

■ The Process to use the Geometric Algebra Equation of Motion to calculate the Position of the satellite.

In the section above, we have shown that all the steps detailed below can be carried out routinely.

For some given time, $t_0$ we know the position of the position of the satellite and its velocity.

Suppose we wish to calculate the position of the satellite at some other time $t_1$ where $t_1 > t_0$ Then 1) we use the position and velocity to calculate $U_0$ and $\frac{dU_0^{\dagger}}{ds}$ using $$U_0^{\dagger} = r_{Init}^{\frac{1}{2}}$$

and $$\frac{1}{2} r_{Init}^{-\frac{1}{2}} \dot{r}_{Init} \hat{r}_{Init} = \frac{dU_0^{\dagger}}{ds} \bigg|_{s=0}$$

2) Calculate $t_1 - t_0$

3) Calculate the equations for $U_0, U_1, U_2, U_3, \ldots U_n$ in terms of unknowns a,b and $\omega_0$, and store in a lookup table.

4) Calculate the equation $$t - t_0 = \int_0^{s_1} U[s] \, U[s]^{\dagger} \, ds$$

in terms of unknowns a,b, $\omega_0$, t and s store in a lookup table.

5) Calculate the three equations connecting the initial conditions and the constraints on $\omega$ in terms of the unknowns unknowns a,b and $\omega_0$, and the initial conditions $r_{Init}, \dot{r}_{Init}$. (It is possible to calculate these equations in terms of 5 unknowns a,b, $\omega_0$, $r_{Init}, \dot{r}_{Init}$ in advance and stored. When $r_{Init}, \dot{r}_{Init}$ become known, these values are stored in the equations)

6) Solve the 3 equations in step 5) to get values for a,b, and $\omega_0$

7) Substitute these values in the stored equations for $U_0$, $U_1$, $U_2$, $U_3$, ... $U_n$ in step 3)

8) Substitute in equation calculated in step 4), the values of a,b, and $\omega_0$ and $t = t_1$ the time at which the position is to be determined and solve the resulting equation for s. Say the solution to the equation is $s = S_1$ 9) Use $\mathbf{r}_{t_1} = U^\dagger[S_1]\,\hat{\mathbf{r}}_{T_{init}}\,U[S\cdot]$ to calculate the position of the orbit at time $t_1$ We also notice, that the accuracy of the solution is determined by the factors included in the pertubation forces. The solution does not deteriorate with time. The solution is expressed in terms exponential functions.

■ Note A

We need to be able to work out the geometric derivative for some standard formulae The Product Rule $$\partial_r (P[r] Q[r]) =$$

$$\sum_{k=1}^{n} \epsilon^k \epsilon_k * \partial_r P[r] Q[r] =$$

$$\sum_{k=1}^{n} \epsilon^k \left( \underset{\tau_k \to 0}{\text{Limit}} \frac{1}{\tau_k} (P[r + \tau_k \epsilon_k] Q[r + \tau_k \epsilon_k] - P[r] Q[r]) \right) =$$

$$\sum_{k=1}^{n} \epsilon^k \left( \underset{\tau_k \to 0}{\text{Limit}} \frac{1}{\tau_k} (P[r + \tau_k \epsilon_k] Q[r + \tau_k \epsilon_k] - \right.$$

$$\left. P[r + \tau_k \epsilon_k] Q[r] + P[r + \tau_k \epsilon_k] Q[r] - P[r] Q[r]) \right)$$

But the limit of a sum is the sum of the individual limits $$\partial_r P[r] Q[r] =$$

$$\sum_{k=1}^{n} \epsilon^k \left( \underset{\tau_k \to 0}{\text{Limit}} \frac{1}{\tau_k} (P[r + \tau_k \epsilon_k] Q[r + \tau_k \epsilon_k] - \right.$$

$$P[r + \tau_k \epsilon_k] Q[r]) + \underset{\tau_k \to 0}{\text{Limit}} \frac{1}{\tau_k} (P[r + \tau_k \epsilon_k] Q[r] - P[r] Q[r]) \Bigg)$$

The first limit can be expressed as two limits, because interchanging the order of the limits yields the same limit point.

$$\partial_r P[r] Q[r] =$$
$$\sum_{k=1}^{n} \epsilon^k \Bigg( \underset{\tau_k \to 0}{\text{Limit}} \underset{\lambda_k \to 0}{\text{Limit}} \frac{1}{\tau_k} (P[r + \lambda_k \epsilon_k] Q[r + \tau_k \epsilon_k] - P[r + \lambda_k \epsilon_k] Q[r]) +$$
$$\underset{\tau_k \to 0}{\text{Limit}} \frac{1}{\tau_k} (P[r + \tau_k \epsilon_k] Q[r] - P[r] Q[r]) \Bigg)$$

$$\partial_r P[r] Q[r] =$$
$$\sum_{k=1}^{n} \epsilon^k \Bigg( \underset{\tau_k \to 0}{\text{Limit}} \frac{1}{\tau_k} (P[r] Q[r + \tau_k \epsilon_k] - P[r] Q[r]) +$$
$$\underset{\tau_k \to 0}{\text{Limit}} \frac{1}{\tau_k} (P[r + \tau_k \epsilon_k] Q[r] - P[r] Q[r]) \Bigg) =$$
$$\sum_{k=1}^{n} \epsilon^k (P[r] (\epsilon_k * \partial_r Q[r]) + (\epsilon_k * \partial_r P[r]) Q[r]) =$$
$$\sum_{k=1}^{n} \epsilon^k \Bigg( \Bigg( \epsilon_k * \Big( \ddot{\partial}_r \bar{P}[r] Q[r] + \ddot{\partial}_r P[r] \bar{Q}[r] \Big) \Bigg) =$$

Using the notation in Hestenes $$\partial_r P[r] Q[r] = \sum_{k=1}^{n} \epsilon^k \Big( \epsilon_k * \bar{\partial}_r \bar{P}[r] Q[r] + \epsilon_k * \bar{\partial}_r P[r] \bar{Q}[r] \Big) =$$
$$\sum_{k=1}^{n} \epsilon^k \Big( \epsilon_k * \Big( \partial_r \bar{P}[r] Q[r] + \partial_r P[r] \bar{Q}[r] \Big) \Big) =$$
$$\Big( \bar{\partial}_r \bar{P}[r] Q[r] + \bar{\partial}_r P[r] \bar{Q}[r] \Big)$$

Thus we have $$\partial_r P[r] Q[r] = \left(\overline{\partial_r} \overline{P}[r] Q[r] - \overline{\partial_r} P[r] \overline{Q}[r]\right)$$

The equivalent of chain rule $$\partial_r P[Q[r]] =$$

$$\sum_{k=1}^{n} \epsilon^k (\epsilon_k * \partial_r P[Q[r]]) =$$

$$\sum_{k=1}^{n} \epsilon^k \left(\text{Limit}_{\tau_k \to 0} \frac{1}{\tau_k} (P[Q[r + \tau_k \epsilon_k]] - P[Q[r]])\right)$$

But we can express by Taylor's theorem $$Q[r + \tau_k \epsilon_k] =$$

$$Q[r] + \left(\frac{\tau_k \epsilon_k * \partial_r}{1!}\right) Q[r] + \left(\frac{\tau_k \epsilon_k * \partial_r}{2!}\right)^2 Q[r] + O[\tau_k^3]$$

Substituting we have $$\partial_r P[Q[r]] =$$

$$\sum_{k=1}^{n} \epsilon^k \left(\text{Limit}_{\tau_k \to 0} \frac{1}{\tau_k} \left(P\left[Q[r] + (\tau_k \epsilon_k * \partial_r)\left(Q[r] + \left(\frac{\tau_k \epsilon_k * \partial_r}{2!}\right) Q[r] + O[\tau_k^2]\right)\right] - P[Q[r]]\right)\right)$$

But the expression $$\text{Limit}_{\tau_k \to 0} \frac{1}{\tau_k} \left(P\left[Q[r] + (\tau_k \epsilon_k * \partial_r)\left(Q[r] + \left(\frac{\tau_k \epsilon_k * \partial_r}{2!}\right) Q[r] + O[\tau_k^2]\right)\right] - P[Q[r]]\right)$$

has the same limit as $$\text{Limit}_{\tau_k \to 0} \text{Limit}_{\lambda_k \to 0} \frac{1}{\tau_k} \left(P\left[Q[r] + (\tau_k \epsilon_k * \partial_r)\left(Q[r] + \left(\frac{\lambda_k \epsilon_k * \partial_r}{2!}\right) Q[r] + O[\lambda_k^2]\right)\right] - P[Q[r]]\right)$$

And $$\lim_{\tau_k \to 0} \lim_{\lambda_k \to 0} \frac{1}{\tau_k}$$

$$\left( P\left[ Q[r] + (\tau_k \epsilon_k * \partial_r) \left( Q[r] + \frac{\lambda_k \epsilon_k * \partial_r}{2!} Q[r] + O[\lambda_k^2] \right) \right] - P[Q[r]] \right) =$$

$$\lim_{\tau_k \to 0} \frac{1}{\tau_k} \left( P[Q[r] + (\tau_k \epsilon_k * \partial_r) Q[r]] - P[Q[r]] \right)$$

Because of linearity we have $$\lim_{\tau_k \to 0} \frac{1}{\tau_k} \left( P[Q[r] + \tau_k \epsilon_k * \partial_r Q[r]] - P[Q[r]] \right) =$$

$$\lim_{\tau_k \to 0} \frac{1}{\tau_k} \left( P[Q[r] + \tau_k (\epsilon_k * \partial_r Q[r])] - P[Q[r]] \right)$$

Thus we have $$\partial_r P[Q[r]] =$$

$$\sum_{k=1}^{n} \epsilon^k \left( \lim_{\tau_k \to 0} \frac{1}{\tau_k} \left( P[Q[r] + \tau_k (\epsilon_k * \partial_r Q[r])] - P[Q[r]] \right) \right) =$$

$$\partial_r P[Q[r]] = \sum_{k=1}^{n} \epsilon^k \left( (\epsilon_k * \partial_r Q[r]) * \partial_{r'} P[r'] \big|_{r' = Q[r]} \right)$$

The derivative of a power. True only for a scaler, which commutes $$\partial_r r^n =$$

$$\sum_{k=1}^{n} \epsilon^k \epsilon_k * \partial_r r^n = \sum_{k=1}^{n} \epsilon^k \epsilon_k * \partial_r (\mathbf{r}\,\mathbf{r})^{\frac{n}{2}} =$$

$$\sum_{k=1}^{n} \epsilon^k \left( \lim_{\tau_k \to 0} \frac{1}{\tau_k} \left( (\mathbf{r} + \tau_k \epsilon_k)(\mathbf{r} + \tau_k \epsilon_k) \right)^{\frac{n}{2}} - r^n \right)$$

Multiplying the brackets we get $$\partial_r r^n =$$

$$\sum_{k=1}^{n} \epsilon^k \epsilon_k * \partial_r r^n = \sum_{k=1}^{n} \epsilon^k \epsilon_k * \partial_r (\mathbf{r}\,\mathbf{r})^{\frac{n}{2}} =$$

$$\sum_{k=1}^{n} \epsilon^k \left( \lim_{\tau_k \to 0} \frac{1}{\tau_k} \left( \left( \mathbf{r}^2 + 2\tau_k \mathbf{r}.\epsilon_k + \tau_k^2 \epsilon_k^2 \right) \right)^{\frac{n}{2}} - r^n \right) =$$

$$\sum_{k=1}^{n} \epsilon^k \left( \lim_{\tau_k \to 0} \frac{1}{\tau_k} \left( \left( r^2 + 2\tau_k \mathbf{r}.\epsilon_k + \tau_k^2 \epsilon_k^2 \right) \right)^{\frac{n}{2}} - r^n \right)$$

We can factor $$\partial_r r^n = \sum_{k=1}^{n} \epsilon^k \left( \lim_{\tau_k \to 0} \frac{1}{\tau_k} \left( \left( r^2 + 2\tau_k \mathbf{r}.\epsilon_k + \tau_k^2 \epsilon_k^2 \right) \right)^{\frac{n}{2}} - r^n \right) =$$

$$\sum_{k=1}^{n} \epsilon^k \left( r^n \left( \lim_{\tau_k \to 0} \frac{1}{\tau_k} \left( \left( 1 + \frac{\left(2\tau_k \mathbf{r}.\epsilon_k + \tau_k^2 \epsilon_k^2\right)}{r^2} \right) \right)^{\frac{n}{2}} - 1 \right) \right) =$$

$$\sum_{k=1}^{n} \epsilon^k \left( r^n \left( \lim_{\tau_k \to 0} \frac{1}{\tau_k} \left( \left( 1 + \frac{\left(2\tau_k \mathbf{r}.\epsilon_k + \tau_k^2 \epsilon_k^2\right)}{r^2} \right)^{\frac{n}{2}} - 1 \right) \right) \right)$$

But $$\lim_{\tau_k \to 0} \frac{1}{\tau_k} \left( \left( 1 + \frac{\left(2\tau_k \mathbf{r}.\epsilon_k + \tau_k^2 \epsilon_k^2\right)}{r^2} \right)^{\frac{n}{2}} - 1 \right) =$$

$$\lim_{\tau_k \to 0} \frac{1}{\tau_k} \left( \left( 1 + \tau_k \frac{\left(2 \mathbf{r}.\epsilon_k + \tau_k \epsilon_k^2\right)}{r^2} \right)^{\frac{n}{2}} - 1 \right) =$$

$$\lim_{\tau_k \to 0} \lim_{\lambda_k \to 0} \frac{1}{\tau_k} \left( \left( 1 + \tau_k \frac{\left(2 \mathbf{r}.\epsilon_k + \lambda_k \epsilon_k^2\right)}{r^2} \right)^{\frac{n}{2}} - 1 \right) =$$

$$\lim_{\tau_k \to 0} \frac{1}{\tau_k} \left( \left( 1 + \tau_k \frac{\left(2 \mathbf{r}.\epsilon_k\right)}{r^2} \right)^{\frac{n}{2}} - 1 \right) =$$

$$\text{Limit}_{\tau_k \to 0} \frac{1}{\tau_k}\left(\left(1 + \frac{n}{2} C_1 \tau_k \frac{(2\,\mathbf{r}\cdot\epsilon_k)}{r^2} + O\left(\tau_k^2\right)\right) - 1\right) =$$

$$\text{Limit}_{\tau_k \to 0}\left(\left(\frac{n\,\mathbf{r}\cdot\epsilon_k}{r^2}\right) + O(\tau_k)\right) = \frac{n\,\mathbf{r}\cdot\epsilon_k}{r^2}$$

$$\partial_{\mathbf{r}}\, r^n = \sum_{k=1}^{n} \epsilon^k \left(r^n \left(\frac{n\,\mathbf{r}\cdot\epsilon_k}{r^2}\right)\right) = n\, r^{n-2}\, \mathbf{r}$$

The derivative of a power Continued $$\partial_{\mathbf{r}}\, (P[r])^n = \sum_{k=1}^{n} \epsilon^k\, \epsilon_k * \partial_{\mathbf{r}}\, (P[r])^n =$$

$$\sum_{k=1}^{n} \epsilon^k\, \text{Limit}_{\tau_k \to 0} \frac{1}{\tau_k}\left((P[r + \tau_k \epsilon_k])^n - P[r]\right) =$$

$$\sum_{k=1}^{n} \epsilon^k \left((\epsilon_k * \partial_{\mathbf{r}} P[r]) * \partial_{\mathbf{r}'}\, (r')^n \mid_{r' \to P[r]}\right)$$

If $P[r] = <P[r]>_0$, then $$\partial_{\mathbf{r}}\, (P[r])^n = \sum_{k=1}^{n} \epsilon^k\, \epsilon_k * \partial_{\mathbf{r}}\, (P[r])^n =$$

$$\sum_{k=1}^{n} \epsilon^k\, \text{Limit}_{\tau_k \to 0} \frac{1}{\tau_k}\left((P[r] + \tau_k (\epsilon_k * \partial_{\mathbf{r}} P[r]))^n - (P[r])^n\right) =$$

$$\sum_{k=1}^{n} \epsilon^k\, \text{Limit}_{\tau_k \to 0} \frac{1}{\tau_k}\left((P[r])^n + n\,(P[r])^{n-1} \tau_k\,(\epsilon_k * \partial_{\mathbf{r}} P[r]) + \right.$$
$$\left. O\left(\tau_k^2\right) - (P[r])^n\right) = n\, \partial_{\mathbf{r}} P[r]\, (P[r])^{n-1}$$

Thus $$\partial_{\mathbf{r}}\, (P[r])^n = \sum_{k=1}^{n} \epsilon^k\, \epsilon_k * \partial_{\mathbf{r}}\, (P[\mathbf{r}])^n = n\, \partial_{\mathbf{r}} P[\mathbf{r}]\, (P[\mathbf{r}])^{n-1}$$

For

Example 1

$$\partial_{\mathbf{r}}\, r = \partial_{\mathbf{r}}\, \left(\mathbf{r}^2\right)^{\frac{1}{2}} = \frac{1}{2}\, \left(\mathbf{r}^2\right)^{\frac{1}{2}-1}\, \partial_{\mathbf{r}}\, \left(\mathbf{r}^2\right)$$

We cannot apply the power rule to $\partial_{\mathbf{r}}\left(\mathbf{r}^2\right)$. However, from first principles, we have $$\partial_{\mathbf{r}}\left(\mathbf{r}^2\right) =$$

$$\sum_{J=1}^{J_D} \epsilon^J \left( \epsilon_J * \partial_{\mathbf{r}}\left(\mathbf{r}^2\right) = \lim_{\tau_J \to 0} \frac{1}{\tau_J} \left( (\mathbf{r} + \tau_k \epsilon_J)(\mathbf{r} + \tau_k \epsilon_J) - \mathbf{r}^2 \right) \right) =$$

$$\lim_{\tau_J \to 0} (2\,\mathbf{r} . \epsilon_J + O(\tau_J)) = \sum_{J=1}^{J_D} \epsilon^J\, 2\,\mathbf{r} . \epsilon_J = 2\,\mathbf{r}$$

$$\partial_{\mathbf{r}} r = \frac{1}{2} r^{-1}\, 2\,\mathbf{r} = \hat{\mathbf{r}}$$

Example 2

$$\partial_{\mathbf{r}} r^{-1} = -1\, r^{-2}\, \partial_{\mathbf{r}} r = -r^{-2}\, \hat{\mathbf{r}}$$

Example 3

$$\partial_{\mathbf{r}} \hat{\mathbf{r}} = \partial_{\mathbf{r}}\left( r^{-1}\, \mathbf{r} \right) = \overline{\partial_{\mathbf{r}}\, r^{-1}}\, \mathbf{r} + \overline{\partial_{\mathbf{r}}}\, r^{-1}\, \overline{\mathbf{r}}$$

But $$\overline{\partial_{\mathbf{r}}}\, r^{-1}\, \overline{\mathbf{r}} = \sum_{J=1}^{J_D} \epsilon^J \left( \epsilon_J * \overline{\partial_{\mathbf{r}}}\, r^{-1}\, \overline{\mathbf{r}} \right) =$$

$$\sum_{J=1}^{J_D} \epsilon^J$$

$$\left( \lim_{\tau_J \to 0} \frac{1}{\tau_J} \left( r^{-1}(\mathbf{r} + \tau_k \epsilon_J) - r^{-1}\,\mathbf{r} \right) = \sum_{J=1}^{J_D} \epsilon^J \left( r^{-1}\, \epsilon_J \right) = J_D\, r^{-1} \right.$$

Thus $$\partial_{\mathbf{r}} \hat{\mathbf{r}} = \overline{\partial_{\mathbf{r}}\, r^{-1}}\, \mathbf{r} + \overline{\partial_{\mathbf{r}}}\, r^{-1}\, \overline{\mathbf{r}} = -r^{-2}\, \hat{\mathbf{r}}\, \mathbf{r} + J_D\, r^{-1} = \frac{(J_D - 1)}{r}$$

Example 4 is an interesting .

$$\partial_{\mathbf{r}}\, (\mathbf{r} . \mathbf{u}) = \partial_{\mathbf{r}} \left( \frac{1}{2}\, (\mathbf{r}\,\mathbf{u} - \mathbf{u}\,\mathbf{r}) \right) =$$

$$\frac{1}{2}\, (\partial_{\mathbf{r}}\, (\mathbf{r}\,\mathbf{u} + \mathbf{u}\,\mathbf{r})) =$$

$$\frac{1}{2} (\partial_r \mathbf{r}\, \mathbf{u} + \partial_r \mathbf{u}\, \mathbf{r}) =$$

$$\frac{1}{2} (\partial_r \mathbf{r}\, \mathbf{u} + \partial_r \mathbf{u}\, \mathbf{r})$$

From first principles $\partial_r \mathbf{r}\, \mathbf{u}$ $$\partial_r (\mathbf{r}\, \mathbf{u}) = \partial_r (\mathbf{r}\mathbf{u}) = \sum_{J=1}^{J_D} \epsilon^J \left( \underset{\tau_J \to 0}{\text{Limit}}\, \frac{1}{\tau_J}\, ((\mathbf{r} + \tau_k \epsilon_J)\, \mathbf{u} - \mathbf{r}\mathbf{u}) \right) = J_D\, \mathbf{u}$$

From first principles $\partial_r \mathbf{u}\, \mathbf{r}$ $$\partial_r (\mathbf{u}\, \mathbf{r}) = \partial_r (\mathbf{r}\, \mathbf{u}) = \sum_{J=1}^{J_D} \epsilon^J \left( \underset{\tau_J \to 0}{\text{Limit}}\, \frac{1}{\tau_J}\, (\mathbf{u}\, (\mathbf{r} + \tau_k \epsilon_J) - \mathbf{r}\mathbf{u}) \right) =$$

$$\sum_{J=1}^{J_D} \epsilon^J \left( \sum_{K=1}^{J_D} \epsilon^K\, (\mathbf{u} \cdot \epsilon_K)\, \epsilon_J \right) =$$

$$\sum_{J=1}^{J_D} \sum_{K=1}^{J_D} (\mathbf{u} \cdot \epsilon_K)\, \epsilon^J\, \epsilon^K\, \epsilon_J$$

Exchanging the order of summation we get $$\partial_r (\mathbf{u}\, \mathbf{r}) = \sum_{K=1}^{J_D} \sum_{J=1}^{J_D} (\mathbf{u} \cdot \epsilon_K)\, \epsilon^J\, \epsilon^K\, \epsilon_J =$$

$$\sum_{K=1}^{J_D} \sum_{\substack{J=1 \\ J \neq K}}^{J_D} (\mathbf{u} \cdot \epsilon_K)\, \epsilon^J\, \epsilon^K\, \epsilon_J + \sum_{K=1}^{J_D} \sum_{\substack{J=1 \\ J=K}}^{J_D} (\mathbf{u} \cdot \epsilon_K)\, \epsilon^J\, \epsilon^K\, \epsilon_J =$$

$$\sum_{K=1}^{J_D} \sum_{\substack{J=1 \\ J \neq K}}^{J_D} (\mathbf{u} \cdot \epsilon_K)\, \epsilon^J\, \epsilon^K\, \epsilon_J + \sum_{K=1}^{J_D} (\mathbf{u} \cdot \epsilon_K)\, \epsilon^K\, \epsilon^K\, \epsilon_K$$

But the vectors $\epsilon^J\, \epsilon^K$ anti-commute and $\epsilon^K\, \epsilon_K = 1$ $$\partial_r (\mathbf{u}\, \mathbf{r}) = -\sum_{K=1}^{J_D} \sum_{\substack{J=1 \\ J \neq K}}^{J_D} (\mathbf{u} \cdot \epsilon_K)\, \epsilon^K\, \epsilon^J\, \epsilon_J + \sum_{K=1}^{J_D} (\mathbf{u} \cdot \epsilon_K)\, \epsilon^K =$$

$$-\sum_{K=1}^{J_D} \sum_{\substack{J=1 \\ J \neq K}}^{J_D} (\mathbf{u} \cdot \boldsymbol{\epsilon}_K) \boldsymbol{\epsilon}^K + \sum_{K=1}^{J_D} (\mathbf{u} \cdot \boldsymbol{\epsilon}_K) \boldsymbol{\epsilon}^K$$

But $\sum_{K=1}^{J_D} (\mathbf{u} \cdot \boldsymbol{\epsilon}_K) \boldsymbol{\epsilon}^K = \mathbf{u}$ $$\partial_\mathbf{r} (\mathbf{u}\, \mathbf{r}) =$$
$$-\sum_{K=1}^{J_D} (J_D - 1)(\mathbf{u} \cdot \boldsymbol{\epsilon}_K) \boldsymbol{\epsilon}^K + \sum_{K=1}^{J_D} (\mathbf{u} \cdot \boldsymbol{\epsilon}_K) \boldsymbol{\epsilon}^K = (-J_D + 2)\mathbf{u}$$

$$\partial_\mathbf{r} (\mathbf{r} \cdot \mathbf{u}) = \frac{1}{2}(\partial_\mathbf{r} \mathbf{r}\, \mathbf{u} + \partial_\mathbf{r} \mathbf{u}\, \mathbf{r}) = \frac{1}{2}(J_D \mathbf{u} + (-J_D + 2)\mathbf{u}) = \mathbf{u}$$

Example 5

$$\partial_\mathbf{r} (\hat{\mathbf{r}} \cdot \mathbf{u}) = \partial_\mathbf{r} \left( \left(\frac{1}{r}\right)(\mathbf{r} \cdot \mathbf{u}) \right)$$

Using the product rule we get $$\partial_\mathbf{r} (\hat{\mathbf{r}} \cdot \mathbf{u}) = \overline{\partial_\mathbf{r}} \overline{\left(\frac{1}{r}\right)}(\mathbf{r} \cdot \mathbf{u}) + \overline{\partial_\mathbf{r}} \left(\frac{1}{r}\right) \overline{(\mathbf{r} \cdot \mathbf{u})} =$$
$$\overline{\partial_\mathbf{r}} \overline{\left(\frac{1}{r}\right)}(\mathbf{r} \cdot \mathbf{u}) + \left(\frac{1}{r}\right)\overline{\partial_\mathbf{r} (\mathbf{r} \cdot \mathbf{u})} =$$
$$- r^{-2}\, \hat{\mathbf{r}}\, (\mathbf{r} \cdot \mathbf{u}) + \frac{\mathbf{u}}{r} =$$
$$\frac{\mathbf{u}}{r} - \frac{(\mathbf{r} \cdot \mathbf{u})}{r^3} \mathbf{r}$$

When we do $\partial_\mathbf{r} (\hat{\mathbf{r}} \cdot \mathbf{u})$ from first principles we also get $$\partial_\mathbf{r} (\hat{\mathbf{r}} \cdot \mathbf{u}) = \frac{\mathbf{u}}{r} - (\mathbf{r} \cdot \mathbf{u}) \frac{\mathbf{r}}{r^3}$$

Example 6

$$\partial_\mathbf{r} \left( \frac{(\hat{\mathbf{r}} \cdot \mathbf{u})^m}{r^n} \right) = \partial_\mathbf{r} \left( \left(\frac{1}{r^n}\right)(\hat{\mathbf{r}} \cdot \mathbf{u})^m \right)$$

By the product rule $$\partial_r\left(\frac{(\hat{r}\cdot u)^m}{r^n}\right) = \overline{\partial_r}\left(\left(\frac{1}{r^n}\right)(\hat{r}\cdot u)^m\right) + \overline{\partial_r}\left(\left(\frac{1}{r^n}\right)\overline{(\hat{r}\cdot u)^m}\right)$$

$$\partial_r\left(\frac{(\hat{r}\cdot u)^m}{r^n}\right) = \left(-n\frac{1}{r^{n+1}}\right)\partial_r(r)(\hat{r}\cdot u)^m + \overline{\partial_r}\left(\left(\frac{1}{r^n}\right)\overline{(\hat{r}\cdot u)^m}\right) =$$

$$\left(-\frac{n}{r^{n+1}}\right)\hat{r}(\hat{r}\cdot u)^m + \overline{\partial_r}\left(\left(\frac{1}{r^n}\right)\overline{(\hat{r}\cdot u)^m}\right) =$$

$$\left(-\frac{n}{r^{n+1}}\right)\hat{r}(\hat{r}\cdot u)^m + m\left(\left(\frac{1}{r^n}\right)(\hat{r}\cdot u)^{m-1}\partial_r(\hat{r}\cdot u)\right) =$$

$$\left(-\frac{n}{r^{n+1}}\right)\hat{r}(\hat{r}\cdot u)^m + \left(\left(\frac{m}{r^n}\right)(\hat{r}\cdot u)^{m-1}\left(\frac{u}{r}-(r\cdot u)\frac{r}{r^3}\right)\right) =$$

$$\left(-\frac{n}{r^{n+1}}\right)\hat{r}(\hat{r}\cdot u)^m + \left(\frac{m}{r^{n+1}}\right)(\hat{r}\cdot u)^{m-1}u - \left(\frac{m}{r^{n-1}}\right)(\hat{r}\cdot u)^m\hat{r} =$$

$$\left(\frac{m}{r^{n+1}}\right)(\hat{r}\cdot u)^{m-1}u - \left(\frac{m+n}{r^{n+1}}\right)(\hat{r}\cdot u)^m\hat{r}$$

Example 7

$$\partial_r\left(\frac{(r\cdot u)^m}{r^n}\right) = \partial_r\left(\left(\frac{1}{r^n}\right)(r\cdot u)^m\right) =$$

$$\overline{\partial_r}\left(\left(\frac{1}{r^n}\right)(r\cdot u)^m\right) + \overline{\partial_r}\left(\left(\frac{1}{r^n}\right)\overline{(r\cdot u)^m}\right) =$$

$$\left(\left(-n\frac{1}{r^{n+1}}\right)(\partial_r(r))(r\cdot u)^m\right) + \left(\left(\frac{1}{r^n}\right)(m(r\cdot u)^{m-1}(\partial_r(r\cdot u))\right) =$$

$$\frac{m(r\cdot u)^{m-1}}{r^n}u - \frac{n(r\cdot u)^m}{r^{n+2}}r$$

Example 8

$$\partial_r\left(\frac{(r\cdot u)^m}{r^m}\right) = \frac{m(r\cdot u)^{m-1}}{r^m}u - \frac{m(r\cdot u)^m}{r^{m+2}}r$$

We have to find the derivative of the following expression $$\partial_r\left(\left(\frac{1}{r}\right)^{2k+1}(\hat{r}\cdot\hat{u})^{n-2k-i}(\hat{r}\cdot\hat{v})^{i-j}(\hat{r}\cdot\hat{w})^j\right)$$

Replacing unit vector by r

$$\partial_{\mathbf{r}}\left(\left(\frac{1}{r}\right)^{2k+1}\left(\frac{\mathbf{r}\cdot\hat{\mathbf{u}}}{r}\right)^{n-2k-i}\left(\frac{\mathbf{r}\cdot\hat{\mathbf{v}}}{r}\right)^{i-j}\left(\frac{\mathbf{r}\cdot\hat{\mathbf{w}}}{r}\right)^{j}\right)$$

Simplifying $$\partial_{\mathbf{r}}\left((r)^{-(2k+1)-(n-2k-i)-(i-j)-j}(\mathbf{r}\cdot\hat{\mathbf{u}})^{n-2k-i}(\mathbf{r}\cdot\hat{\mathbf{v}})^{i-j}(\mathbf{r}\cdot\hat{\mathbf{w}})^{j}\right)$$

Simplifying $$\partial_{\mathbf{r}}\left(r^{-(n+1)}(\mathbf{r}\cdot\hat{\mathbf{u}})^{n-2k-i}(\mathbf{r}\cdot\hat{\mathbf{v}})^{i-j}(\mathbf{r}\cdot\hat{\mathbf{w}})^{j}\right)$$

Example 9

$$\partial_{\mathbf{r}}\left(r^{-(2(n-k)+1)}(\mathbf{r}\cdot\hat{\mathbf{u}})^{n-2k-i}(\mathbf{r}\cdot\hat{\mathbf{v}})^{i-j}(\mathbf{r}\cdot\hat{\mathbf{w}})^{j}\right)$$

Using Hestenes overbar notation and the product rule $$\partial_{\mathbf{r}}\left(r^{-(2(n-k)+1)}(\mathbf{r}\cdot\hat{\mathbf{u}})^{n-2k-i}(\mathbf{r}\cdot\hat{\mathbf{v}})^{i-j}(\mathbf{r}\cdot\hat{\mathbf{w}})^{j}\right)=$$

$$\partial_{\mathbf{r}}\left(\overline{r^{-(2(n-k)+1)}}(\mathbf{r}\cdot\hat{\mathbf{u}})^{n-2k-i}(\mathbf{r}\cdot\hat{\mathbf{v}})^{i-j}(\mathbf{r}\cdot\hat{\mathbf{w}})^{j}\right)+$$

$$\overline{\partial_{\mathbf{r}}}\left(r^{-(2(n-k)+1)}\overline{(\mathbf{r}\cdot\hat{\mathbf{u}})^{n-2k-i}}(\mathbf{r}\cdot\hat{\mathbf{v}})^{i-j}(\mathbf{r}\cdot\hat{\mathbf{w}})^{j}\right)+$$

$$\overline{\partial_{\mathbf{r}}}\left(r^{-(2(n-k)+1)}(\mathbf{r}\cdot\hat{\mathbf{u}})^{n-2k-i}\overline{(\mathbf{r}\cdot\hat{\mathbf{v}})^{i-j}}(\mathbf{r}\cdot\hat{\mathbf{w}})^{j}\right)+$$

$$\overline{\partial_{\mathbf{r}}}\left(r^{-(2(n-k)+1)}(\mathbf{r}\cdot\hat{\mathbf{u}})^{n-2k-i}(\mathbf{r}\cdot\hat{\mathbf{v}})^{i-j}\overline{(\mathbf{r}\cdot\hat{\mathbf{w}})^{j}}\right)$$

As all the terms differentiated are scalers, the expressions commute and so we can factor the active sub expressions Example 9a $$\partial_{\mathbf{r}}\left(r^{-(2(n-k)+1)}\right)=$$
$$-(2(n-k)+1)r^{-(2(n-k)+1)-1}\mathbf{r}=-(2(n-k)+1)r^{-(2(n-k)+2)}\hat{\mathbf{r}}$$

Example 9b $$\partial_{\mathbf{r}}(\mathbf{r}\cdot\hat{\mathbf{u}})^{n-2k-i}=(n-2k-i)(\mathbf{r}\cdot\hat{\mathbf{u}})^{n-2k-i-1}\hat{\mathbf{u}}$$

Example 9c $$\partial_{\mathbf{r}}(\mathbf{r}\cdot\hat{\mathbf{v}})^{i-j}=(i-j)(\mathbf{r}\cdot\hat{\mathbf{v}})^{i-j-1}\hat{\mathbf{v}}$$

Example 9d $$\partial_{\mathbf{r}}(\mathbf{r}\cdot\hat{\mathbf{w}})^{j}=j(\mathbf{r}\cdot\hat{\mathbf{w}})^{j-1}\hat{\mathbf{w}}$$

Example 9 continued

Substituting the results of the above $$\partial_{\mathbf{r}}\left(r^{-(2(n-k)+1)}(\mathbf{r}\cdot\hat{\mathbf{u}})^{n-2k-i}(\mathbf{r}\cdot\hat{\mathbf{v}})^{i-j}(\mathbf{r}\cdot\hat{\mathbf{w}})^{j}\right) =$$

$$\left(\left(-(2(n-k)+1)\,r^{-2(n-k+1)}\hat{\mathbf{r}}\right)(\mathbf{r}\cdot\hat{\mathbf{u}})^{n-2k-i}(\mathbf{r}\cdot\hat{\mathbf{v}})^{i-j}(\mathbf{r}\cdot\hat{\mathbf{w}})^{j}\right) +$$

$$\left(r^{-(2(n-k)+1)}\left((n-2k-i)(\mathbf{r}\cdot\hat{\mathbf{u}})^{n-2k-i-1}\hat{\mathbf{u}}\right)(\mathbf{r}\cdot\hat{\mathbf{v}})^{i-j}(\mathbf{r}\cdot\hat{\mathbf{w}})^{j}\right) +$$

$$\left(r^{-(2(n-k)+1)}(\mathbf{r}\cdot\hat{\mathbf{u}})^{n-2k-i}\left((i-j)(\mathbf{r}\cdot\hat{\mathbf{v}})^{i-j-1}\hat{\mathbf{v}}\right)(\mathbf{r}\cdot\hat{\mathbf{w}})^{j}\right) +$$

$$\left(r^{-(2(n-k)+1)}(\mathbf{r}\cdot\hat{\mathbf{u}})^{n-2k-i}(\mathbf{r}\cdot\hat{\mathbf{v}})^{i-j}\left(j(\mathbf{r}\cdot\hat{\mathbf{w}})^{j-1}\hat{\mathbf{w}}\right)\right)$$

Simplifying in terms of unit vectors $$\partial_{\mathbf{r}}\left(-G\int\frac{1}{r}P_n[r,r']\,dm'[\mathbf{r}']\right) =$$

$$\partial_{\mathbf{r}}\left(r^{-(2(n-k)+1)}(\mathbf{r}\cdot\hat{\mathbf{u}})^{n-2k-i}(\mathbf{r}\cdot\hat{\mathbf{v}})^{i-j}(\mathbf{r}\cdot\hat{\mathbf{w}})^{j}\right) =$$

$$\left(\left(-(2(n-k)+1)\,r^{-2(n-k+1)+n-2k-i+i-j+j}\hat{\mathbf{r}}\right)\right.$$
$$\left.(\hat{\mathbf{r}}\cdot\hat{\mathbf{u}})^{n-2k-i}(\hat{\mathbf{r}}\cdot\hat{\mathbf{v}})^{i-j}(\hat{\mathbf{r}}\cdot\hat{\mathbf{w}})^{j}\right) +$$

$$\left(r^{-(2(n-k)+1)-n-2k-i-1+i-j+j}\right.$$
$$\left.\left((n-2k-i)(\hat{\mathbf{r}}\cdot\hat{\mathbf{u}})^{n-2k-i-1}\hat{\mathbf{u}}\right)(\hat{\mathbf{r}}\cdot\hat{\mathbf{v}})^{i-j}(\hat{\mathbf{r}}\cdot\hat{\mathbf{w}})^{j}\right) +$$

$$\left(r^{-(2(n-k)+1)-n-2k-i+i-j-1+j}\right.$$
$$\left.(\hat{\mathbf{r}}\cdot\hat{\mathbf{u}})^{n-2k-i}\left((i-j)(\hat{\mathbf{r}}\cdot\hat{\mathbf{v}})^{i-j-1}\hat{\mathbf{v}}\right)(\hat{\mathbf{r}}\cdot\hat{\mathbf{w}})^{j}\right) +$$

$$\left(r^{-(2(n-k)+1)-n-2k-i+i-j+j-1}\right.$$
$$\left.(\hat{\mathbf{r}}\cdot\hat{\mathbf{u}})^{n-2k-i}(\hat{\mathbf{r}}\cdot\hat{\mathbf{v}})^{i-j}\left(j(\hat{\mathbf{r}}\cdot\hat{\mathbf{w}})^{j-1}\hat{\mathbf{w}}\right)\right)$$

Simplifying we get $$\partial_{\mathbf{r}}\left(-G\int\frac{1}{r}P_n[r,r']\,dm'[\mathbf{r}']\right) =$$

$$\partial_{\mathbf{r}}\left(r^{-(2(n-k)+1)}(\mathbf{r}\cdot\hat{\mathbf{u}})^{n-2k-i}(\mathbf{r}\cdot\hat{\mathbf{v}})^{i-j}(\mathbf{r}\cdot\hat{\mathbf{w}})^{j}\right) =$$

$$r^{-(n+2)}\left(\left(-(2(n-k)+1)\hat{\mathbf{r}}\right)(\hat{\mathbf{r}}\cdot\hat{\mathbf{u}})^{n-2k-i}(\hat{\mathbf{r}}\cdot\hat{\mathbf{v}})^{i-j}(\hat{\mathbf{r}}\cdot\hat{\mathbf{w}})^{j}\right) +$$

$$\left(\left((n-2k-i)(\hat{\mathbf{r}}\cdot\hat{\mathbf{u}})^{n-2k-i-1}\hat{\mathbf{u}}\right)(\hat{\mathbf{r}}\cdot\hat{\mathbf{v}})^{i-j}(\hat{\mathbf{r}}\cdot\hat{\mathbf{w}})^{j}\right) +$$

$$\left((\hat{\mathbf{r}}\cdot\hat{\mathbf{u}})^{n-2k-i}\left((i-j)(\hat{\mathbf{r}}\cdot\hat{\mathbf{v}})^{i-j-1}\hat{\mathbf{v}}\right)(\hat{\mathbf{r}}\cdot\hat{\mathbf{w}})^{j}\right) +$$

$$\left((\hat{\mathbf{r}}\cdot\hat{\mathbf{u}})^{n-2k-i}(\hat{\mathbf{r}}\cdot\hat{\mathbf{v}})^{i-j}\left(j(\hat{\mathbf{r}}\cdot\hat{\mathbf{w}})^{j-1}\hat{\mathbf{w}}\right)\right)$$

Note B

We assume i,j,k are mutually orthogonal unit vectors. The rules below have been implemented in *Mathematica* to generate the geometric product of two geometric algebra multivectors

```
PseudoScaler[i, k, j] := - PseudoScaler[i, j, k]
PseudoScaler[k, i, j] := - PseudoScaler[i, k, j]
PseudoScaler[j, i, k] := - PseudoScaler[i, j, k]
PseudoScaler[k, j, i] := - PseudoScaler[k, i, j]
PseudoScaler[j, k, i] := - PseudoScaler[j, i, k]
BiVec[v1 : (i | j | k), v1 : (i | j | k)] := 1
BiVec[k, j] :=  BiVec[j, k]
BiVec[v : (j | k), i] := -BiVec[i, v]
Permutations[{i, j, k}]
{{i, j, k}, {i, k, j}, {j, i, k},
 {j, k, i}, {k, i, j}, {k, j, i}}
Map[{#, PseudoScaler[#[[1]], #[[2]], #[[3]]]} &,
  Permutations[{i, j, k}]] // MatrixForm
( {i, j, k}   PseudoScaler[i, j, k]  )
| {i, k, j}  -PseudoScaler[i, j, k]  |
| {j, i, k}  -PseudoScaler[i, j, k]  |
| {j, k, i}   PseudoScaler[i, j, k]  |
| {k, i, j}   PseudoScaler[i, j, k]  |
( {k, j, i}  -PseudoScaler[i, j, k]  )
FreeForQ[x_] :=
   FreeQ[x, Vec] ∧ FreeQ[x, BiVec] ∧ FreeQ[x, PseudoScaler];
ClearAll[GA]
GA[x_ + y__, z_] := GA[x, z] + GA[Apply[Plus, {y}], z]
GA[x_, y_ + z__] := GA[x, y] + GA[x, Apply[Plus, {z}]]
GA[(α_: 1) Vec[v1 : (i | j | k)], (β_: 1) Vec[v2 : (i | j | k)]] /;
Not[v1 === v2] ∧ FreeForQ[α] ∧ FreeForQ[β] :=
 α β BiVec[v1, v2]
GA[(α_: 1) Vec[v1 : (i | j | k)], (β_: 1) Vec[v2 : (i | j | k)]] /;
v1 == v2 ∧ FreeForQ[α] ∧ FreeForQ[β] := α β
```

```
GA[(α_: 1) Vec[v1 : (i | j | k)], (β_: 1) BiVec[v2_, v3_]] /;
  v1 == v2 ∧ FreeForQ[α] ∧ FreeForQ[β] := α β Vec[v3]
GA[(α_: 1) Vec[v1 : (i | j | k)], (β_: 1) BiVec[v2_, v3_]] /;
  v1 == v3 ∧ FreeForQ[α] ∧ FreeForQ[β] := -α β Vec[v2]
GA[(α_: 1) Vec[v1 : (i | j | k)], (β_: 1) BiVec[v2_, v3_]] /;
  Not[v1 === v2] && Not[v1 === v3] ∧ FreeForQ[α] ∧
    FreeForQ[β] := α β PseudoScaler[v1, v2, v3]
GA[(α_: 1) BiVec[v1_, v2_], (β_: 1) Vec[v3 : (i | j | k)]] /;
  v3 == v2 ∧ FreeForQ[α] ∧ FreeForQ[β] := α β Vec[v1]
GA[(α_: 1) BiVec[v1_, v2_], (β_: 1) Vec[v3 : (i | j | k)]] /;
  v3 == v1 ∧ FreeForQ[α] ∧ FreeForQ[β] := -α β Vec[v2]
GA[(α_: 1) BiVec[v1_, v2_], (β_: 1) Vec[v3 : (i | j | k)]] /;
  FreeForQ[α] ∧ FreeForQ[β] := α β PseudoScaler[v1, v2, v3]
GA[(α_: 1) PseudoScaler[i, j, k], (β_: 1) Vec[i]] /;
  FreeForQ[α] ∧ FreeForQ[β] := α β BiVec[j, k]
GA[(α_: 1) PseudoScaler[i, j, k], (β_: 1) Vec[j]] /;
  FreeForQ[α] ∧ FreeForQ[β] := -α β BiVec[i, k]
GA[(α_: 1) PseudoScaler[i, j, k], (β_: 1) Vec[k]] /;
  FreeForQ[α] ∧ FreeForQ[β] := α β BiVec[i, j]
GA[(α_: 1) Vec[i], (β_: 1) PseudoScaler[i, j, k]] /;
  FreeForQ[α] ∧ FreeForQ[β] := α β BiVec[j, k]
GA[(α_: 1) Vec[j], (β_: 1) PseudoScaler[i, j, k]] /;
  FreeForQ[α] ∧ FreeForQ[β] := -α β BiVec[i, k]
GA[(α_: 1) Vec[k], (β_: 1) PseudoScaler[i, j, k]] /;
  FreeForQ[α] ∧ FreeForQ[β] := α β BiVec[i, j]
GA[(α_: 1) PseudoScaler[i, j, k], (β_: 1) BiVec[i, j]] /;
  FreeForQ[α] ∧ FreeForQ[β] := -α β Vec[k]
GA[(α_: 1) PseudoScaler[i, j, k], (β_: 1) BiVec[i, k]] /;
  FreeForQ[α] ∧ FreeForQ[β] := α β Vec[j]
GA[(α_: 1) PseudoScaler[i, j, k], (β_: 1) BiVec[j, k]] /;
  FreeForQ[α] ∧ FreeForQ[β] := -α β Vec[i]
```

```
GA[(α_ : 1) BiVec[i, j], (β_ : 1) PseudoScaler[i, j, k]] /;
  FreeForQ[α] ∧ FreeForQ[β] := -α β Vec[k]
GA[(α_ : 1) BiVec[i, k], (β_ : 1) PseudoScaler[i, j, k]] /;
  FreeForQ[α] ∧ FreeForQ[β] := α β Vec[j]
GA[(α_ : 1) BiVec[j, k], (β_ : 1) PseudoScaler[i, j, k]] /;
  FreeForQ[α] ∧ FreeForQ[β] := -α β Vec[i]
GA[(α_ : 1) PseudoScaler[i, j, k],
   (β_ : 1) PseudoScaler[i, j, k]] /;
  FreeForQ[α] ∧ FreeForQ[β] := -α β
GA[(α_ : 1) BiVec[v1_, v2_], (β_ : 1) BiVec[v1_, v3_]] /;
  FreeForQ[α] ∧ FreeForQ[β] := -α β BiVec[v2, v3]
GA[(α_ : 1) BiVec[v1_, v2_], (β_ : 1) BiVec[v3_, v2_]] /;
  FreeForQ[α] ∧ FreeForQ[β] := -α β BiVec[v1, v3]
GA[(α_ : 1) BiVec[v1_, v2_], (β_ : 1) BiVec[v2_, v3_]] /;
  FreeForQ[α] ∧ FreeForQ[β] := α β BiVec[v1, v3]
GA[(α_ : 1) BiVec[v1_, v2_], (β_ : 1) BiVec[v3_, v1_]] /;
  FreeForQ[α] ∧ FreeForQ[β] := α β BiVec[v1, v3]
GA[α_, (β_ : 1) ( x : (Vec | BiVec | PseudoScaler))[y__]] /;
  FreeForQ[α] ∧ FreeForQ[β] := α β x[y]
GA[(β_ : 1) (x : (Vec | BiVec | PseudoScaler))[y__], α_] /;
  FreeForQ[α] ∧ FreeForQ[β] := α β x[y]
GA[(α_ : 1) α1_, (β_ : 1) β1_] /;
  FreeForQ[α] ∧ FreeForQ[β] ∧ Not[FreeForQ[α1]] ∧
   Not[FreeForQ[β1]] := α β GA[α1, β1]
GA[α_, β_] /; FreeForQ[α] ∧ FreeForQ[β] := α β
x1 = GA[xi Vec[i] + xj Vec[j] + xk Vec[k],
   yi Vec[i] + yj Vec[j] + yk Vec[k]]
xi yi + xj yj + xk yk - xj yi BiVec[i, j] +
 xi yj BiVec[i, j] - xk yi BiVec[i, k] +
 xi yk BiVec[i, k] - xk yj BiVec[j, k] + xj yk BiVec[j, k]
x2 = GA[yi Vec[i] + yj Vec[j] + yk Vec[k],
   xi Vec[i] + xj Vec[j] + xk Vec[k]]
```

```
xi yi + xj yj + xk yk + xj yi BiVec[i, j] -
xi yj BiVec[i, j] + xk yi BiVec[i, k] -
xi yk BiVec[i, k] + xk yj BiVec[j, k] - xj yk BiVec[j, k]
(x1 - x2) // Simplify
2 ((-xj yi + xi yj) BiVec[i, j] +
   (-xk yi + xi yk) BiVec[i, k] + (-xk yj + xj yk) BiVec[j, k])
GA[((x1 - x2)/2),
   GA[((x1 - x2)/2)], GA[((x1 - x2)/2)], ((x1 - x2)/2)]]] // Expand
```

$xj^4 yi^4 + 2 xj^2 xk^2 yi^4 + xk^4 yi^4 - 4 xi xj^3 yi^3 yj -$
$4 xi xj xk^2 yi^3 yj + 6 xi^2 xj^2 yi^2 yj^2 + 2 xi^2 xk^2 yi^2 yj^2 +$
$xj^2 xk^2 yi^2 yj^2 + xj xk^3 yi^2 yj^2 + 2 xk^4 yi^2 yj^2 -$
$4 xi^3 xj yi yj^3 - 2 xi xj xk^2 yi yj^3 - xi xk^3 yi yj^3 +$
$xi^4 yj^4 + xi^2 xk^2 yj^4 + xk^4 yj^4 - 4 xi xj^2 xk yi^3 yk -$
$4 xi xk^3 yi^3 yk + 8 xi^2 xj xk yi^2 yj yk - 2 xj^3 xk yi^2 yj yk -$
$2 xj^2 xk^2 yi^2 yj yk - 4 xj xk^3 yi^2 yj yk - 4 xi^3 xk yi yj^2 yk +$
$4 xi xj^2 xk yi yj^2 yk + xi xj xk^2 yi yj^2 yk -$
$4 xi xk^3 yi yj^2 yk - 2 xi^2 xj xk yj^3 yk +$
$xi^2 xk^2 yj^3 yk - 4 xj xk^3 yj^3 yk + 2 xi^2 xj^2 yi^2 yk^2 +$
$xj^4 yi^2 yk^2 + xj^3 xk yi^2 yk^2 + 6 xi^2 xk^2 yi^2 yk^2 +$
$2 xj^2 xk^2 yi^2 yk^2 - 4 xi^3 xj yi yj yk^2 - 2 xi xj^3 yi yj yk^2 +$
$xi xj^2 xk yi yj yk^2 + 8 xi xj xk^2 yi yj yk^2 + 2 xi^4 yj^2 yk^2 +$
$xi^2 xj^2 yj^2 yk^2 - 2 xi^2 xj xk yj^2 yk^2 + 2 xi^2 xk^2 yj^2 yk^2 +$
$6 xj^2 xk^2 yj^2 yk^2 - xi xj^3 yi yk^3 - 4 xi^3 xk yi yk^3 -$
$4 xi xj^2 xk yi yk^3 + xi^2 xj^2 yj yk^3 - 4 xi^2 xj xk yj yk^3 -$
$4 xj^3 xk yj yk^3 + xi^4 yk^4 + 2 xi^2 xj^2 yk^4 + xj^4 yk^4 +$
$2 xj^3 xk yi^3 yj \text{ BiVec}[i, j] + 2 xj xk^3 yi^3 yj \text{ BiVec}[i, j] -$
$6 xi xj^2 xk yi^2 yj^2 \text{ BiVec}[i, j] -$
$2 xi xk^3 yi^2 yj^2 \text{ BiVec}[i, j] +$ $6 xi^2 xj\, xk\, yi\, yj^3\, \text{BiVec}[i, j] - xj\, xk^3\, yi\, yj^3\, \text{BiVec}[i, j] -$ $2 xi^3\, xk\, yj^4\, \text{BiVec}[i, j] + xi\, xk^3\, yj^4\, \text{BiVec}[i, j] -$ $2 xj^4\, yi^3\, yk\, \text{BiVec}[i, j] - 2 xj^2\, xk^2\, yi^3\, yk\, \text{BiVec}[i, j] +$ $6 xi\, xj^3\, yi^2\, yj\, yk\, \text{BiVec}[i, j] -$ $2 xi\, xj\, xk^2\, yi^2\, yj\, yk\, \text{BiVec}[i, j] -$ $6 xi^2\, xj^2\, yi\, yj^2\, yk\, \text{BiVec}[i, j] +$ $4 xi^2\, xk^2\, yi\, yj^2\, yk\, \text{BiVec}[i, j] +$ $3 xj^2\, xk^2\, yi\, yj^2\, yk\, \text{BiVec}[i, j] +$ $2 xi^3\, xj\, yj^3\, yk\, \text{BiVec}[i, j] -$ $3 xi\, xj\, xk^2\, yj^3\, yk\, \text{BiVec}[i, j] +$ $4 xi\, xj^2\, xk\, yi^2\, yk^2\, \text{BiVec}[i, j] -$ $2 xi^2\, xj\, xk\, yi\, yj\, yk^2\, \text{BiVec}[i, j] -$ $3 xj^3\, xk\, yi\, yj\, yk^2\, \text{BiVec}[i, j] -$ $2 xi^3\, xk\, yj^2\, yk^2\, \text{BiVec}[i, j] +$ $3 xi\, xj^2\, xk\, yj^2\, yk^2\, \text{BiVec}[i, j] -$ $2 xi^2\, xj^2\, yi\, yk^3\, \text{BiVec}[i, j] + xj^4\, yi\, yk^3\, \text{BiVec}[i, j] +$ $2 xi^3\, xj\, yj\, yk^3\, \text{BiVec}[i, j] - xi\, xj^3\, yj\, yk^3\, \text{BiVec}[i, j] -$ $2 xj^2\, xk\, yi^3\, yj\, \text{BiVec}[i, k] - 2 xj\, xk^3\, yi^3\, yj\, \text{BiVec}[i, k] +$ $6 xi\, xj^2\, xk\, yi^2\, yj^2\, \text{BiVec}[i, k] +$ $2 xi\, xk^3\, yi^2\, yj^2\, \text{BiVec}[i, k] -$ $6 xi^2\, xj\, xk\, yi\, yj^3\, \text{BiVec}[i, k] - xj\, xk^3\, yi\, yj^3\, \text{BiVec}[i, k] +$ $2 xi^3\, xk\, yj^4\, \text{BiVec}[i, k] + xi\, xk^3\, yj^4\, \text{BiVec}[i, k] +$ $2 xj^4\, yi^3\, yk\, \text{BiVec}[i, k] + 2 xj^2\, xk^2\, yi^3\, yk\, \text{BiVec}[i, k] -$ $6 xi\, xj^3\, yi^2\, yj\, yk\, \text{BiVec}[i, k] +$ $2 xi\, xj\, xk^2\, yi^2\, yj\, yk\, \text{BiVec}[i, k] +$ $6 xi^2\, xj^2\, yi\, yj^2\, yk\, \text{BiVec}[i, k] -$ $4 xi^2\, xk^2\, yi\, yj^2\, yk\, \text{BiVec}[i, k] +$ $3 xj^2\, xk^2\, yi\, yj^2\, yk\, \text{BiVec}[i, k] -$ $2 xi^3\, xj\, yj^3\, yk\, \text{BiVec}[i, k] -$ $3\, xi\, xj\, xk^2\, yj^3\, yk\, \text{BiVec}[i, k] -$ $4\, xi\, xj^2\, xk\, yi^2\, yk^2\, \text{BiVec}[i, k] +$ $2\, xi^2\, xj\, xk\, yi\, yj\, yk^2\, \text{BiVec}[i, k] -$ $3\, xj^3\, xk\, yi\, yj\, yk^2\, \text{BiVec}[i, k] +$ $2\, xi^3\, xk\, yj^2\, yk^2\, \text{BiVec}[i, k] +$ $3\, xi\, xj^2\, xk\, yj^2\, yk^2\, \text{BiVec}[i, k] +$ $2\, xi^2\, xj^2\, yi\, yk^3\, \text{BiVec}[i, k] + xj^4\, yi\, yk^3\, \text{BiVec}[i, k] -$ $2\, xi^3\, xj\, yj\, yk^3\, \text{BiVec}[i, k] - xi\, xj^3\, yj\, yk^3\, \text{BiVec}[i, k] +$ $xj^2\, xk^2\, yi^2\, yj^2\, \text{BiVec}[j, k] + xj\, xk^3\, yi^2\, yj^2\, \text{BiVec}[j, k] -$ $2\, xi\, xj\, xk^2\, yi\, yj^3\, \text{BiVec}[j, k] - xi\, xk^3\, yi\, yj^3\, \text{BiVec}[j, k] +$ $xi^2\, xk^2\, yj^4\, \text{BiVec}[j, k] - 2\, xj^3\, xk\, yi^2\, yj\, yk\, \text{BiVec}[j, k] -$ $2\, xj^2\, xk^2\, yi^2\, yj\, yk\, \text{BiVec}[j, k] +$ $4\, xi\, xj^2\, xk\, yi\, yj^2\, yk\, \text{BiVec}[j, k] +$ $xi\, xj\, xk^2\, yi\, yj^2\, yk\, \text{BiVec}[j, k] -$ $2\, xi^2\, xj\, xk\, yj^3\, yk\, \text{BiVec}[j, k] +$ $xi^2\, xk^2\, yj^3\, yk\, \text{BiVec}[j, k] +$ $xj^4\, yi^2\, yk^2\, \text{BiVec}[j, k] + xj^3\, xk\, yi^2\, yk^2\, \text{BiVec}[j, k] -$ $2\, xi\, xj^3\, yi\, yj\, yk^2\, \text{BiVec}[j, k] +$ $xi\, xj^2\, xk\, yi\, yj\, yk^2\, \text{BiVec}[j, k] +$ $xi^2\, xj^2\, yj^2\, yk^2\, \text{BiVec}[j, k] -$ $2\, xi^2\, xj\, xk\, yj^2\, yk^2\, \text{BiVec}[j, k] -$ $xi\, xj^3\, yi\, yk^3\, \text{BiVec}[j, k] + xi^2\, xj^2\, yj\, yk^3\, \text{BiVec}[j, k]$ $$\frac{(\text{GA}[((x1 + x2)), ((x1 + x2))])}{4} \;// \text{ Expand}$$

$xi^2\, yi^2 + 2\, xi\, xj\, yi\, yj + xj^2\, yj^2 +$ $2\, xi\, xk\, yi\, yk + 2\, xj\, xk\, yj\, yk + xk^2\, yk^2$ $$\frac{1}{2^3} (\text{GA}[((x1 + x2)), \text{GA}[((x1 + x2)), ((x1 + x2))]]) \;// \text{ Expand}$$

$xi^3\, yi^3 + 3\, xi^2\, xj\, yi^2\, yj + 3\, xi\, xj^2\, yi\, yj^2 +$

```
xj³ yj³ + 3 xi² xk yi² yk + 6 xi xj xk yi yj yk +
3 xj² xk yj² yk + 3 xi xk² yi yk² + 3 xj xk² yj yk² + xk³ yk³
 1
--- GA[((x1 + x2)),
 2⁴
    GA[((x1 + x2)), GA[((x1 + x2)), ((x1 + x2))]]] // Expand
xi⁴ yi⁴ + 4 xi³ xj yi³ yj + 6 xi² xj² yi² yj² +
4 xi xj³ yi yj³ + xj⁴ yj⁴ + 4 xi³ xk yi³ yk +
12 xi² xj xk yi² yj yk + 12 xi xj² xk yi yj² yk +
4 xj³ xk yj³ yk + 6 xi² xk² yi² yk² + 12 xi xj xk² yi yj yk² +
6 xj² xk² yj² yk² + 4 xi xk³ yi yk³ + 4 xj xk³ yj yk³ + xk⁴ yk⁴
GA[2 xj yk BiVec[j, k], 2 xi yj BiVec[i, j]]
-4 xi xj yj yk BiVec[i, j]
GA[3, 4]
12
GA[3 + 3 Vec[i], 4 + 7 Vec[j]]
12 + 21 BiVec[i, j] - 12 Vec[i] + 21 Vec[j]
GA[4 + 7 Vec[j], 3 + 3 Vec[i]]
12 - 21 BiVec[i, j] - 12 Vec[i] + 21 Vec[j]
```

References

1    Hestenes David, "New Foundations for Classical Mechanics (Second Edition)", Kluwer Academic Publishers 2    Hestenes David and Sobczyk Garret, "Clifford Algebra to Geometric Calculus", Kluwer Academic Publishers 3    Hofmann-Wellenhof B., Lichtenegger H., and Collins J., "GPS Theory and Practice", Fourth, revised edition, Springer Wien, New York 4    Drazin P. G., "Nonlinear Systems", Cambridge Texts in Applied Mathematics 5    Waldvogel Jorg, "Quaternions for Regularizing Celestial Mechanics- the Right Way, Research Report No. 2009-09, May 2008, ETH Switzerland 6    Vrbik, Jan, "Perturbed Kepler problem in quaternionic form". J. Phys. A 28, 193-198. (1995)

I claim:

1. A method comprising:
receiving, in a mobile terminal, first information for defining a first algebraic function that relates a time variable to a first mapped variable;
using, in the mobile terminal, the function to convert a time variable value to a first value of the first mapped variable;
converting, in the mobile terminal, the first value of the first mapped variable to a second value of a second mapped variable; and
positioning, in the mobile terminal, a satellite by converting the second value of the second mapped variable value to a position value that positions a satellite;
wherein a second algebraic function that relates the first mapped variable to the second mapped variable is used to convert the first value of the first mapped variable to a second value of a second mapped variable, the second algebraic function is an algebraic solution to a differential equation of motion of the satellite, and the first and second algebraic functions are expressed using complex exponential functions.

2. The method as claimed in claim 1, wherein the first algebraic function is based upon an algebraic solution to a geometric algebraic differential equation of motion of the satellite.

3. The method as claimed in claim 1, wherein the first information includes coefficients for defining the first algebraic function.

4. The method as claimed in claim 1, wherein the differential equation of motion is $$2\frac{d^2}{ds^2}U - EU = Ur\underline{f}$$

where
E is constant
U is defined by $\underline{r}=U^\dagger \underline{\sigma}_1 U$
$\underline{\sigma}_1$ has a constant unit length
s is defined by $$\frac{d}{ds} = r\frac{d}{dt}$$

and
$\underline{f}$ is expressed using a geometric algebra in terms of U.

5. The method as claimed in claim 1, further comprising receiving second information for defining the second algebraic function.

6. The method as claimed in claim 5, wherein the second information includes coefficients for defining the second algebraic function.

7. The method as claimed in claim 1, wherein the first and second algebraic functions are expressed as weighted summations of complex exponential functions.

8. The method as claimed in claim 1, further comprising storing the position of the satellite in memory.

9. An apparatus comprising:
processing circuitry; a memory storing instructions which when loaded into the processor enable the apparatus to:
use a function that relates a time variable to a first mapped variable, and is defined by received information, to convert a time variable value to a first value of the first mapped variable;
convert the first value of the first mapped variable to a second value of a second mapped variable; and
position a satellite by converting the second value of the second mapped variable value to a position value that positions a satellite;
wherein a second algebraic function that relates the first mapped variable to the second mapped variable is used to convert the first value of the first mapped variable to a second value of a second mapped variable, the second algebraic function is an algebraic solution to a differential equation of motion of the satellite, and the first and second algebraic functions are expressed using complex exponential functions.

10. An apparatus comprising:
means for using a function that relates a time variable to a first mapped variable, and is defined by received information, to convert a time variable value to a first value of the first mapped variable;
means for converting the first value of the first mapped variable to a second value of a second mapped variable; and
means for positioning a satellite by converting the second value of the second mapped variable value to a position value that positions a satellite;
wherein a second algebraic function that relates the first mapped variable to the second mapped variable is used to convert the first value of the first mapped variable to a second value of a second mapped variable, the second algebraic function is an algebraic solution to a differential equation of motion of the satellite, and the first and second algebraic functions are expressed using complex exponential functions.

11. A non-transitory computer-readable medium containing computer instructions stored therein for causing a computer processor to:
use a function that relates a time variable to a first mapped variable, and is defined by received information, to convert a time variable value to a first value of the first mapped variable;
convert the first value of the first mapped variable to a second value of a second mapped variable; and
position a satellite by converting the second value of the second mapped variable value to a position value that positions a satellite;
wherein a second algebraic function that relates the first mapped variable to the second mapped variable is used to convert the first value of the first mapped variable to a second value of a second mapped variable, the second algebraic function is an algebraic solution to a differential equation of motion of the satellite, and the first and second algebraic functions are expressed using complex exponential functions.

12. A method comprising:
positioning, in a mobile terminal, a satellite using an algebraic solution to the equation $$2\frac{d^2}{ds^2}U - EU = Ur\underline{f}$$

where
E is a constant
U is defined by $\underline{r} = U^\dagger \underline{\sigma}_1 U$
$\underline{\sigma}_1$ has a constant unit length
s is defined by $$\frac{d}{ds} = r\frac{d}{dt}$$

and
$\underline{f}$ is expressed using geometric algebra in terms of U; and
wherein a second algebraic function that relates a first mapped variable to a second mapped variable is used to convert a first value of the first mapped variable to a second value of a second mapped variable, the second algebraic function is an algebraic solution to a differential equation of motion of the satellite, and the first and second algebraic functions are expressed using complex exponential functions.

13. The method as claimed in claim 12, wherein $\underline{f}$ is at least one of the following:
a) a gravitational field created by the uneven distribution of the earth's mass expressed as location dependent values or
b) a geometric algebraic expression of a multi-pole function or
c) f is expressed using an empirically determined, location independent constant or
d) f is expressed using an empirically determined, initial-conditions dependent constant $\underline{f}$
or
e) f is expressed using perturbation theory
or
f) is expressed as a constant function of U for a particular co-ordinate system and particular initial conditions.

14. An apparatus comprising:
means for determining an algebraic solution to the equation $$2\frac{d^2}{ds^2}U - EU = Ur\underline{f}$$

where
E is a constant
U is defined by $\underline{r} = U^\dagger \underline{\sigma}_1 U$
$\underline{\sigma}_1$ has a constant unit length
s is defined by $$\frac{d}{ds} = r\frac{d}{dt}$$

and
$\underline{f}$ is expressed using geometric algebra in terms of U, and
means for positioning the satellite using the algebraic solution; and
wherein a second algebraic function that relates the first mapped variable to the second mapped variable is used to convert the first value of the first mapped variable to a second value of a second mapped variable, the second algebraic function is an algebraic solution to a differential equation of motion of the satellite, and the first and second algebraic functions are expressed using complex exponential functions.

15. A non-transitory computer-readable medium containing computer instructions stored therein for causing a computer processor to:
determine an algebraic solution to the equation $$2\frac{d^2}{ds^2}U - EU = Ur\underline{f}$$

where
E is a constant
U is defined by $\underline{r} = U^\dagger \underline{\sigma}_1 U$
$\underline{\sigma}_1$ has a constant unit length
s is defined by $$\frac{d}{ds} = r\frac{d}{dt}$$

and
$\underline{f}$ is expressed using geometric algebra in terms of U, and
position at least one satellites using the algebraic solution; and
wherein a second algebraic function that relates the first mapped variable to the second mapped variable is used to convert the first value of the first mapped variable to a second value of a second mapped variable, the second algebraic function is an algebraic solution to a differential equation of motion of the satellite, and the first and second algebraic functions are expressed using complex exponential functions.

* * * * *